(12) United States Patent
Joffrain et al.

(10) Patent No.: US 7,496,480 B2
(45) Date of Patent: Feb. 24, 2009

(54) SWEEP MANAGER FOR SIGNAL ANALYSIS

(75) Inventors: Philippe G. Joffrain, Pflugerville, TX (US); Christopher G. Cifra, Austin, TX (US); Alain G. Moriat, Copenhagen (DK); Christohpe A. Restat, Austin, TX (US); John A. Pasquarette, Austin, TX (US); J. Clinton Fletcher, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 1063 days.

(21) Appl. No.: 10/809,109

(22) Filed: Mar. 25, 2004

(65) Prior Publication Data

US 2005/0035966 A1 Feb. 17, 2005

Related U.S. Application Data

(60) Provisional application No. 60/495,478, filed on Aug. 15, 2003, provisional application No. 60/496,318, filed on Aug. 19, 2003.

(51) Int. Cl.
*G06F 15/00* (2006.01)
(52) U.S. Cl. .................. 702/189; 702/124; 702/76; 702/107; 324/76.19; 324/76.22; 324/76.23; 324/76.52; 725/117; 725/118
(58) Field of Classification Search .................. 702/124, 702/107, 189, 190, 76, 77, 75; 324/76.19, 324/76.22, 76.23, 76.27, 76.39, 76.52, 76.77, 324/613, 614, 622; 345/440; 725/78, 117, 725/118; 341/61; 356/484, 451; 331/178, 331/166, 167
See application file for complete search history.

(56) References Cited

U.S. PATENT DOCUMENTS 4,570,217 A 2/1986 Allen et al.

(Continued)

FOREIGN PATENT DOCUMENTS

EP 0474752 12/2000

OTHER PUBLICATIONS

US 6,094,526, Marrion et al. (withdrawn).

(Continued)

*Primary Examiner*—Carol S Tsai
(74) *Attorney, Agent, or Firm*—Meyertons Hood Kivlin Kowert & Goetzel, P.C.; Jeffrey C. Hood; Mark S. Williams

(57) ABSTRACT

System and method for specifying a signal analysis function. First user input is received, e.g., to a graphical user interface (GUI), indicating a parameter for a first operation implementing at least a portion of the function. The first operation is programmatically included in a sweep loop. Second user input is received specifying a sweep configuration for a sweep on the parameter. The signal includes signal data, e.g., signal plot data or tabular data. The sweep configuration includes: a range of values for the indicated parameter, a number of iterations for the sweep, an interpolation type, step size for the sweep on the indicated parameter, specific values in the range of values for the parameter, source for at least some of the sweep configuration, and/or resultant data. The sweep is performed on the parameter per the sweep configuration, generating resultant data which is stored, and optionally displayed, e.g., in the GUI.

41 Claims, 46 Drawing Sheets

U.S. PATENT DOCUMENTS

| | | | |
|---|---|---|---|
| 4,831,580 A | 5/1989 | Yamada | |
| 4,839,583 A * | 6/1989 | Takano et al. | 324/76.19 |
| 4,849,880 A | 7/1989 | Bhaskar et al. | |
| 4,890,099 A * | 12/1989 | Takano | 345/684 |
| 5,005,119 A | 4/1991 | Rumbaugh et al. | |
| 5,038,096 A * | 8/1991 | Obie et al. | 324/76.23 |
| 5,177,560 A * | 1/1993 | Stimple et al. | 356/308 |
| 5,262,957 A * | 11/1993 | Hearn | 702/76 |
| 5,309,556 A | 5/1994 | Sismilich | |
| 5,371,851 A | 12/1994 | Pieper et al. | |
| 5,479,643 A | 12/1995 | Bhaskar et al. | |
| 5,481,712 A | 1/1996 | Silver et al. | |
| 5,657,221 A | 8/1997 | Warman et al. | |
| 5,847,559 A * | 12/1998 | Takaoku et al. | 324/76.27 |
| 5,911,070 A | 6/1999 | Solton et al. | |
| 5,940,296 A | 8/1999 | Meyer | |
| 6,061,602 A | 5/2000 | Meyer | |
| 6,167,562 A | 12/2000 | Kaneko | |
| 6,226,783 B1 | 5/2001 | Limondin et al. | |
| 6,233,288 B1 * | 5/2001 | Takaoku et al. | 375/316 |
| 6,275,020 B1 * | 8/2001 | Nagano | 324/76.27 |
| 6,288,474 B1 | 9/2001 | Ono et al. | |
| 6,298,474 B1 | 10/2001 | Blowers et al. | |
| 6,408,429 B1 | 6/2002 | Marrion, Jr. et al. | |
| 6,509,728 B1 * | 1/2003 | Uchino et al. | 324/76.15 |
| 6,567,762 B2 * | 5/2003 | Bourde et al. | 702/107 |
| 6,621,277 B2 * | 9/2003 | Mar | 324/622 |
| 6,631,341 B2 * | 10/2003 | Kameda et al. | 702/124 |
| 6,637,022 B1 | 10/2003 | Weeren et al. | |
| 6,763,323 B2 * | 7/2004 | Schmidt | 702/190 |
| 6,763,515 B1 | 7/2004 | Vazquez et al. | |
| 6,839,727 B2 | 1/2005 | Kechriotis | |
| 6,861,833 B2 * | 3/2005 | Miyauchi | 324/76.19 |
| 7,275,235 B2 * | 9/2007 | Molinari et al. | 717/100 |
| 2002/0126151 A1 | 9/2002 | Chandhoke et al. | |
| 2002/0129333 A1 | 9/2002 | Chandhoke et al. | |
| 2002/0186245 A1 | 12/2002 | Chandhoke et al. | |
| 2002/0191023 A1 | 12/2002 | Chandhoke et al. | |
| 2003/0043175 A1 | 3/2003 | Vazquez et al. | |
| 2003/0080724 A1 * | 5/2003 | Mar | 324/76.52 |
| 2003/0227483 A1 | 12/2003 | Schultz et al. | |
| 2004/0221238 A1 | 11/2004 | Cifra et al. | |

OTHER PUBLICATIONS

Optilab Image Processing and Analysis Software for the Apple Macintosh ™ II, User's Manual, dated 1990.
MacUser, John Rizzo, Image Analyst and Enhance, Jul. 1990, pp. 55-58.
SPIE—The International Society for Optical Engineering, Steven Rosenthal and Larry StahlAerg, "Integrated Approach to Machine Vision Application Development", vol. 1386, Nov. 8, 1990, pp. 158-162.
Automatix News Release, www.applefritter.com/macclones/automatix/newsrelease, Vision for Process Feedback and Control, Jul. 3, 2000, pp. 1-3.
IPLab, Serious Image Processing for the Macintosh II, 1990.
SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.
National Instruments, "Measurement Studio™ User Manual," National Instruments Corporation, Part No. 323392B-01, Jul. 2004 Edition.
"Tina Pro—The Complete Electronics Lab for Windows," Quick Start, DesignSoft, Inc. © 1990-2002.
"Snap-Master™ for Windows," Snap-Master Utilities, (11 pages).
National Instruments, "LabWindows™ /CVI—Getting Started with LabWindows/CVI," National Instruments Corporation, Part No. 323552A-01, Jun. 2003 Edition.
ErgoTech Systems, Inc., "ErgoVU™: Factory Automation Information HMI Portal/Web Appliance," (1 page).
ErgoTech Systems, Inc., "Virtual Instrumentation Beans™: Java Components for Factory Automation," (1 page).
ErgoTech Systems, Inc., "TransSECS Tech Note: Building a Think & Do™: SECS Equipment Application with TransSECS™," 2001-2002(16 pages).
Argonaut, "Laboratory Operating System Using Camilenet™ Network," Argonaut Technologies, CamileTG® Software, 2003 (2 pages).
Argonaut, "CamileTG® Software," Argonaut Technologies, 2003 (2 pages).
Argonaut, "Computer Controlled Chemistry," Argonaut Technologies, CamileTG® Software, 2003 (1 page).
Argonaut, "Maximize Power with New and MultiApps Functionality and Har Independence," Argonaut Technologies, CamileTG® Software, 2003 (2 pages).
HEM Data Corporation, "Waveform Analyzer," Snap-Master™ for Windows, 2004, (2 pages).
CTC PC-Based Control Technical Brochure, "The Shortest Distance Between Man and Machine," Parker Automation, Mar. 2002 (14 pages).
Parker Automation, "Three Levels of Products," Parker Hannifin Corporation, 2003 (6 pages).
CTC Parker Automation, "Fully Integrate Your HMI and PC-Based Control with Machine Shop™," The Shortest Distance Between Man and Machine, Parker Hannifin Corporation, Aug. 1999 (7 pages).
Parker Automation, "ACR-MotionMax User Interface Manual" Anything Parker Possible™, Version 1.0, Apr. 2004 (76 pages).
"Gedae: Effortless Transition Between Design and Hardware," www.gedae.com 2004 (2 pages).
"MachineLogic Getting Started Guide," Parker Automation-CTC, 2004 (60 pages).
T.K. Barnaby, "An Exploration of the Virtual Instumentation Concept," Thesis presented to the University of Wales, Department of Electrical and Electronic Engineering, Nov. 1983, (59 pages).
SoftWIRE™ "Graphical Programming for Visual Basic," (41 pages).
IPLab™, User's Guide, Signal Analytics Corporation, 1991.
MacGuide Magazine, vol. 2, Issue 4, Stuart Gitlow, M.D., "X-Ray Vision," Jun. 1989, pp. 89-94.
Ric Ford, Optimage processes Scientific Images, 1994.
Signal Analytics Corp., News Release, "Signal Analytics Brings Powerful Scientific Image Processing to the Macintosh II", Feb. 1, 1990 (2 pgs.).
IPLab, "Serious Scientific Image Processing for the Macintosh II", 1992 (4 pgs.).
IPLab, "Gives You Unparalleled Value", 1992, (6 pgs.).
Signal Analytics Corp., "IPLab Brings Affordable Scientific Image Processing to the Macintosh II", estimated 1990 (2 pgs.).
Automatix Inc., "A Seminar on Machine Vision & Image Analysis", 1993, (46 pgs.).
National Instruments, Measurement and Automation Catalogue, Interactive Vision Software, 1999, pp. 518-520.
MacUser, "Ultimage and IPLab Spectrum", Jul. 1991, (5 pgs.).
Advanced Imaging, Special Report: Imaging and the Macintosh/Robust Image Databases, Apr. 1991, pp. 18-32.
"IMAQ Vision Builder Tutorial," National Instruments , Jan. 1999.
Hunt, Neil, "IDF: A graphical datadlow programming language for image processing and computer vision", p. 351-360, IEEE 1990, retrieved from the IEEE database Jan. 7, 2003.
Keddy, W.A., Agathoklis, P., "DEDIP: A user-friendly environment for digital image processing algorithm development", p. 733-736, IEEE 1991, retrieved from the IEEE database Jan. 7, 2003.
Konstantinides, Konstantinos, Rasure, John R., "The Khoros Software Development Environment for Image and Signal Processing", p. 1-14,, 1992, retrieved from http://www.hpl.hp.com/techreports/92/HPL-92-96.pdf on Jan. 7, 2003.
Sim, Young-Seok, Lim, Chae-Seong, Moon, Young-Shik, Park, Sung-Han, "Design and Implementation of the Visual Programming Environment for the Distributed Image Processing", p. 149-152, IEEE 1996, retrieved from IEEE database Jan. 7, 2003.

Baican et al., "Analog Signal Acquisition and Processing by Virtual Instrumentation," Studia Unversitatis Babes-Boyai, Physica, Special Issue 2001, (pp. 303-312).

D. Austin Henderson, "The Trillium User Interface Design Environment," Chi'86 Proceedings, ACM 0-8791-180-6/86/0400-0221, Apr. 1986, (pp. 221-227).

Takigishi et al., "User-Oriented Flexible Operator Station for Distributed Process Control Systems," ISA, 1984, 0-87664-826-X/84/0953-13, (pp. 953-965).

Timothy Miller, "Bit-Mapped Graphics Editor Simplifies High Resolution Display Building," Control Engineering, Apr. 1984, (pp. 111-112).

Arnold R. Miller, "The Programmable Controller Based Distributed Control System," ISA, 1984, 0-87664-826-X/84/01019-14/50, (pp. 1019-1032).

"PCIL Launches Intelligent, easy to use Process Visual Display," Headline News & Products, Jul. 1984, (1 page).

Nages et al., "Rapid Prototyping for the Human/Process Interface," ISA, 1984 0-87664-826-X84/0929-13, (pp. 929-941).

Granieri et al., "An Approach to an Open-Architecture Functional Testing System," CH1921-6/84-0000-0362, 1984 IEEE, (pp. 362-369).

Catalano et al., "The Use of Touchsensitive video displays in on line control systems," CH1897-8/83/0000-0001, 1983 IEEE, (pp. 1-6).

Douglas R. Haroldsen, "Software Package lets PC Control Instruments with a Touch," Personal Computer Series, Electronic Design, Oct. 31, 1984 (pp. 180-192).

Quick Start Guide (32 pages).

"Snap-Master Overview," Data Acquisition, Snap-Master™ for Windows, 2004, (2 pages).

Bhaskar et al., "Visual Instruments: Object Oriented Program Synthesis," OOPSLA '86 Proceedings, Sep. 1986, (pp. 303-314).

HEM Data Corporation, "Data Acquisition," Snap-Master™ for Windows, 2004, (4 pages).

"Agilent VEE Better Tests, Faster," Agilent Technologies, Apr. 1, 2003, (6 pages).

"Agilent Pro 7.0 VEE Better Tests, Faster," Agilent Technologies, 2004, (5 pages).

"Agilent VEE Pro-VEE Pro User's Guide," Agilent Technologies, 2003, (574 pages).

"IMAQ-NI Vision Assistant Tutorial," National Instruments, Part No. 322228D-01, Jun. 2003 Edition.

National Instruments VirtualBench, "Getting Started with VirtualBench," National Instruments Corporation. Part No. 321518E-01, Jan. 2000 Edition.

National Instruments Motion Control, "Motion Assistant™ Help," National Instruments Corporation, Part No. 370462D-01, Feb. 2004 Edition, (73 pages).

* cited by examiner

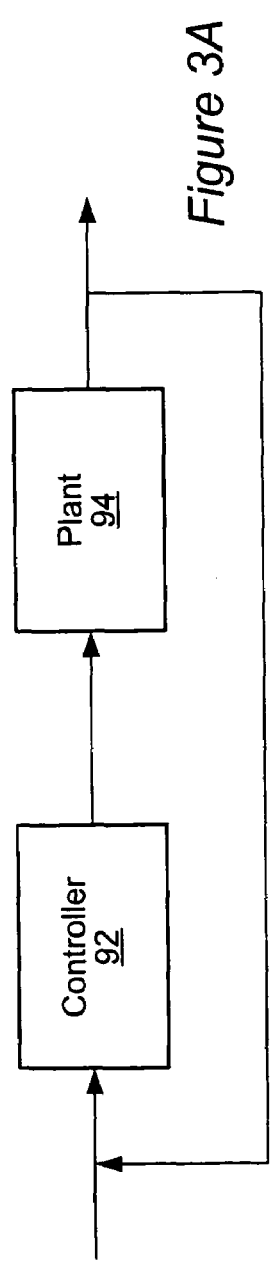
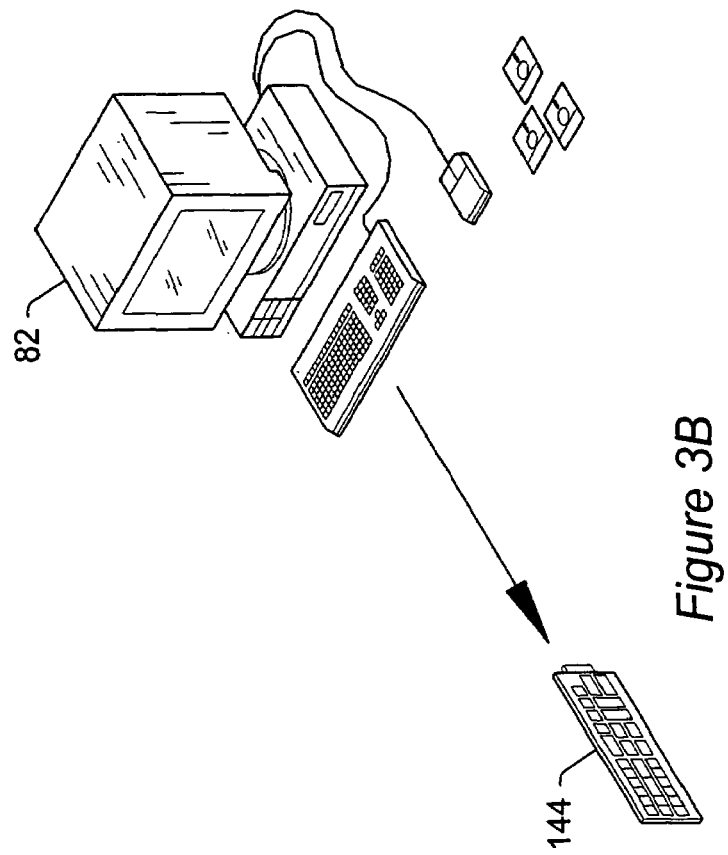
Figure 3A
Figure 3B

SWEEP MANAGER FOR SIGNAL ANALYSIS

PRIORITY DATA

This application claims benefit of priority of U.S. provisional application Ser. No. 60/495,478, titled "Mixed Signal Workbench", filed Aug. 15, 2003, and whose inventors were Michael L. Santori, J. Clinton Fletcher, Alain G. Moriat, Philippe G. Joffrain, Christophe A. Restat, Christopher G. Cifra, John A. Pasquarette, and Richard Keene.

This application also claims benefit of priority of U.S. provisional application Ser. No. 60/496,318, titled "A Mixed Signal Analysis System and Method of Use", filed Aug. 19, 2003, and whose inventors were Michael L. Santori, J. Clinton Fletcher, Alain G. Moriat, Philippe G. Joffrain, Christophe A. Restat, Christopher G. Cifra, John A. Pasquarette, and Richard Keene.

FIELD OF THE INVENTION

The present invention relates to the field of signal analysis, and more particularly to a system and method for interactively specifying and performing signal analysis functions.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, increasingly, much of the instrumentation related to the above fields of application, e.g., test and measurement, data acquisition, process control, etc., has been implemented as virtual instruments (VIs). A virtual instrument is a user-defined measurement and automation system that includes a computer (such as a standard personal computer) or workstation equipped with the application software (such as LabVIEW graphical programs), hardware (such as DAQ boards, or more specialized hardware boards, e.g., oscilloscope boards, arbitrary waveform generator boards, etc.), and driver software. Virtual instrumentation represents a fundamental shift from traditional hardware-centered instrumentation systems to software-centered systems that exploit the computational, display, productivity and connectivity capabilities of computers, networks and the Internet. Because virtual instruments exploit these computation, connectivity, and display capabilities, users can define and change the functionality of their instruments, rather than being restricted by fixed-functions imposed by traditional instrument vendors. Virtual instruments may be used to monitor and control traditional instruments, create computer-based systems that can replace traditional instruments at a lower cost, and develop systems that integrate measurement functionality with industrial automation. Additionally, giving users flexibility to create their own user-defined virtual instruments for an increasing number of applications in a wide variety of industries, and letting users leverage the latest technologies from computers, networking and communications generally shortens system development time and reduces both short-and long-term costs of developing, owning and operating measurement and automation systems, and may generally improve efficiency and precision of applications spanning research, design, production and service.

Virtual instruments may thus effectively replace many traditional standalone hardware-based instruments, such as, for example, oscilloscopes, multi-meters, and so forth. Such virtual instruments provide a number of benefits over their hardware equivalents, such as, for example, lower cost of manufacture and distribution and ease of upgrades, among others. An exemplary virtual instrument system is the National Instruments' LabVIEW system, where, for example, graphical interfaces or "front ends" of various instruments, such as oscilloscopes, multi-meters, and arbitrary waveform generators, execute on a host computer system, often in conjunction with data acquisition (DAQ) hardware or other specialized boards, e.g., oscilloscope boards, multi-meter boards, and arbitrary waveform generator boards, etc., to provide respective functionality traditionally provided by standalone hardware devices. In some virtual instruments, some or all of the instrument functionality is implemented in software and executed on the host computer. Thus, a virtual instrument may be implemented completely in software (e.g., a "softscope"), or may implemented in both software and hardware, in contrast with traditional standalone hardware instruments.

In some signal analysis applications, such as test and measurement, control, simulation, equipment design, etc., numerous instruments may be required to analyze various signals related to the application. The coordinated configuration and use of these instruments to perform the desired tasks of the application generally requires significant effort, e.g., custom programming and/or coordinated configuration of the devices, and thus is often tedious, time-consuming, and error prone. Thus, improved systems and methods for specifying and performing signal analysis functions are desired.

Many applications, e.g., design, test, and measurement applications, involve performing sweeps on one or more parameters, where for each parameter, a series of values are set, and one or more operations performed for each value in iterative fashion. A sweep may be performed over single or multiple parameters, and may include multiple sweeps, e.g., in parallel, nested, or in combination, where at least one of the one or more parameters is varied per iteration. However, current means of specifying and performing sweeps generally require extensive programming and/or configuration, and thus may be complex, tedious, and error prone. Thus, improved systems and methods for specifying and performing sweeps are desired.

SUMMARY OF THE INVENTION

Various embodiments of a system and method for specifying and performing parameter sweeps in a signal analysis system are presented. In many signal analysis applications, e.g., device testing, values of one or more parameters may be varied during iterative performance of a function to characterize a unit under test (UUT) over a range of conditions, referred to as a parameter sweep or simply a sweep. For example, a signal analysis function may include one or more signal operations that may be specified for inclusion in a sweep, i.e., in a sweep loop.

In one embodiment, a graphical user interface (GUI), e.g., a signal analysis function development environment GUI, may be provided that facilitates user specification of a sweep as part of a signal analysis function. The sweep-related functionality described below may be referred to as a sweep manager, where in various embodiments, the sweep manager may include a plurality of dialogs, menus, or other GUI elements, etc., e.g., in the form of a wizard or a graphical application program interface (API), whereby the user may interactively specify (and optionally perform) a sweep. It should be noted that the embodiments described are intended to be exemplary only, and are not intended to limit the sweep manager to any particular functionality or appearance.

Note that the descriptions of the sweep manager presented below are provided in the context of a signal analysis function development environment that includes user selectable (graphical) function blocks representing respective signal analysis operations, where the user successively selects various function blocks to specify or construct a signal analysis function or application. However, it should be noted that other embodiments of the sweep manager are also contemplated, where, for example, the selected signal operations may not be represented by function blocks.

Thus, a plurality of function blocks may be provided (by the development environment) for use in specifying and performing a signal analysis function, e.g., utilizing a plurality of instruments. In one embodiment, each function block may include: a function block icon operable to be displayed in the GUI of the signal analysis function development environment, where the function block icon visually indicates a respective signal operation, and a set of program instructions associated with the function icon, where the set of program instructions are executable to perform the respective signal operation, possibly in conjunction with associated hardware.

In a preferred embodiment, each function block is selectable from the plurality of function blocks by a user for inclusion in a set of function blocks, where each function block operates to perform the respective signal operation continuously upon being selected. Each function block may be operable to provide a respective output based on the respective signal operation, where the respective output is operable to be displayed in the GUI, provided as input to one or more other ones of the set of function blocks, and/or exported to an external device. The set of function blocks may be executable to perform the signal analysis function under the signal analysis function development environment using one or more of the plurality of instruments. Signal operations may be organized by function categories, such as (but not limited to): Create, I/O, Conditioning, Measurement, Processing, File, Test, and Conversion, among others. Examples of function blocks include, but are not limited to, a Basic Function function block, operable to generate data for a simple signal function, a Filter function block, operable to filter a received signal, and a DC-RMS function block, operable to compute a Direct Current Root Mean Square value of a received signal. Note that these function blocks are exemplary only, and are not intended to limit the types of function blocks used by the system.

Thus, each function block may be selectable from the plurality of function blocks by a user for inclusion in a set of function blocks, where each function block operates to perform the respective signal operation continuously upon being selected. For example, the user may select a first function block from a palette, menu, etc., in response to which the respective signal operation may be performed, preferably executing in a continuous manner until, for example, a stopping condition occurs or the user pauses or terminates the process. The user may then select one or more additional function blocks, which may similarly begin continuous respective operations in conjunction with the first function block.

In one embodiment, each function block may include an input and an output, where the input is operable to receive signals from one or more of: an external signal source, a file, and/or another function block, and where the output is operable to send resultant signals to one or more of: a display of the GUI, an external device, a file, and/or another, different, function block. Note that the input signals may also be displayed in the GUI as desired. Thus, each function block may generate a respective output that may be used as input to or by other function blocks in the set of function blocks, transmitted to an external device coupled to the host computer, and/or displayed in a display tool, i.e., a graph or table, in the GUI. Once the user has selected the set of function blocks, the set of function blocks may be executable to perform the signal analysis function under the signal analysis function development environment using one or more of the plurality of instruments.

In one embodiment, the set of function blocks may be displayed in a diagram, e.g., in a specified display area of the GUI. The diagram may include one or more of: a linear sequence, a data flow diagram, a tree diagram, and a dependency diagram, among other types of diagram. The diagram may substantially visually represent I/O relationships between the function blocks. For example, where output from a first function block is provided as input to a second function block, this relationship may be graphically represented in the diagram, e.g., via a data flow line from the first function block to the second function block, via I/O signal icons displayed in, on, or proximate to each function block icon, and/or by the relative positions of the function blocks, and so forth. In one embodiment, when the I/O relationships between the function blocks change, the diagram may be automatically updated in accordance with the changed I/O relationships between the function blocks. In one embodiment, the diagram may include one or more control structures, e.g., conditional branching and/or looping, etc., where the one or more control structures control execution of the set of function blocks. Thus, the diagram may comprise or visually represent a script (or equivalent) that is executable to perform the specified signal analysis function under the development environment. In one embodiment, one or more of the function blocks may be specified for inclusion in a sweep, as described below.

One embodiment of a computer-implemented method for specifying and performing a sweep, e.g., in a signal analysis function may operate as follows:

First user input indicating a parameter for a first operation may be received, where the operation implements at least a portion of a signal analysis function. Receiving the first user input indicating the parameter for the first operation may be performed in a variety of different ways. For example, the user may provide the name of the parameter (and/or the first operation) to a text entry field, or may invoke display of parameters for the first operation, and select the desired parameter, e.g., with a pointing device, such as a mouse. Other means of receiving user input indicating the parameter are also contemplated.

In one embodiment, a GUI may operate to display the parameters (e.g., sweepable parameters) of the first operation, and may further operate to receive the first user input indicating the parameter to be swept on. The GUI may be invoked by any of various means, e.g., by right-clicking on the function block of the first operation (for example, a Basic Function function block) to invoke an options menu, and selecting a "Sweep Manager" option (or equivalent). As another example, the user may invoke the sweep manager from a menu in the development environment, and provide input indicating the first operation and/or the parameter. Other means of invoking the GUI are also contemplated.

The GUI preferably includes a display of sweepable parameters for the first operation. In one embodiment, a dialog including a tree diagram may be provided for displaying the parameters, where the parameters are each selectable with a pointing device, e.g., a mouse. Thus, the GUI may receive the user input indicating the parameter. In one embodiment, an indication that the parameter has been selected may be provided by the GUI. For example, in one embodiment the name of the selected parameter may be highlighted, as is well known in the art. In the embodiment, "Back", "Next", "Finish", and "Cancel" buttons may be provided for navigating through the sweep specification process. In other words, as noted above, the GUI may be in the form of a wizard, whereby the user is guided through the sweep specification process via a plurality (sequence) of dialogs or panels.

The first operation may then be programmatically or automatically included in a sweep loop. In other words, the operation corresponding to the selected parameter may be included in the sweep, such that when the signal analysis function is performed, the first operation may be executed in the sweep, where the first operation is performed iteratively as the parameter is varied. Note that the first operation may be included in the sweep loop programmatically because when the user indicates the parameter to be swept on, the system (e.g., the development environment) can determine the operation to which the parameter belongs or corresponds, and thus can automatically include the operation in the sweep loop.

Second user input specifying a sweep configuration for a sweep on the indicated parameter may be received. In other words, the user may provide input configuring the sweep, e.g., via one or more dialogs, wizard, etc. For example, in one embodiment, specifying the sweep configuration may include specifying one or more of: a range of values for the indicated parameter, a number of iterations for the sweep (i.e., the number of values of the parameter or data points used in the sweep), an interpolation type, a step size for the sweep on the indicated parameter, one or more specific values in the range of values for the parameter; and a source for at least a portion of the sweep configuration, e.g., a file or user input. Note that some of these configuration parameters are redundant, e.g., the step size may be computed from the range and the number of points or values of the parameters (increments), assuming equal increments in the value.

In one embodiment, another dialog of the GUI mentioned above may be displayed, whereby the user may view and set values of configuration parameters specifying the sweep. For example, GUI elements may be provided for entry and display of interpolation type (e.g., "exponential"), start and stop values for the parameter indicating the parameter range for the sweep, and a value for the number of points (i.e., the number of values of the parameter) for the parameter sweep. Note that the number of points for the parameter sweep generally corresponds to the number of iterations of the sweep over that parameter, although in nested sweeps involving multiple parameters, described in more detail below, the sweep may include multiple passes through the range of a given parameter, and so the total number of iterations in the sweep may be greater than the number of data values for that parameter. In one embodiment, the user may provide a file name, e.g., a sweep file, which the system may use to access sweep configuration information stored in the file, and thus configure the sweep.

In one embodiment, the sweep values may be calculated based on the range provided by the user. However, in some cases, the user may wish to set or edit one or more of the calculated values "by hand", i.e., manually. For example, if the sweep is over a parameter on a hardware device, it may be that one or more of the calculated values may not be valid for that device, i.e., may not be allowable values according to the specification of the device. Allowing the user to manually edit a value may obviate having the calculated values be coerced at runtime by the application (i.e., the signal analysis function). Thus, in one embodiment, the GUI may include an "Edit Individual Sweep Values" field (or equivalent) whereby the user may indicate that individual parameter values in the parameter range are to be modified manually.

In one embodiment, a dialog or panel (or other GUI element) may be provided (e.g., invocable by the user) whereby the user may manually modify specific values in the range of values for the parameter. For example, the user may simply type in a new value in a display/edit field for a point or parameter value, and so modify the relevant point or value.

In one embodiment, specifying a sweep configuration may include specifying resultant data from the sweep. In other words, the user may specify output or results for the sweep, e.g., data that may be collected or accumulated and saved during the sweep, e.g., for each iteration of the sweep. For example, a dialog may be presented that displays selectable outputs for the sweep, e.g., outputs corresponding to one or more of the signal operations (function blocks) included in the signal analysis function.

In one embodiment, the sweep functionality may be represented by a sweep function block. The sweep function block may be invoked and included in a function block diagram as described above. The function block (the sweep function block) may have corresponding configuration dialogs (or equivalents) that the user may invoke to display and/or edit parameters associated with the function block. For example, in one embodiment, configuration dialogs may be displayed for specifying or configuring the sweep function block, including GUI elements for displaying, setting, selecting, and editing sweepable parameters, interpolation type, parameter range, and a configuration file, similar to the wizard dialog described above. In some embodiments, the GUI may also include a graphical display area where, for example, the specified sweep points (data values for the parameter to be used in the sweep) may be displayed, either graphically, or alternatively, in tabular form.

For example, the user may select "frequency (Hz) (Basic Function)" as the parameter to sweep on. The user may then press an "Add" button (or equivalent), thereby specifying that parameter for the sweep. To specify a sweep over multiple parameters, e.g., in a parallel sweep, the user may select additional parameters to be swept on, e.g., pressing the "Add" button for each selected parameter. Given the selected parameter (e.g., frequency), the method may automatically determine the corresponding function block (e.g., the Basic Function function block), and add that function block to the sweep loop. The method may then create an output to the sweep function block and associate that output with the parameter being swept. Then, when executing (at runtime), the Basic Function function block knows to use the latest sweep value for that parameter (e.g., frequency) provided by the sweep block, rather than the value for the parameter received from its configuration dialog.

In a preferred embodiment, the signal analysis function may include a plurality of operations, where, for example, the first operation may have dependencies on one or more others of the plurality of operations. In one embodiment, one or more other operations of the plurality of operations may be determined for inclusion in the sweep loop, where performing the sweep on the indicated parameter further includes performing the one or more other operations (included in the sweep loop). In one embodiment, determining the one or more other operations of the plurality of operations for inclusion in the sweep loop may include receiving third user input indicating the one or more other operations of the plurality of operations for inclusion in the sweep loop, and programmatically including the one or more other operations in the sweep loop.

In one embodiment, determining the one or more other operations of the plurality of operations for inclusion in the sweep loop may include programmatically analyzing dependencies among prior operations and the first operation to determine the one or more other operations, where the first operation has a dependency on at least one of the one or more other operations, and programmatically including the one or more other operations in the sweep loop. In one embodiment, an "Add/Remove" GUI element (or equivalent) may be provided for manually adding and removing function blocks from the sweep loop.

In a preferred embodiment, the method may include graphically indicating in the diagram which of the corresponding function blocks are included in the sweep. For example, in one embodiment, the sweep function block may be placed in the diagram at the beginning of the function blocks included in the sweep loop, and the diagram may include a graphical loop indicator drawn around the included function blocks, indicating the function blocks to be included in the sweep.

In various embodiments, the user may specify a single parameter sweep, a parallel sweep, and/or a nested sweep, i.e., a sweep within a sweep. A single parameter sweep is simply a sweep over a single parameter, as described above. A parallel sweep, also referred to as a diagonal sweep, refers to a sweep in which multiple parameters are varied in parallel (where the numbers of points for each parameter are preferably equal), i.e., all of the swept parameters are varied in tandem. It should be noted that a parallel sweep may involve multiple parameters from a single function block, single parameters from a plurality of function blocks, or a combination of the two. Similarly, multiple outputs (resultant data) may also be specified, i.e., a plurality of outputs may be collected over the same sweep run. A nested sweep involves multiple sweeps in a hierarchy, where the sweeps may be single parameter sweeps and/or parallel sweeps. Note that in one embodiment, in the case of nested sweeps, multiple sweep blocks may be included in the diagram, e.g., a respective sweep block per sweep.

Thus, receiving first user input indicating the parameter for the first operation further may include receiving further first user input indicating one or more additional parameters for the first operation, where the parameter and the one or more additional parameters include a plurality of parameters. Similarly, receiving the second user input specifying a sweep configuration for a sweep on the indicated parameter may further include specifying the sweep configuration for a sweep on the indicated one or more additional parameters.

In one embodiment, information specifying the plurality of operations included in the signal analysis function may be stored, where the information specifying the plurality of operations is executable in the signal analysis function development environment to perform the signal analysis function. For example, the information may include a script or equivalent that may be executed in the development environment. In another embodiment, a graphical program implementing the signal analysis function may be programmatically generated based on the stored information, where the graphical program is executable to perform the signal analysis function, i.e. independent of the development environment, as described in detail above.

The sweep may be performed on the indicated parameter in accordance with the sweep configuration, thereby generating resultant data for the sweep. The resultant data from the sweep may be any type of data that relates to the signals being generated, acquired, and/or analyzed, examples of which are described above. For example, in various embodiments, the resultant data may include signal data in the form of a signal plot, tabular data, and so forth.

In one embodiment, where the GUI includes a sweep configuration dialog corresponding to the sweep configuration, and where the configuration dialog includes one or more GUI elements indicating the sweep configuration, the method may also include receiving third user input to the configuration dialog modifying the sweep configuration, thereby generating a modified sweep configuration. Performing the sweep on the indicated parameter in accordance with the sweep configuration may then include performing the sweep on the indicated parameter in accordance with the modified sweep configuration.

In one embodiment, the sweep configuration dialog (or equivalent) may be invoked or displayed during run-time, i.e., while the sweep is being performed. In other words, in one embodiment, the sweep configuration may be modified during the sweep, i.e., dynamically, such that the remainder of the sweep is performed in accordance with the modified sweep configuration.

Finally, the resultant data for the sweep may be stored, and may optionally be displayed on a display, e.g., in a display of the GUI. In one embodiment, the resultant data may be stored on the host computer system and/or transmitted to another device coupled to the host system.

Thus, in various embodiments, a Graphical User Interface (GUI) may be displayed on the display, where receiving the first input and receiving the second input may include receiving the first and second inputs to the GUI. As described above, in one embodiment, the GUI includes a wizard, e.g., a sweep wizard, where displaying the GUI may include displaying a sequence of dialogs to interactively guide the user in specifying the sweep. As also described above, in one embodiment, the GUI may include one or more configuration dialogs corresponding to the first operation, whereby the user may specify the sweep. In a preferred embodiment, the GUI may be included in a signal analysis function development environment, such as described herein.

Thus, the method may include displaying the GUI on the display, receiving the first and second inputs to the GUI, and displaying the resultant data for the sweep in the GUI.

Performing the sweep on the indicated parameter in accordance with the sweep configuration may include iteratively performing the first operation, where at each iteration the first operation is performed using a respective value of the parameter, and where at each iteration corresponding resultant data are generated. In one embodiment, performing the first operation may include performing the first operation using a hardware device, where iteratively performing the first operation may include triggering the hardware device at each iteration.

For example, an arbitrary waveform generator (hardware device) may be triggered each iteration to provide a stimulus signal to a filter, where the parameters determining the filtering attributes are varied for each iteration, and a corresponding output waveform generated (for each iteration). The output waveforms may all be plotted on a graph, e.g., overlaid on a 2D plot, or presented in a 3D graph, where the succession of waveforms generated by the sweep form a surface. In one embodiment, the resultant data for each iteration of the sweep may be displayed in real-time, i.e., as it is generated, such that an animated display of results is presented to the user as the sweep executes.

Thus, various embodiments of the systems and methods described herein may facilitate rapid (and relatively easy) specification and performance of sweeps in a signal analysis functions, where the sweep may be over single parameter and/or multiple parameters, and where the sweep may be a parallel sweep, a nested sweep, or a combination of both.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize programs according to embodiments of the invention;

FIG. 3B illustrates an exemplary system that may perform control and/or simulation functions;

Figure 1A:
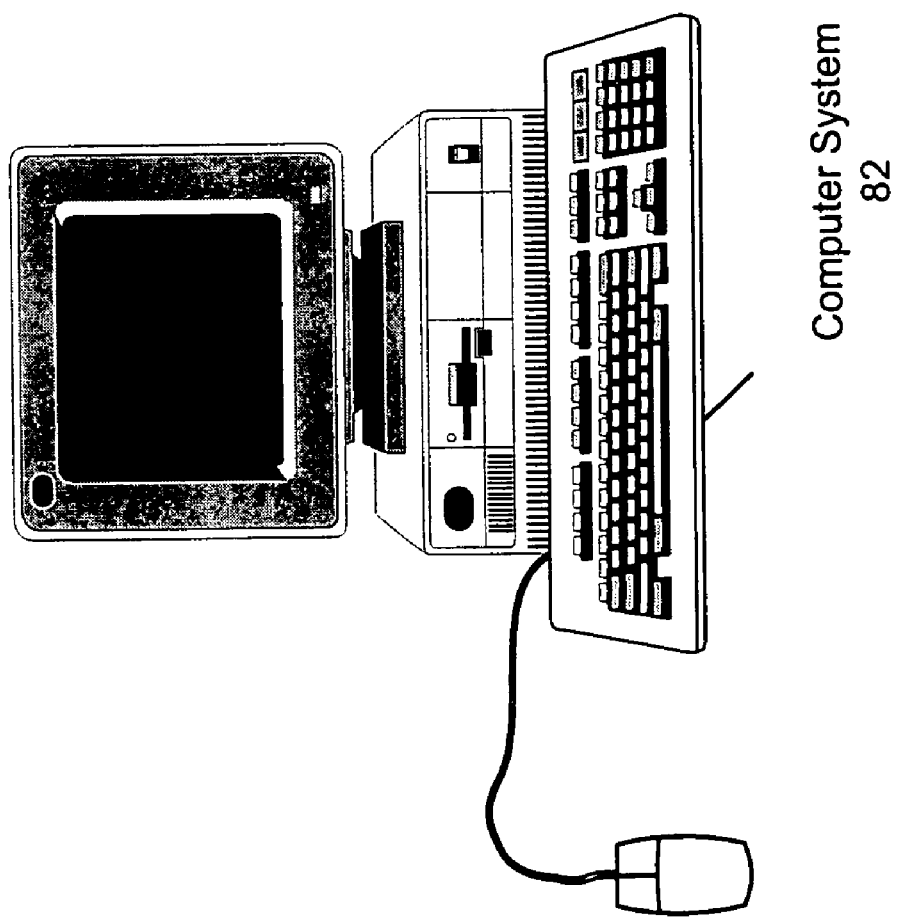
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. provisional application Ser. No. 60/495,478, titled "Mixed Signal Workbench", filed Aug. 15, 2003.

U.S. provisional application Ser. No. 60/496,318, titled "A Mixed Signal Analysis System and Method of Use", filed Aug. 19, 2003.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/886,496, titled "System and Method for Programmatically Creating Graphical Program Code in a Graphical Program", filed Jun. 20, 2001.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response. A measurement device may further be operable to perform modeling or simulation functions, e.g., for use in design or testing procedures.

FIG. 1A—Computer System

FIG. 1A illustrates a computer system 82 operable to execute software programs according to various embodiments of the present invention. Various embodiments of a method for specifying and performing a signal analysis function are described below. It should be noted that as used herein, the term "signal analysis function" refers to any type of function that relates to the generation, acquisition, and/or analysis of signals, e.g., for measurement, testing, control, simulation or modeling, design, prototyping, and so forth.

As shown in FIG. 1A, the computer system 82 may include a display device operable to display signal analysis results as the signal analysis function is created and/or executed. The display device may also be operable to display a graphical user interface during execution of the program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., graphical programs, which are executable to perform the methods described herein. For example, the memory medium may store one or more software programs implementing a signal analysis function development environment, described below in detail, which may facilitate interactive specification, development, and execution of signal analysis functions. More specifically, the signal analysis function development environment may provide an integrated interface for a plurality of instruments for signal analysis, described below. Also, the memory medium may store a graphical programming environment used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
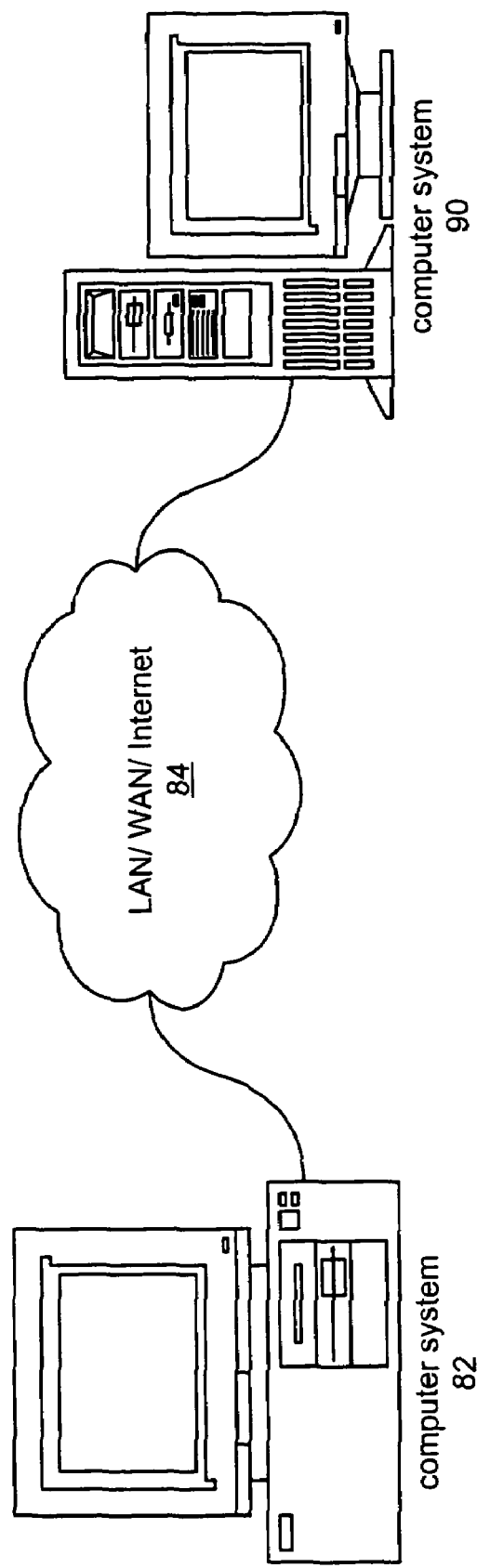
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where embodiments of the present invention may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc. In other words, various embodiments of the present invention are contemplated for use in any field of application where signals are analyzed.

Figure 2A:
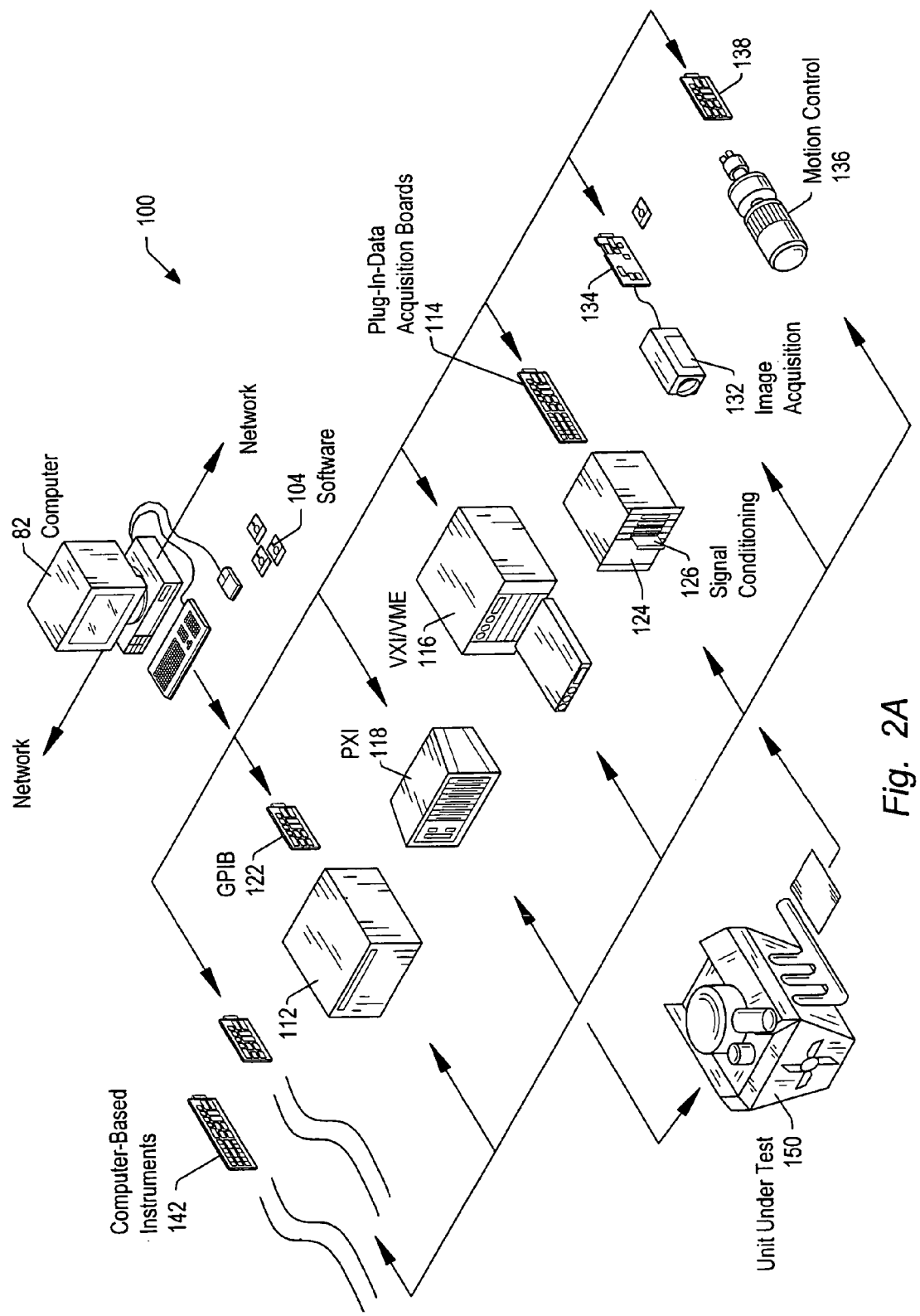
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150. As will be described in detail below, in a preferred embodiment, the computer 82 may execute software that utilizes various virtual instruments (VIs), possibly in conjunction with hardware devices (e.g., boards) and/or instruments coupled to the computer, to analyze signals related to an application, device, or phenomenon.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation or modeling application, or a hardware-in-the-loop validation application, among others.

Figure 2B:
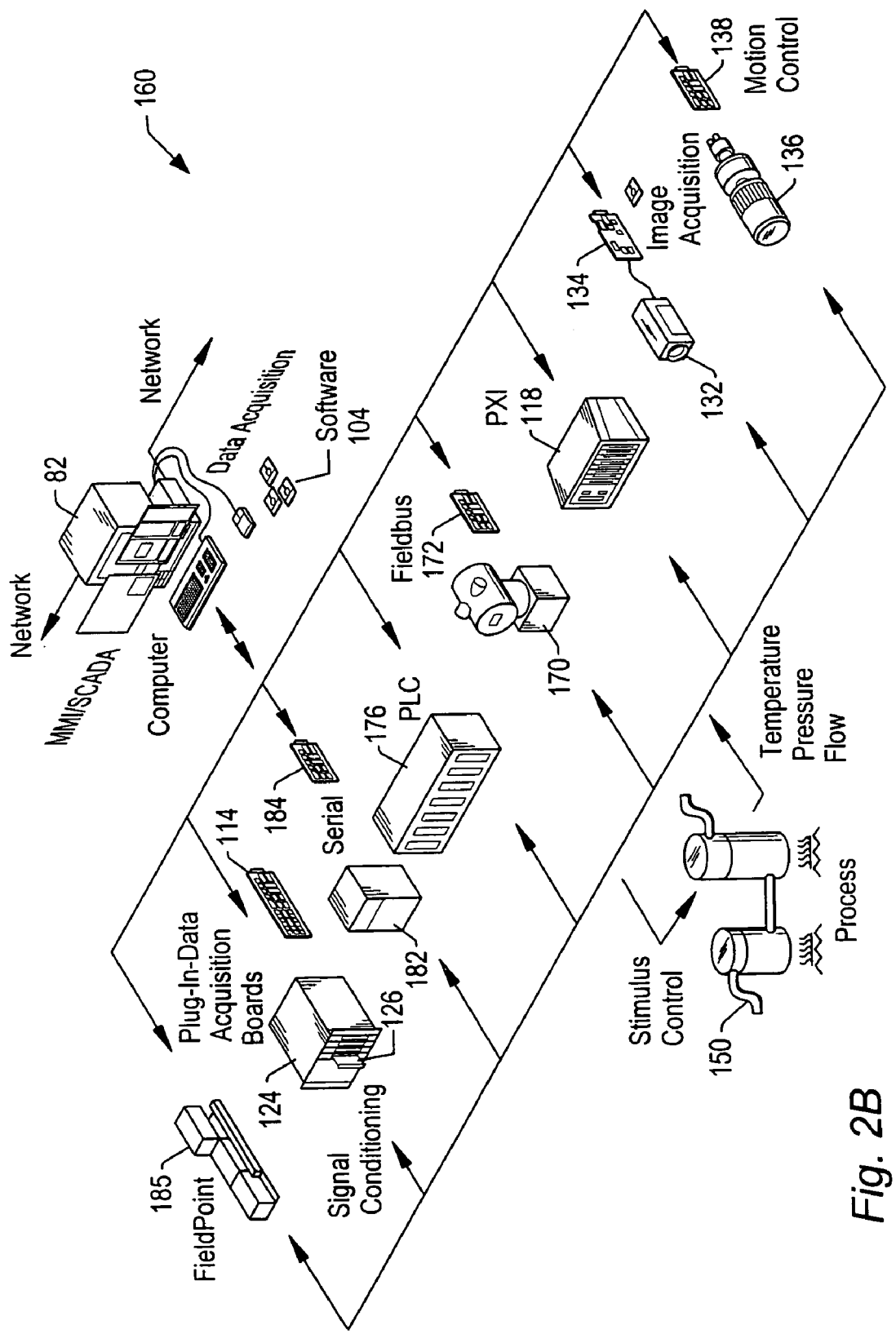
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize programs, e.g., graphical programs, according to various embodiments of the present invention. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92. The user may then specify and/or execute a signal analysis function to perform various tests and measurements (analyses) on the model, the controller 92, and/or the plant 94, e.g., via one or more software programs implementing various embodiments of the present invention, e.g., via a signal analysis function development environment, described below in detail, which may facilitate interactive specification, development, and execution of signal analysis functions.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may also be referred to as virtual instruments, although as described above, in many cases the software programs may operate in conjunction with hardware, such as DAQ boards or other specialized hardware boards. For example, in one embodiment, one or more of the virtual instruments included in the system may include respective hardware boards that provide hardware based functionality for the virtual instrument. In various embodiments, the boards may be one or both of: a PC expansion board installed in the host computer system, e.g., a PCI card or other type of card; and a card, module, or cartridge that is operable to be inserted into a chassis coupled to the host computer, such as a PXI or GPIB chassis. Of course, any other types of chassis and boards may be used as desired. Such virtual instruments may be used in various embodiments of the present invention to perform signal analysis functions, as described below.

Figure 4:
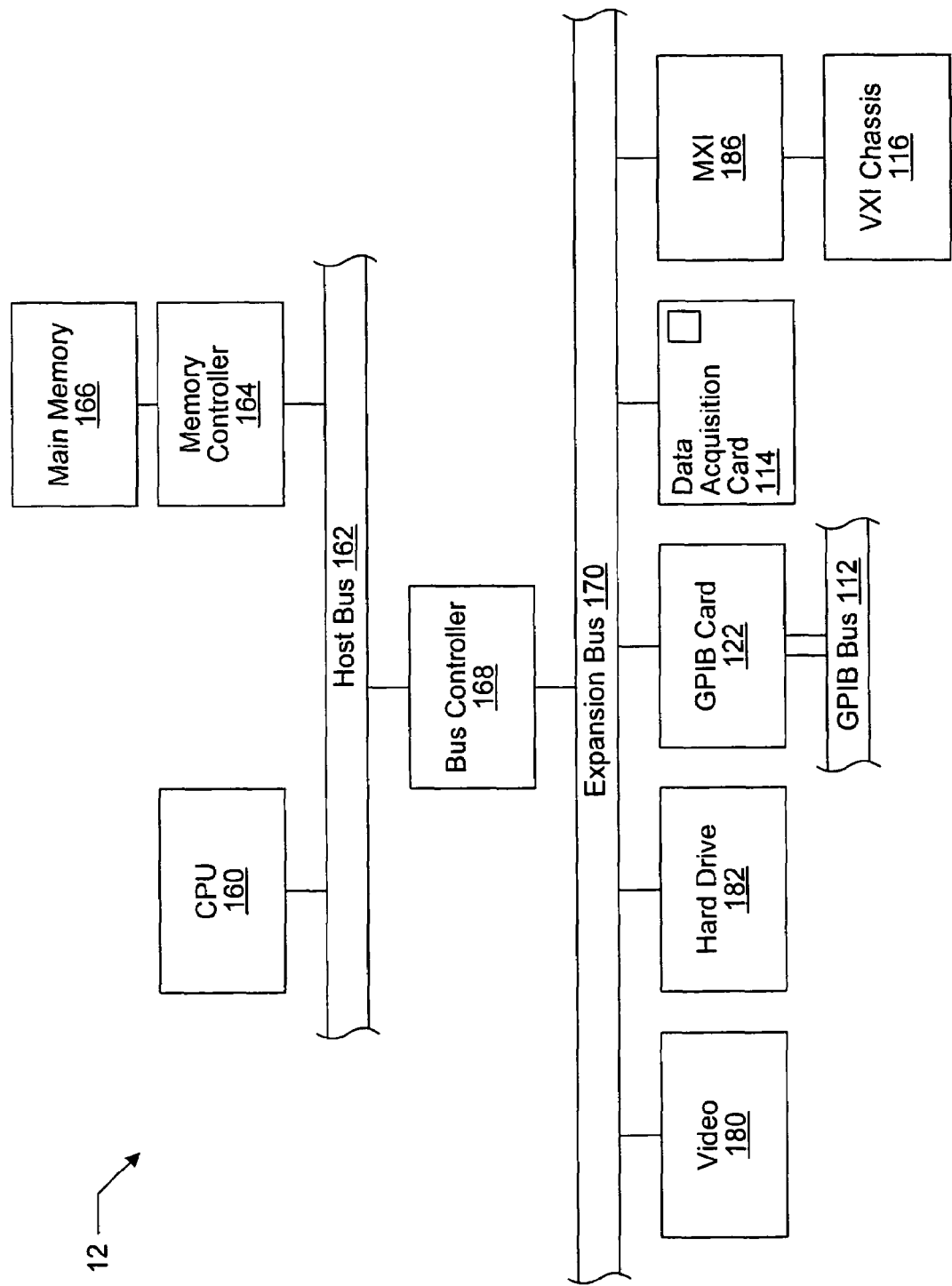
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more software programs implementing various embodiments of the present invention. For example, the main memory 166 may store a signal analysis function development environment, described below in detail, which may facilitate interactive specification, development, and execution of signal analysis functions. More specifically, the signal analysis function development environment may provide an integrated interface for a plurality of instruments for signal analysis, described below. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
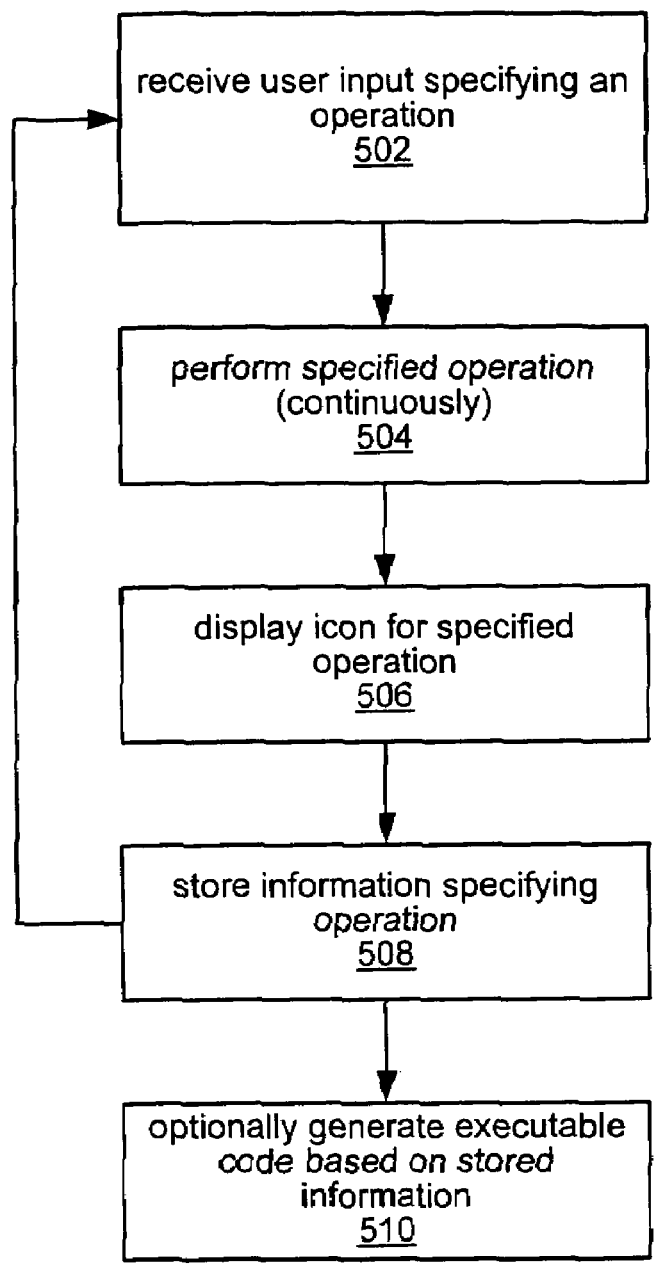
FIG. 5 is a flowchart diagram illustrating one embodiment of a method for specifying a signal analysis function.

FIG. 5—Flowchart of a Method for Specifying a Signal Analysis Function

FIG. 5 illustrates a method for interactively specifying a signal analysis function. The method shown in FIG. 5 may be used in conjunction with any of the computer systems or devices shown in the above Figures, among other devices. It should be noted that in various embodiments, some of the steps shown may be performed concurrently, in a different order than shown, or omitted. Additional steps may also be performed as desired. As shown, this method may operate as follows.

First, in 502, user input may be received specifying an operation, where the operation implements at least a portion of a signal analysis function. For example, in a preferred embodiment, the user input may be received to a graphical user interface (GUI) of a signal analysis function development environment, which, as noted above, may facilitate interactive specification, development, and execution of signal analysis functions. More specifically, the signal analysis function development environment may provide an integrated graphical interface for a plurality of instruments for signal analysis, examples of which are provided below with reference to FIGS. 6 and 8A-8I. As mentioned above, the signal analysis function development environment executes on a computer system that includes a display, i.e., a display device, such as a computer monitor, which operates to display the GUI. The GUI preferably includes a display window or panel for displaying signals and signal analysis results (from the operations). Various examples of operations for signal analysis are provided below.

The user may specify the operation in any of a variety of ways. For example, in one embodiment the user may select (e.g., with a pointing device, such as a mouse) the operation from a menu. For example, a menu of selectable operations may be provided by the signal analysis function development environment, e.g., from a menu bar. In one embodiment, the menu may be invoked from a graphical signal display of the signal analysis function development environment. For example, one or more signals (signal plots), e.g., generated by prior operations, may be displayed in a display window. The user may select a signal (or multiple signals) from the display, e.g., by clicking on the signal plot or a symbol for the signal in a plot legend of the display, upon which the menu may be presented. The user may then select the desired operation from the menu.

In another embodiment the user may select the operation from a palette of function icons, where each function icon represents a respective operation. For example, the user may double click on the icon for the operation, thereby invoking a configuration GUI for the operation through which the user may provide input configuring the operation. As another example, the user may "drag and drop" the icon from the palette onto a diagram, active window, and/or another icon. In one embodiment, each function icon may be associated with or comprised in a respective function block, described below in detail. Similar to above, in one embodiment, the palette may be displayed in response to user input selecting a signal plot or signal icon from a display tool, e.g., a graphical display, of the signal analysis function development environment.

Thus, in one embodiment, user input may be received to the graph (or other display tool) indicating one or more signals displayed in the graph. One or more operation options may then be presented in response, and user input received selecting an operation option from the provided one or more operation options, where the selected operation option indicates an operation to be performed on the indicated one or more signals. In a preferred embodiment, the one or more operation options presented to the user include only operation options appropriate for the selected one or more signals. In other words, the method may use information related to the signals (and optionally, information related to previously specified operations) to filter or otherwise limit the operation options presented to the user. For example, if the graph included a power spectrum for a signal, and the power spectrum plot or icon were selected to invoke the operation options, only those operations suitable for application to a power spectrum may be presented, e.g., determining a strongest frequency, average power, etc.

Thus, in one embodiment, receiving user input specifying an operation may include: receiving user input to the graph indicating one or more signals displayed in the graph, and further receiving user input associating the one or more signals with a first icon of the plurality of icons displayed on the display, where after said associating, the operation represented by the first icon may be performed on the one or more signals.

It is noted that other methods of selecting the operation are also contemplated, such as, for example, the user entering the name of the desired operation into a text entry field, although graphical selection methods are preferred.

Signal Operations

The selectable operations mentioned above may include any type of operation related to signals. For example, the operations contemplated may include: generating one or more signals, e.g., by reading one or more signals from a file, and/or synthesizing one or more signals algorithmically; receiving one or more signals from an external source; sending one or more signals to an external system; analyzing one or more signals and generating results based on the analysis; displaying one or more signals; displaying results of another operation; processing one or more signals, thereby generating one or more modified signals; and storing one or more signals, among others. In other words, the operations may include signal generation, acquisition, analysis, processing, storage, import, export, or transmission, among others. A more detailed list of signal operations is provided below.

Additionally, the operations may utilize various instruments to perform their respective functionalities. As mentioned above, in a preferred embodiment, the signal analysis function development environment provides an integrated interface to a plurality of instruments, where the instruments may include virtual instruments (which may or may not include respective hardware boards), and optionally, standalone hardware instruments. For example, receiving one or more signals from an external source may include receiving one or more signals from a hardware device over a transmission medium and/or from a simulation. As another example, a first operation may generate a test signal, e.g., via a virtual arbitrary waveform generator, and export the signal to an external hardware device, such as a filter. The filter may process (filter) the signal and a resultant (filtered) signal may be received by a second operation, e.g., a virtual oscilloscope, which may then display the resultant signal, e.g., compared with the original test signal. Note that the virtual arbitrary waveform generator and/or the virtual oscilloscope may be implemented solely in software, or may be include both software and a hardware board. Examples of hardware boards contemplated for use in preferred embodiments of the present invention include: an E Series Multifunction DAQ (E-MIO), a High Speed Digitizer (Scope), and a Signal Sources (Arbitrary Waveform & Function Generators), as provided by National Instruments Corporation. In further embodiments, the hardware boards may include one or more of: an S Series Multifunction DAQ (S-MIO) board, a High-Speed Digital (DIO) board, and a Digital Multimeter (DMM) board, among others.

Thus, the instruments to which access may be provided by the signal analysis function development environment may include virtual instruments, such as a DAQ (data acquisition) device, a digitizer, an arbitrary waveform generator (arb), a digital I/O device, and a digital multimeter, among others, some of which may include corresponding hardware, such as a DAQ board, scope (digitizer) board, an arb board, a digital I/O board, and a digital multimeter board, etc., as described above, and may optionally also include at least one standalone hardware-based instrument, such as, for example, a standalone oscilloscope, multi-meter, waveform generator, hardware filter, etc.

Thus, the signal analysis function development environment may provide access to a plurality of instruments, where the plurality of instruments includes two or more virtual instruments, and may optionally include one or more standalone hardware devices.

In 504, the operation may be performed in response to the specifying of 502. The operation is preferably performed utilizing at least one of the plurality of instruments to perform the operation. Generally the performance of the operation results in some form of output, such as, for example, signal data (a signal) or other resultant data that may then be displayed in a display tool of the GUI, e.g., in a graph (e.g., for signal plots) or in a table (e.g., for tabular scalar data). Examples of signal data displays are provided below with reference to FIGS. 8A-8I. It should be noted that other types of data displays are also contemplated, including, for example, histograms and 3D plots, among others.

It should be further noted that in a preferred embodiment, one or more input signals for the operation may be displayed. More generally, as described below, in a preferred embodiment, the signal analysis function may include a plurality of operations, each of which may include one or more input signals and/or one or more output signals, and so the method may include displaying any of the input and/or output signals, as desired.

In 506, an icon may be displayed on the display in response to the specifying of 502, where the icon comprises a graphical representation of the operation, and where the icon is displayed upon the specifying. In other words, once the operation is specified in 502, the corresponding icon for the operation is displayed.

In 508, information specifying the operation may be stored. For example, the information may be stored in a data structure, such as a file, or transmitted to another system for storage.

In a preferred embodiment, the steps of 502-508 may be repeated a plurality of times to specify the signal analysis function, as indicated in FIG. 5. In other words, the user may interactively specify a plurality of operations, thereby invoking performance of each operation upon its invocation and display of the icon corresponding to the operation. In a preferred embodiment, the operations in the signal analysis function include at least one of 1) generating signals displayed in a graph, and 2) modifying one or more signals displayed in the graph. In another embodiment, the operations in the signal analysis function may also include 3) producing an output based on one or more signals displayed in the graph and/or 4) exporting a signal. Of course, in various embodiments, other display tools than graphs may be used, such as tables for displaying tabular signal data.

In other embodiments, the operations in the signal analysis function may include any or all of the signal operations described above in the Signal Operations section. It should be noted that after each respective operation is specified, the operation is preferably continuously performed during the repeating. In other words, once an operation has been specified, the operation executes in a substantially continuous fashion until removed from the signal analysis function or until the signal analysis function is terminated or paused. Note that in general, the signal operations typically relate to one or more of signal generation, signal acquisition, and signal processing or analysis, although other operations are also contemplated.

In one embodiment, as a result of said repeating, a plurality of icons are displayed on the display representing a plurality of operations, where the plurality of icons are arranged to visually indicate the signal analysis function. In other words, in one embodiment, a diagram including the icons of the specified operations is displayed, where the diagram visually indicates the functionality of the signal analysis function. In various embodiments, the diagram may be one or more of: a linear sequence, a data flow diagram, a tree diagram, and a dependency diagram. Additionally, in a preferred embodiment, repeating the steps above produces a set of stored information representing the plurality of operations in the signal analysis function. In a preferred embodiment, the stored information corresponds to the diagram.

As mentioned above, the method described above is preferably performed by program instructions executing under a signal analysis function development environment. In one embodiment, the set of stored information specifying the plurality of operations is executable in the signal analysis function development environment to perform the signal analysis function. Thus, in one embodiment, the program instructions (executing under the signal analysis function development environment) are further executable to implement executing the set of stored information to perform the signal analysis function. For example, in one embodiment, the set of stored information may comprise a script which is executable under the signal analysis function development environment to perform the signal analysis function.

As FIG. 5 shows, in 510, the method may optionally generate a program, i.e., executable code, based on the set of stored information, where the generated program implements the signal analysis function, and is executable to perform the signal analysis function. Further details of the programmatic generation of the program are provided below in the section titled Code Generation.

Thus, the specification of the plurality of operations produces the signal analysis function, where the signal analysis function utilizes at least a first plurality of the plurality of instruments, and where the plurality of instruments comprises two or more virtual instruments (VIs). Thus, the memory medium of the host computer may store a plurality of virtual instruments, where each of the virtual instruments is executable on the computer system to implement an instrument function, and where the plurality of operations utilize two or more different ones of the plurality of virtual instruments. For example, in one embodiment, the plurality of virtual instruments may include a signal generator VI, an oscilloscope VI, and a multimeter VI. As noted above, in one embodiment, at least a portion of the plurality of virtual instruments operate in conjunction with respective hardware boards. For example, an oscilloscope VI may include an oscilloscope card (board) that provides hardware for at least a portion of the oscilloscope functionality of the VI.

As also noted above, the plurality of instruments may optionally further include at least one standalone hardware device (instrument). In other words, in addition to the virtual instruments, in some embodiments, the computer may also be coupled to one or more standalone hardware based instruments, such as, for example, a standalone oscilloscope, multimeter, waveform generator, hardware filter, etc., where one or more of the specified operations may be operable to receive signals from, or provide signals to, one or more of the standalone instruments.

In one embodiment, the method may further include specifying a relationship between a first icon and a second icon, thereby specifying a relationship between a first operation and a second operation, where specifying the relationship between the first icon and the second icon includes specifying that data produced by the first operation is used by the second operation. For example, in one embodiment, the relationship may be specified in response to user input indicating the relationship, e.g., user input indicating, say, that the output of the first operation is provided as input for the second operation, e.g., via drag and drop techniques, the user drawing "wires" between the two icons, right-clicking on an icon and invoking a menu whereby the relationship is specified by user selection, etc.

In another embodiment, the relationship may be performed programmatically, e.g., automatically. For example, in one embodiment, when an operation is specified or selected, prior operations input by the user may be programmatically analyzed to determine an input source for the operation, i.e., to determine a prior operation that provides the appropriate input for the selected operation, e.g., based on chronology, signal type, format, etc. In other words, a heuristic based on one or more attributes of the selected operation and attributes of the prior operations may be used to determine the relationship, e.g., a default relationship, between the specified operation and at least one of the previously specified operations. Of course, once this relationship is determined, the user may modify or replace the determined relationship.

In one embodiment, the relationships between operations or, more specifically, between operation icons, may be visually represented. For example, in one embodiment, each operation icon may display labels or images indicating their respective input and/or output signals. Thus, an I/O relationship between operation A and operation B, where A's output is B's input, may be indicated simply by A's icon including an output icon (e.g., symbol, label, or image) with the label "B", and B's icon including an input icon with the label "A".

In one embodiment, the icons or labels may be displayed as part of the icon. In another embodiment, the icons or labels may be displayed only when invoked by the user, e.g., by right-clicking on the icon, hovering the cursor over the icon, and so forth.

Other types of icons are also contemplated. For example, in one embodiment, each operation may have a symbol as well as an icon, where the operation icon displays its own symbol, and where the symbol may also be displayed as input/output signal icons displayed in or by other icons, indicating their respective input/output signals. As another example, similar to the "wires" used to indicate couplings between graphical program nodes in graphical programs, directional lines or graphical vectors may be displayed showing the relationship between operations.

In one embodiment, once an operation has been specified, the user may configure the operations, where, for each operation, configuring the operation affects functionality of the operation. Note that in general, this configuration may occur while previously specified operations (and the present operation) are executing substantially continuously. For example, in one embodiment, during said repeating, user input to one or more of the icons may be received for configuring one or more of the plurality of operations, where receiving user input for configuring one or more of the plurality of operations does not include receiving user input specifying programming language code to configure the operations. In other words, the user preferably does not have to manually program (using a programming language) to configure the operation.

For example, in one embodiment, for each operation to be configured, a graphical panel including one or more graphical user interface elements for setting properties of the operation may be displayed, and user input to the graphical panel received to set one or more properties of the operation. In other words, the user may invoke a configuration GUI for configuring the operation, e.g., by right-clicking on the operation's icon. In another embodiment, the configuration GUI may be displayed automatically, e.g., when the operation is originally specified, when another operation is associated with the operation, e.g., when a relationship between operations is specified or indicated, and so on.

In one embodiment, one or more operations may also be removed from the plurality of operations. For example, in one embodiment, user input may be received specifying removal of a first operation from the plurality of operations. In response to specifying the removal of the operation, the method may include: discontinuing performance of the first operation from the plurality of operations, discontinuing display of the first icon, removing information associated with the first operation from the set of stored information, and modifying one or more signals displayed in the graph, as needed.

Code Generation

As noted above, in one embodiment, the set of stored information may comprise a script or equivalent which is executable under the signal analysis function development environment to perform the signal analysis function. In another embodiment, where the method described above executes under the signal analysis function development environment, a program implementing the plurality of operations may be programmatically generated based on the set of stored information, as noted above in 510, where the program is executable outside of the signal analysis function development environment. In other words, once the information specifying or representing the set of operations is produced and/or stored, the method may include programmatically generating a corresponding program that may be executed outside the development environment. Thus, the generated program may be saved, exported to other systems, etc., and executed independently of the signal analysis function development environment. In a preferred embodiment, the generated program is a graphical program, such as a LabVIEW graphical program, although it should be noted that in other embodiments, the generated program may be text-based, e.g., C++, C, etc., and/or interpretable under a different execution environment, such as, for example, Visual Basic, etc.

As noted above, a graphical program preferably includes a plurality of interconnected graphical program nodes or icons that visually represent the functionality of the program, e.g., of the signal analysis function. The nodes may be interconnected in one or more of a data flow, control flow, or execution flow format. As also noted above, the graphical program may comprise a block diagram and may also include a user interface portion or front panel portion. Where the graphical program includes a user interface portion, the user may optionally assemble or modify the user interface on the display. As one example, the user may use the LabVIEW graphical programming development environment to modify or configure the graphical program.

In one embodiment, each icon of the plurality of icons may correspond to one or more nodes in a graphical programming development environment, e.g., in the LabVIEW graphical programming development environment. Thus, the iconic display mentioned above (the diagram or diagrams described above) may have a relatively straightforward mapping or correspondence with a graphical program, which, as noted above, may include a plurality of interconnected nodes that visually represent the functionality of the graphical program. Since there is a correspondence between the stored information and the icons, in one embodiment, the graphical program may be generated based on the set of stored information, where the graphical program comprises a plurality of interconnected nodes which visually indicate the signal analysis function, and where the graphical program is executable to perform the signal analysis function.

Similar to the removal of an operation described above, in one embodiment, user input specifying removal of a first operation from the plurality of operations may be received, in response to which a first operation may be removed from the plurality of operations. The one or more nodes corresponding to the first operation may then be removed from the graphical program in response to removing the first operation.

As described above, the method may be performed by or under a signal analysis function development environment. For example, a graphical user interface (GUI) may be displayed that provides access to a set of operations, and where receiving user input specifying the plurality of operations includes receiving the user input to the graphical user interface specifying the plurality of operations, where the plurality of operations are selected from the set of operations. For example, as mentioned above in 502, the user may specify the operation in any of a variety of ways, such as, for example, selecting the operation from a menu or palette provided by the GUI. Similar to above, in one embodiment, receiving the user input to the graphical user interface specifying the plurality of operations does not include receiving user input specifying programming language code to implement the plurality of operations. In other words, manual programming is preferably not required.

It should be noted that in some embodiments, the set of stored information representing or specifying the operations may include configuration information for the plurality of instruments to perform the signal analysis function. For example, the configuration information may include parameter values for software based instruments, such as a "softscope", for hardware components of virtual instruments, e.g., a scope card, and/or for standalone hardware based instruments. Thus, when the stored information is executed, e.g., in the form of a script, the relevant software and/or hardware used by or for the operations may be configured programmatically prior to, or as part of, performance of the operations.

Similarly, in embodiments where an executable program, e.g., a graphical program, is generated (from the stored information), the program may include the configuration information, e.g., in the form of property or configuration nodes. When the program is executed, the appropriate software and/or hardware may be configured in accordance with the configuration information included in the program.

In one embodiment, if any of the software and/or hardware is not included in the system, an error message or equivalent may be presented to the user indicating the missing software and/or hardware, allowing the user to take the appropriate actions to ensure sure that the system is complete, i.e., that the needed resources are available and/or installed on the system.

Thus, in summary of the above, user input invoking each of a plurality of operations may be received, where the plurality of operations implement a signal analysis function, where for each respective instance of the user input invoking a respective operation, the respective operation is performed in response to the invoking, where the operation utilizes at least one of the plurality of instruments to perform the signal analysis function, displaying an icon in response to the invoking, where the icon corresponds to the respective operation and includes a graphical representation of the respective operation, and where the icon is displayed upon the respective invoking, and storing information specifying the operation. A graph may be displayed including one or more signals based on one or more of the plurality of operations (e.g., input signals and/or output signals). Additionally, the plurality of operations preferably utilize at least a first plurality of the plurality of instruments, where the plurality of instruments includes two or more virtual instruments.

Said another way, user input invoking each of a plurality of operations may be received, where the plurality of operations implement a signal analysis function. Each of the plurality of operations may be performed in response to respective ones of said invoking, where each operation is performed upon each said invoking, where the plurality of operations utilize at least a subset of the plurality of instruments to perform the signal analysis function, and where the plurality of instruments includes two or more virtual instruments. Each of a plurality of icons may be displayed in response to said invoking, where each icon corresponds to a respective one of the plurality of operations, and where each icon is displayed upon each said invoking. Information specifying the plurality of operations may be stored, and results of one or more of the plurality of operations displayed, where the results include one or more tables of data, and/or one or more graphs each comprising one or more signal plots.

Function Blocks (Signal Operations)

As noted above, in some embodiments, the icons and operations may comprise or be comprised in function blocks, where each function block provides a respective specified operation and is represented by a respective icon. A list of signal operations organized by function categories follows. Note that the operations presented are meant to be exemplary only, and are not intended to limit the operations to any particular set or domain. Examples of function blocks and their use are illustrated in FIGS. 8A-8I, and described below.

Create

Basic Function—Create a signal waveform such as sine tone, square wave or noise.

Multisine—Create a signal waveform composed of a number of sine tones.

IO

Acquire Analog

DMM—Single point measurement of DC and AC values.

Scope—Multiple channels waveform acquisition using a Digitizer board.

EMIO-AI—Multiple channels waveform acquisition using an EMIO board.

SMIO—Multiple channels waveform acquisition using an SMIO board.

Generate Analog

Function Generator—Continuous generation of a standard function waveform, such as sine tone or square wave.

Arbitrary Waveform Generator—Generation of an arbitrary waveform such as, for example, create by the Basic Function block.

EMIO-AO—Generation of an arbitrary waveform such as, for example, create by the Basic Function block.

SMIO-AO—Generation of an arbitrary waveform such as, for example, created by the Basic Function block.

Generate Digital

DIO-DO—Continuous generation of digital patterns such as, for example, created by the Analog to Digital block.

Acquire Digital

DIO-DI—Continuous acquisition of digital patterns for example, to be converted to waveform using the Digital to Analog block.

Conditioning

Arithmetic—Performs simple operations such as addition, multiplication or E-norm on two signals. This polymorphic block supports both time domain and frequency domain signals.

Filter—Performs filtering on one or more time domain waveforms.

Resample—Resamples time domain or frequency domain signals to user defined conditions.

Scaling—Applies user defined gain and offset to a signal. This polymorphic block supports both time domain and frequency domain signals.

Window—Applies a window to a time domain waveform.

Averaging—Performs averaging on time or frequency domain signals as well as scalar values.

Subset—Extracts a signal subset. This polymorphic block supports both time domain and frequency domain signals.

Scalar Processing—Performs formula node based operation (e.g., log, exp, sin, cos, etc.) on a scalar or array of scalars.

Graph Align—Allows the user to manually (graphically) or automatically align two waveforms and returns the applied (or needed) scaling parameters.

Measurement

DC-RMS—Returns the DC and RMS values of an input signal. This block may operate on both time domain waveforms and Power or Magnitude Spectra.

Distortion—Measures and returns various distortion values such as THD or specific harmonics for an input time domain waveform.

Histogram—Computes the histogram of a signal. This polymorphic block supports both time domain and frequency domain signals.

Tone Extraction—Extracts single tones from input time domain waveforms and returns various scalar information such as frequency, amplitude and phase, as well as reconstructed time domain or frequency domain signals.

Processing

Frequency Domain

Power Spectrum—Computes the Power Spectrum of an input time domain waveform.

Frequency Response—Computes the frequency response of a system based on two time domain waveforms representing the system excitation and response signals.

File

Import from File—Imports a signal or a group of signals from file. This polymorphic block supports both time domain and frequency domain signals.

Export to File—Exports a signal or a group of signals to file. This polymorphic block supports both time domain and frequency domain signals.

Test

Test Blocks—Various blocks for performing tests on signals. Each block typically returns a Boolean specifying whether the test has passed or failed.

Conversion (Tools)

Analog to Digital Conversion—Converts a time domain waveform to a digital signal with associated timing. The format can be serial or parallel according to specific standard formats such as SPI. This block preferably directly feeds a DIO board.

Digital to Analog Conversion—Converts a serial or parallel digital signal to a time domain waveform. The format can be serial or parallel according to specific standard formats such as SPI. This block preferably consumes data acquired using a DIO board.

Conversion Blocks—Various blocks for performing conversion operations on signals or scalar values:

Add/Remove tags.

Convert from/to WDT from/to clusters.

Build WDT or cluster from array of scalars.

Group/ungroup signals.

Thus, in one embodiment, a plurality of function blocks, such as, for example, any of those listed above (or others), may be used in specifying and performing a signal analysis function utilizing a plurality of instruments. In a preferred embodiment, the plurality of instruments includes two or more virtual instruments (VIs), at least a portion of which may include respective hardware components, as mentioned above. Note that in some embodiments, one or more of the function blocks may be polymorphic, e.g., with respect to input signals. For example, a polymorphic function block may accommodate different data types of the input signal provided to the function block, e.g., arithmetic function blocks for addition, averaging, and so forth, may be operable to receive and operate on signal data in the time domain or the frequency domain.

In one embodiment, each function block may include: a function block icon operable to be displayed in a graphical user interface (GUI) of a signal analysis function development environment, where the function block icon visually indicates a respective signal operation, and a set of program instructions associated with the function icon, where the set of program instructions are executable to perform the respective signal operation, possibly in conjunction with associated hardware.

In one embodiment, each function block may be selectable from the plurality of function blocks by a user for inclusion in a set of function blocks, where each function block operates to perform the respective signal operation continuously upon being selected. For example, the user may select a first function block from a palette, menu, etc., in response to which the respective signal operation may be performed, preferably executing in a continuous manner until, for example, a stopping condition occurs or the user pauses or terminates the process. As described above, the user may then select one or more additional function blocks, which may similarly begin continuous respective operations in conjunction with the first function block.

In one embodiment, each function block may be operable to provide a respective output based on the respective signal operation, where the respective output is operable to be displayed in the GUI, provided as input to one or more other ones of the set of function blocks, and/or exported to an external device. In other words, each function block may generate a respective output that may be used as input to or by other function blocks in the set of function blocks, transmitted to an external device coupled to the host computer 82, and/or displayed in a display tool, such as a graph or table, in the GUI. Additionally, one or more of the function blocks may be operable to receive a respective input based on the respective signal operation, where the function block is operable to perform the respective signal operation on the input, e.g., on a signal and/or data, and provide the results as output.

In one embodiment, each function block may include an input and an output, where the input is operable to receive signals from one or more of: an external signal source, a file, and/or another function block, and where the output is operable to send resultant signals to one or more of: a display of the GUI, an external device, a file, and/or another, different, function block.

Once the user has selected the set of function blocks, the set of function blocks may be executable to perform the signal analysis function under the signal analysis function development environment using one or more of the plurality of instruments. For example, in an embodiment where each function block executes substantially continuously upon selection by the user, when the user is done selecting the function blocks, the signal analysis function (specified and implemented by the set of function blocks) is already being performed. As another example, the user may stop the current execution of the signal analysis function (which was, for example, initiated in steps via the function block selection process), then re-initiate performance of the signal analysis function, thereby invoking execution of the set of function blocks. In another embodiment, information specifying the respective signal operations of the set of function blocks may be saved, e.g., as a script, that may be executed as desired under the signal analysis function development environment.

In one embodiment, the set of function blocks may be displayed in a diagram, e.g., in a specified display area of the GUI. The diagram may include one or more of: a linear sequence, a data flow diagram, a tree diagram, and a dependency diagram, among other types of diagram. The diagram may substantially visually represent I/O relationships between the function blocks. For example, where output from a first function block is provided as input to a second function block, this relationship may be graphically represented in the diagram, e.g., via a data flow line from the first function block to the second function block, via I/O signal icons displayed in, on, or proximate to each function block icon, and/or by the relative positions of the function blocks, and so forth. In one embodiment, when the I/O relationships between the function blocks change, the diagram may be automatically updated in accordance with the changed I/O relationships between the function blocks. Thus, if a user changes an I/O relationship between function blocks, the diagram may be updated automatically to reflect the change. Examples of linear sequence function block diagrams are provided below with reference to FIGS. 6 and 8A-8I.

In one embodiment, the diagram may include one or more control structures, where the one or more control structures control execution of the set of function blocks. For example, the one or more control structures may include conditional branching and/or looping, which may determine control or execution flow for performance of the specified operations comprised in the signal analysis function, such control structures being well known in the art of software and script development and execution.

Thus, the diagram may comprise or visually represent a script (or equivalent) that is executable to perform the specified signal analysis function under the development environment. Said another way, the diagram may include information specifying the respective signal operations of the set of function blocks, where the information is executable to perform the signal analysis function under the signal analysis function development environment.

As described above in the Code Generation section, in one embodiment, the information specifying the respective signal operations of the set of function blocks may be useable to generate a program, where the program is executable to perform the signal analysis function independently of the signal analysis function development environment. In other words, in one embodiment, the signal analysis function development environment may be operable to automatically generate an executable program based on the information specifying the respective signal operations of the set of function blocks, where, in contrast to the diagram and/or script which executes under the environment, the generated program may be executed independently of the development environment. As described above, in various embodiments, the generated program may be a graphical program, such as a LabVIEW graphical program, a text based program, such as a C, C++, JAVA, or Basic program, and/or machine executable code.

In one embodiment, each of at least a subset of the plurality of function blocks may be operable to receive a signal (or signal data) from a signal source, perform the respective signal operation on the signal, and output a result of the respective signal operation for display in the GUI, storage, input to another one of the plurality of function blocks and/or export to an external device.

Additionally, in one embodiment, the set of program instructions for each function block may be further executable to: receive user input selecting the function block icon, display a configuration GUI for the function block, and receive user input to the configuration GUI setting one or more parameters of the function block, thereby configuring the function block, where the configured function block is operable to perform the signal operation in accordance with the one or more set parameters. In other words, each function block may include or be associated with software (program instructions) that implements a respective configuration GUI for that function block, and that also facilitates user invocation of the configuration GUI, e.g., by receiving user input to the function block (icon). For example, in one embodiment, the user may right-click on the function block icon, thereby invoking the configuration GUI. Alternatively, the user may provide input (e.g., click) on the function block icon to invoke a menu or pop-up dialog from which the configuration GUI itself may be invoked. In yet another embodiment, the initial user selection or specification of the function block may automatically invoke display of the function block's configuration GUI.

In one embodiment, each function block may have a default configuration, where, prior to configuring the function block, the function block is operable to perform the signal operation in accordance with the default configuration. In other words, parameters that specify or configure the signal operation of the function block may have default values such that even if the user does not explicitly configure the function block, the function block may still be operable to perform the respective signal operation based on the default values of the parameters. Of course, the user may override these default values as desired. It should be noted that the configuration parameters shown and described with regard to any of the function blocks presented herein are meant to be exemplary only, and are not intended to limit the parameters to any particular set or types of parameters.

In one embodiment, at least one of the plurality of function blocks may be a user-defined function block, where the set of program instructions of the user-defined function block are executable to perform a user-defined signal operation. In other words, at least one of the function blocks may include functionality that is defined or specified (as opposed to simply configured) by the user. For example, in one embodiment, the set of program instructions of the user-defined function block nay include a pre-defined program. The pre-defined program may have been developed by the user, by another developer, or may have been developed programmatically by another system. The user may provide input to the development environment and/or to the user-defined function block indicating the pre-defined program, thereby establishing a link between the user-defined function block and the pre-defined program, and/or including the pre-defined program in the function block. Thus, once the user-defined function block has been selected (and optionally configured), and the pre-defined program linked to or included in the function block, the pre-defined program may execute substantially continuously in conjunction with any previously selected function blocks, as described above.

As noted above, in a preferred embodiment, each function block may be operable to display respective icons for one or more input signals and/or one or more output signals for the function block. For each function block, the respective icons may include text and/or a graphical image indicating a respective signal for that function block.

In additional to indicating respective signals for the function block, these icons may also be used to manipulate, establish associations with, or otherwise manage the signals. For example, each icon of the function block may be selectable by a user to associate the respective signal with a display, i.e., a display tool, of the GUI, where in response to being associated with the display, the respective signal is displayed in the display of the GUI. In one embodiment, in being selectable by a user, each icon may be operable to be dragged and dropped onto the display of the GUI, resulting in display of the respective signal on the display of the GUI. Thus, in one embodiment, the user may drag and drop signals (e.g., signal icons) from function blocks onto the display to invoke graphical display of the signals.

Alternatively, or in addition to the above, each icon of the function block may be selectable by the user to associate the respective signal with a different function block of the set of function blocks, where in response to being associated with the different function block, the set of program instructions of the different function block performs the respective signal operation on the respective signal. For example, the user may drag and drop the signal icon onto the different function block, thereby configuring the different function block to receive the respective signal as input and to perform the respective signal operation on the respective signal. Thus, in one embodiment, each function block may be operable to receive user input indicating one or more input signals, where the function block is operable to perform the signal operation on the indicated one or more signals in response to the user input indicating one or more input signals, where, for example, the user input indicating one or more input signals includes the user dragging and dropping one or more signal icons onto the function block.

In an embodiment where the display of the GUI includes a graph (or other type of display tool) operable to display one or more signals, the user input indicating one or more input signals may include the user selecting at least one signal in the GUI display, and the user dragging and dropping a corresponding at least one signal icon from the graph onto the function block, where the at least one signal icon represents the at least one signal in the GUI display. Said another way, in one embodiment, signal icons may be displayed and accessed in the graphical display of the GUI, i.e., a display tool of the GUI, where the signal icons may be selected, e.g., via clicking with a mouse, and dragged and dropped onto the desired function block, whereupon the function block may be automatically configured to receive the indicated signal as input. The signal icons may be implemented or displayed in various forms. For example, in one embodiment, the signal icons displayed in the graph may be included in the legend of the graph, e.g., as a symbol, icon, or text label, where the user may select the signal by clicking on the icon in the legend. Alternatively, the signal icon may be displayed in response to the user clicking on the signal plot itself, e.g., in the form of a "pop-up" icon that may then be dragged and dropped on a function block as desired. In a further embodiment, the signal plot itself may be the signal icon, where the user may select the signal plot, then drag and drop the signal plot (i.e., an image of the signal plot) onto the targeted function block. Of course, this same technique may be used to move a signal from one graph to another, as well.

Thus, each signal icon may serve as a token, handle, or surrogate for a respective signal whereby the user may establish or modify relationships between the signal and elements of the system, e.g., function blocks, graphical or tabular displays, and so forth.

Figure 6:
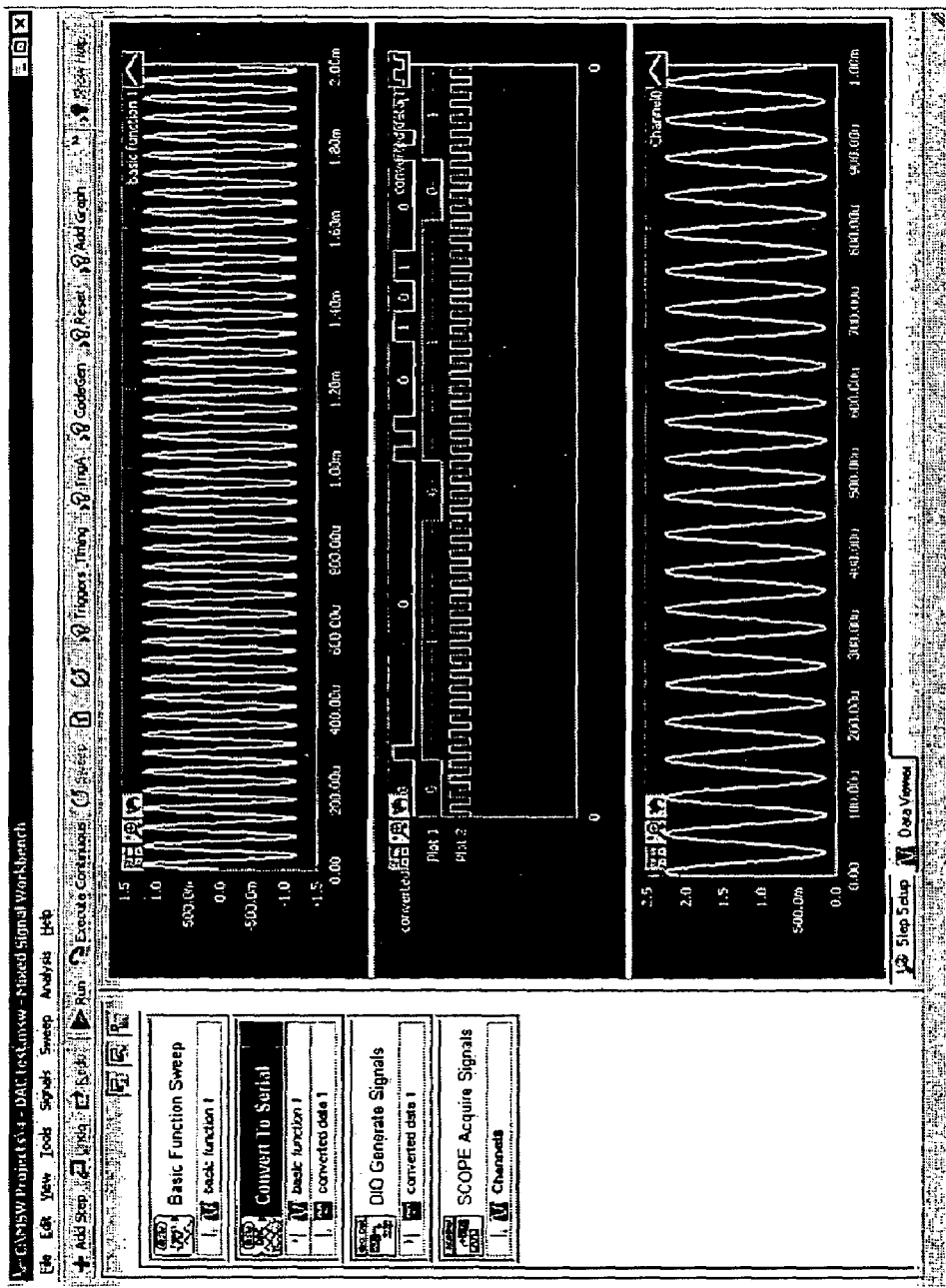
FIG. 6 illustrates an example graphical user interface for specifying and performing signal analysis functions, according to one embodiment.

FIG. 6—Example GUI and Environment Overview

FIG. 6 is an example of one embodiment of a GUI for specifying, implementing, and/or performing a signal analysis friction. More specifically, the GUI provides an interface for the signal analysis function development environment mentioned above. Note that the example shown is meant to be exemplary only, and is not intended to limit the GUI to any particular appearance, form, or functionality.

As FIG. 6 shows, the GUI may include an area or window for displaying a plurality of function blocks, here shown as the left-most window of the GUI. The display window may be referred to as a display tool and may comprise a graph or a table as desired. As described above, the displayed function blocks may each correspond to a respective signal operation that has been selected by a user and thus represent the currently specified operations, where each function block has an icon, a label, and icons for input and/or output signals.

As shown, in one embodiment, the input and output signal icons for each function block may be displayed in a manner that indicates whether the signal is an input or an output for that block. For example, in the embodiment shown, the signal icons at the bottom of each function block each have a graphical "I/O" icon comprising a vertical line and a triangle, placed either to the upper left of the vertical line, indicating input, or to the lower right of the line, indicating output. Of course, other means of indicating whether a signal is an input or an output for the function block are also contemplated, such as, for example, using labels, e.g., "I" for input and "O" for output, grouping the signals for each block into an input group and an output group, and so forth.

The plurality of function blocks are preferably included in a function block diagram, where, as described above, a plurality of function block icons are arranged to visually indicate the signal analysis function. In other words, in one embodiment, a diagram including the function block icons of the specified operations is displayed, where the diagram visually indicates the functionality of the signal analysis function. In various embodiments, the diagram may be one or more of: a linear sequence, a data flow diagram, a tree diagram, and a dependency diagram. Note that in the embodiment of FIG. 6, the function block diagram is presented as a vertical linear sequence of function blocks, where the respective signal operations are performed accordingly, although it should be noted that, as mentioned above, each of the operations is executed in a substantially continuous manner. Thus, the linear sequence may indicate the general data flow between the function blocks.

It should also be noted, however, that although the diagram may be presented as a linear sequence, in some embodiments, the I/O relationships between the function blocks may not be linear. For example, non-linear data flow may be specified and indicated via input and output signal icons for the function blocks, as described above.

As FIG. 6 also shows, a display area of the GUI may be provided (shown to the right of the function blocks) for displaying signals and related data. As noted above, the display of the GUI may be used to display signal graphs, as well as tabular data, i.e., tables of data. As also shown, a menu or tool bar may be provided along the top of the GUI whereby the user may invoke functionality to control execution of the operations, generate code, set triggers and timing, and so forth. In one embodiment, the tool bar may include an "Execute Continuously" button which may be selected to configure the environment to execute each operation in a substantially continuous manner upon selection of the operation by the user.

Note that in this example, the display area or window is tabbed for "Data Viewer" and "Step Setup", where the graphical display shown is in the Data View mode, here displaying three different graphs, where the middle graph itself includes three signal plots. This mode may be used primarily during execution of the signal analysis function, specifically, to display resultant signals and/or data from one or more of the function block operations.

The Step Setup mode may be used primarily during configuration of the respective function blocks. More specifically, the Step Setup mode may operate to display configuration GUIs for the respective function blocks facilitating user configuration of the function blocks, i.e., the signal operations, as described in some detail above. Various examples of configuration GUIs are described below with reference to FIGS. 8A-8I.

Figure 7:
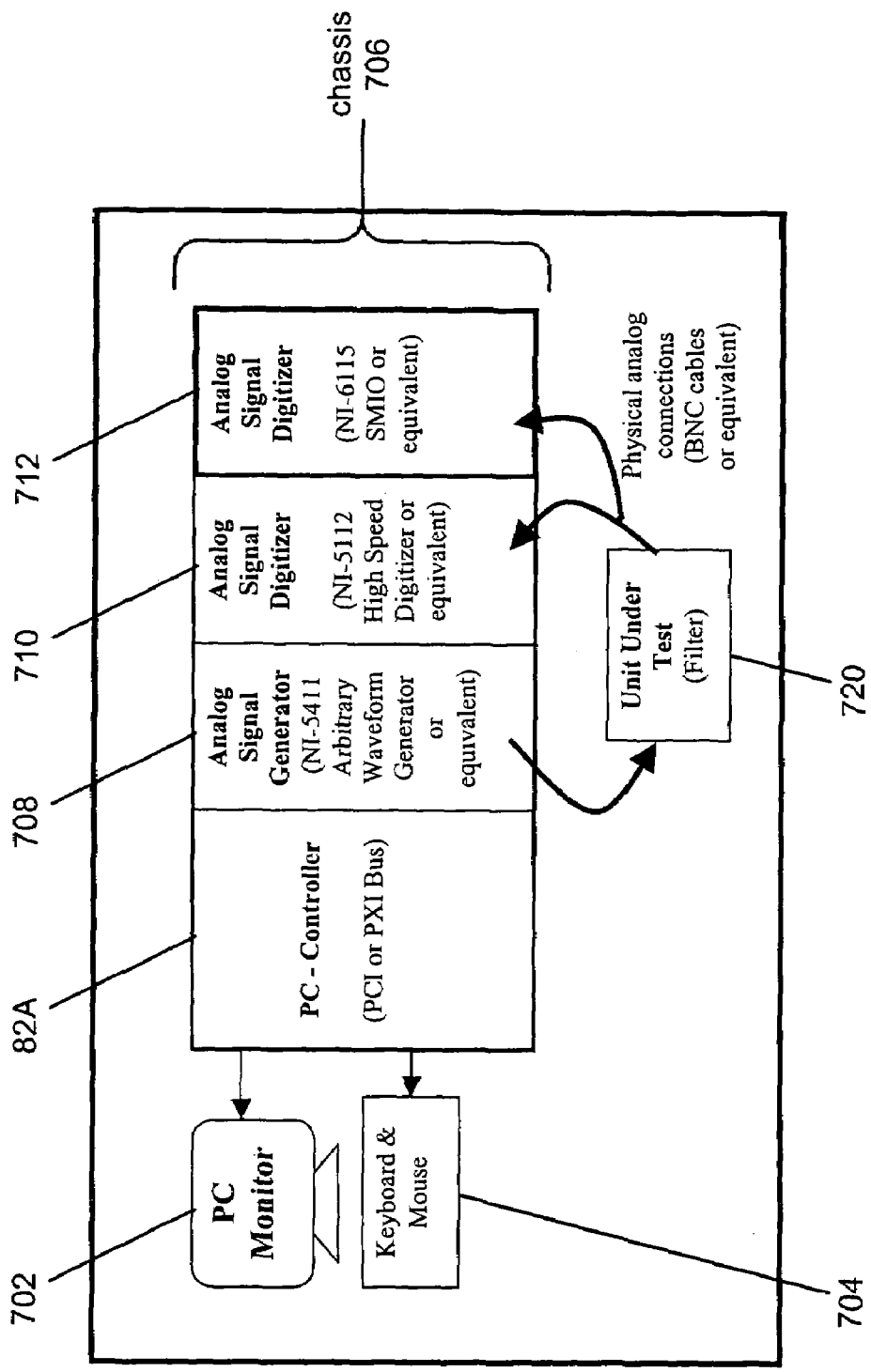
FIG. 7 is a block diagram of an exemplary hardware setup suitable for performing a signal analysis function, according to one embodiment.
Figure 8A:
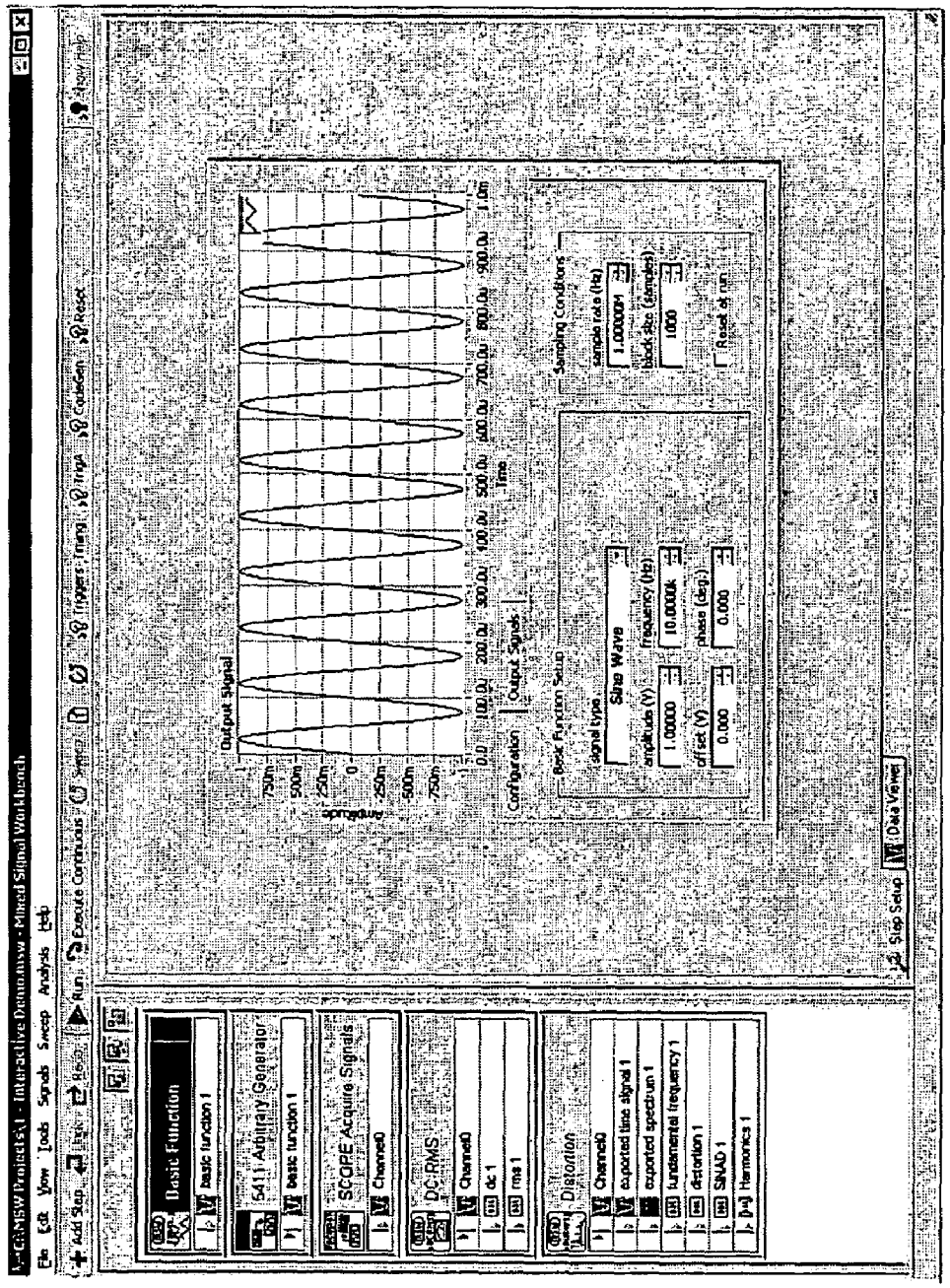
FIGS. 8A-8G illustrate an example walk-through of an exemplary signal analysis function specification and performance, according to one embodiment.
Figure 8B:
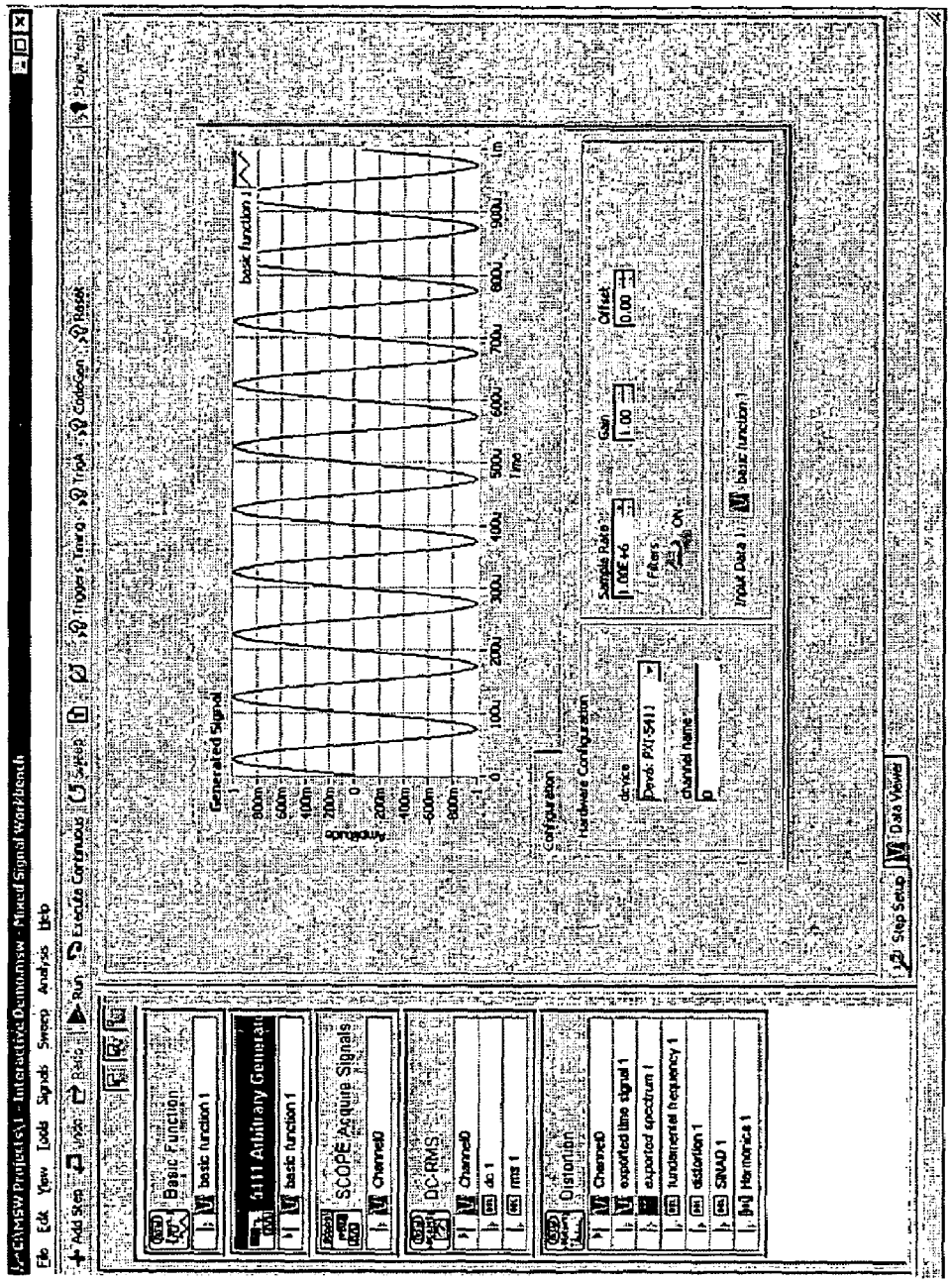
Figure 8C:
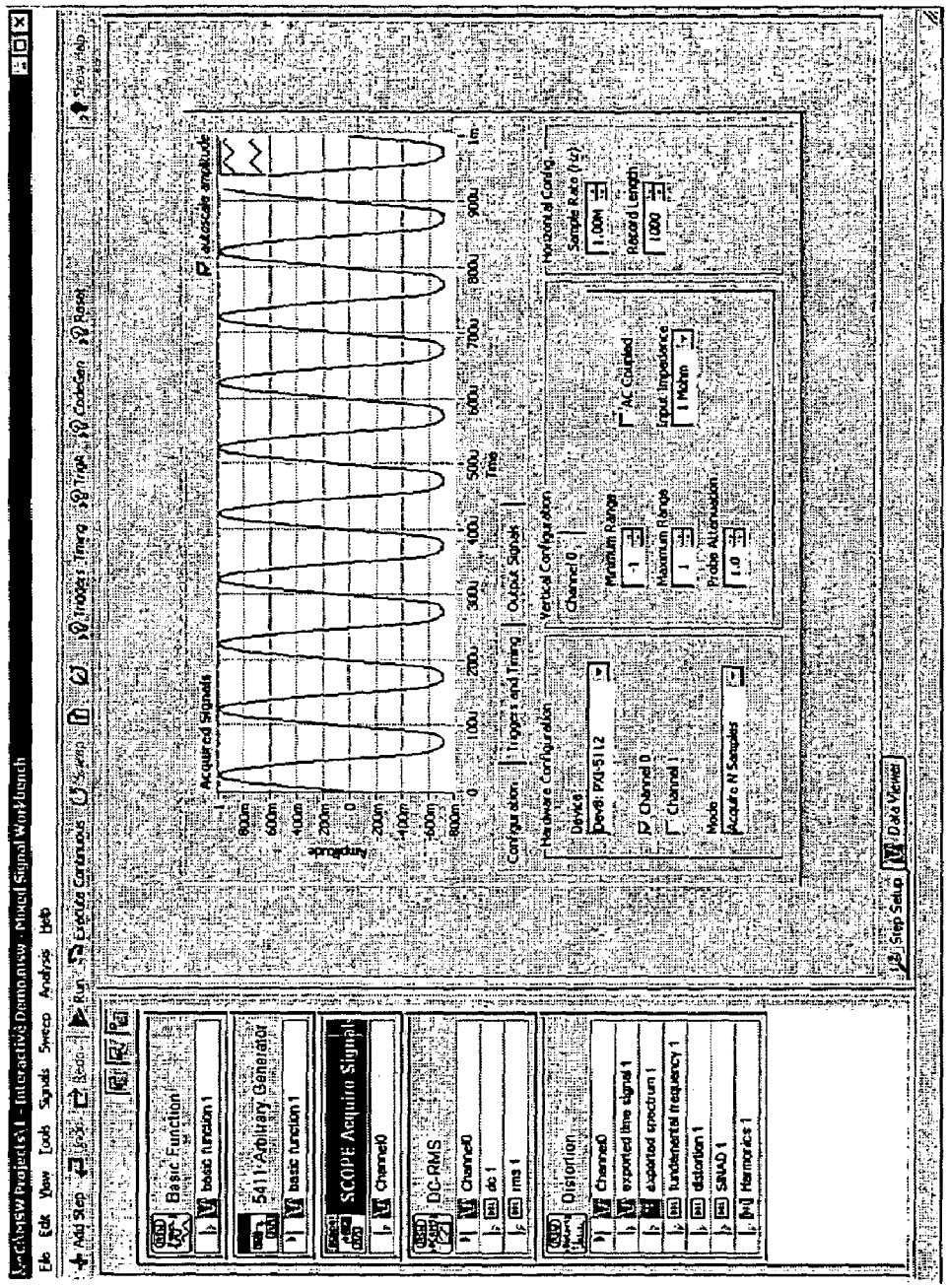
Figure 8D:
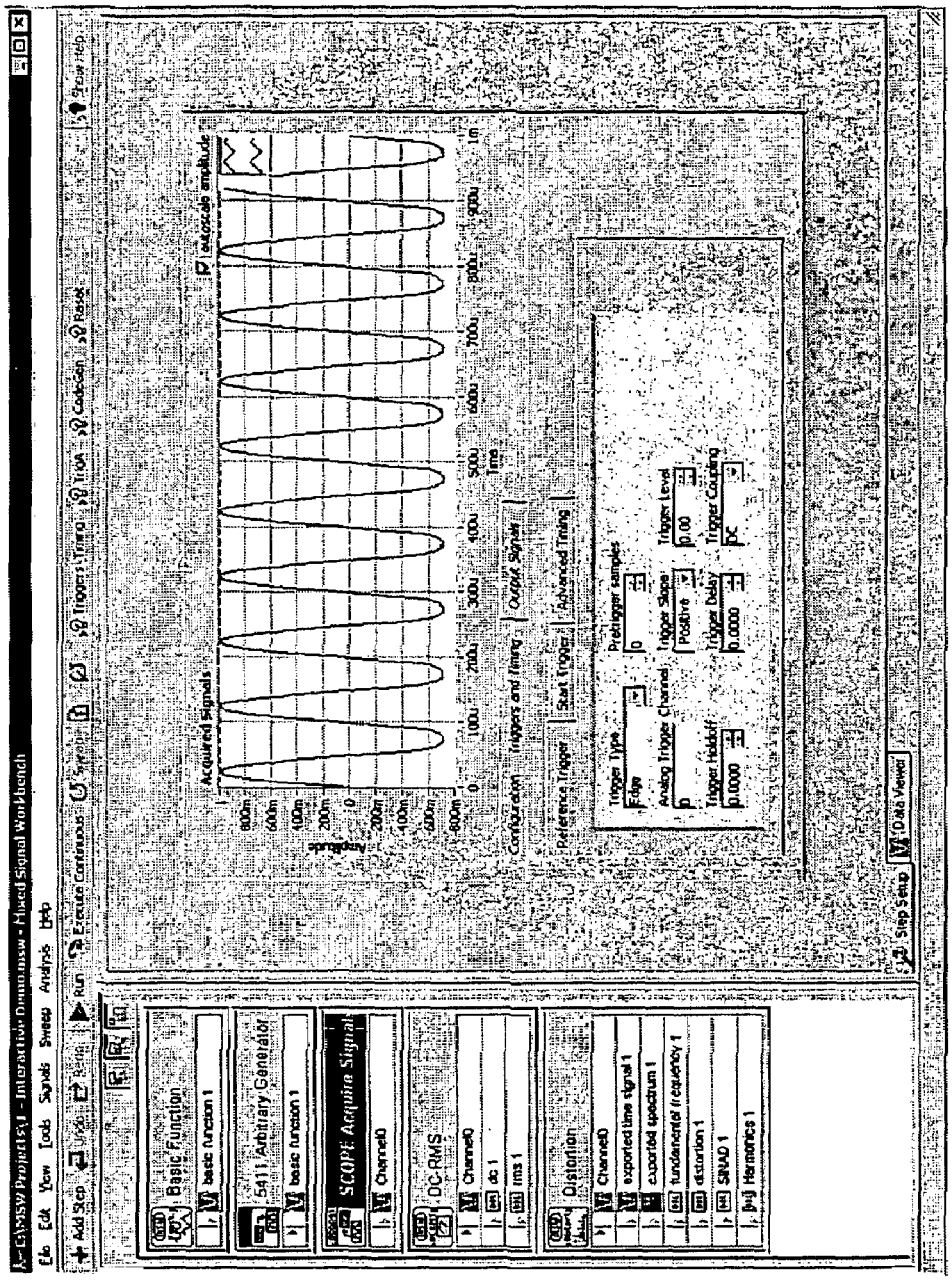
Figure 8E:
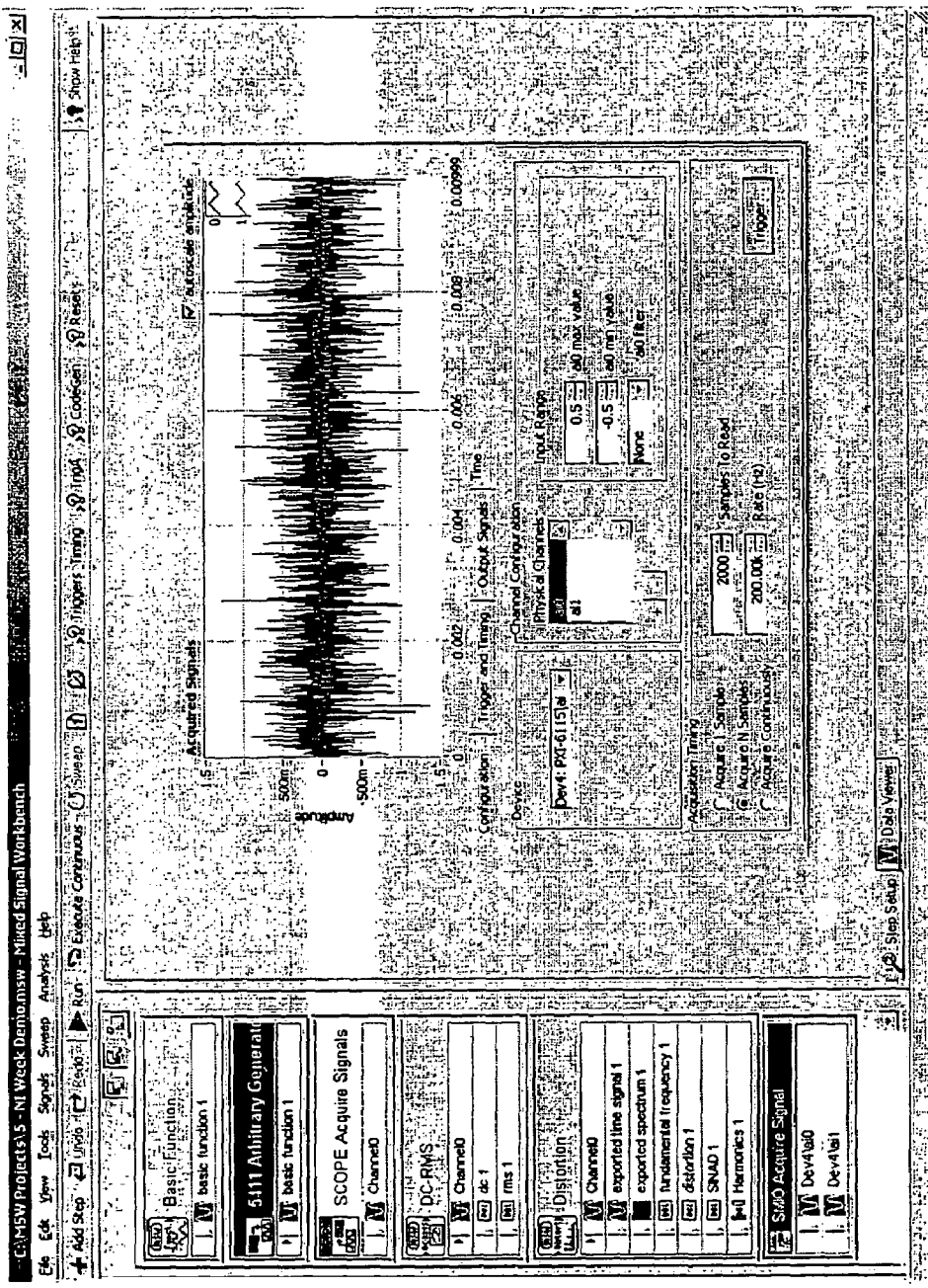
Figure 8F:
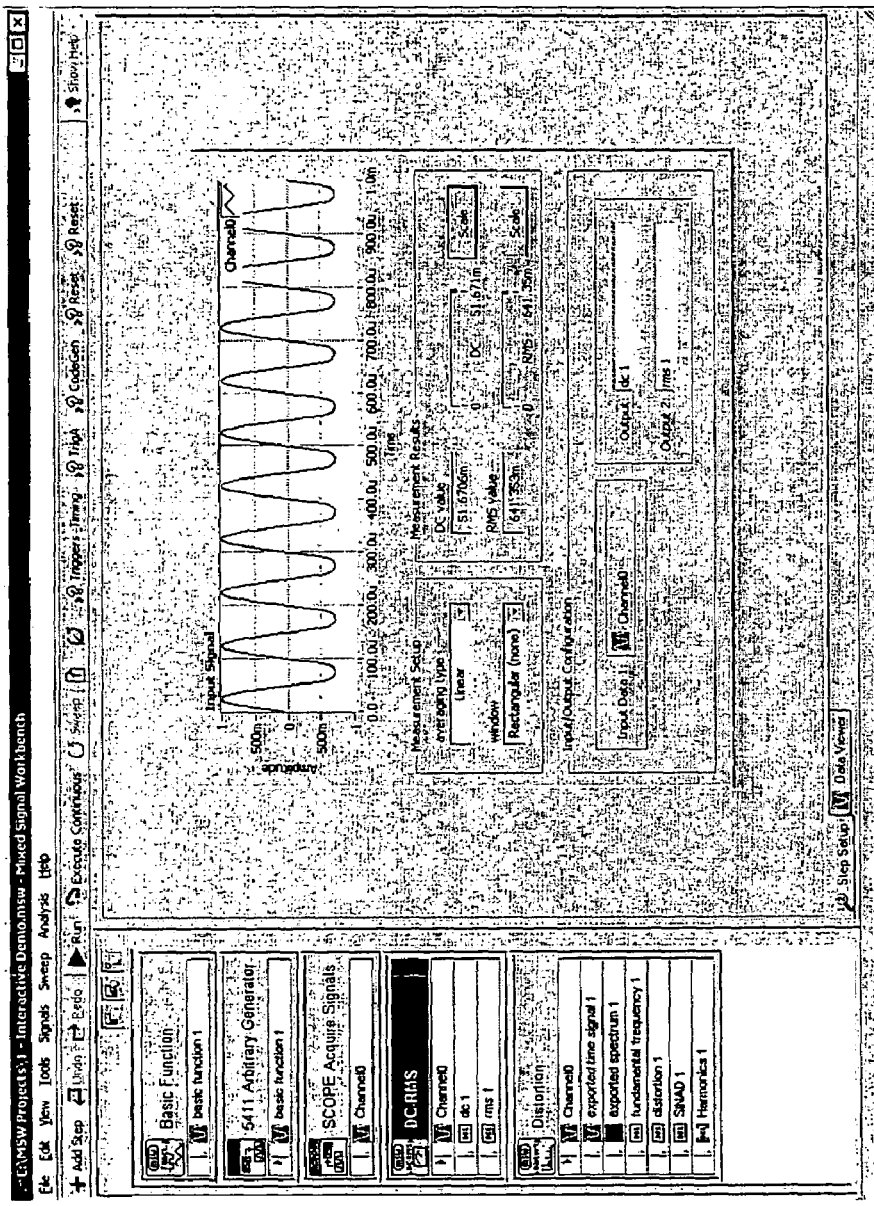
Figure 8G:
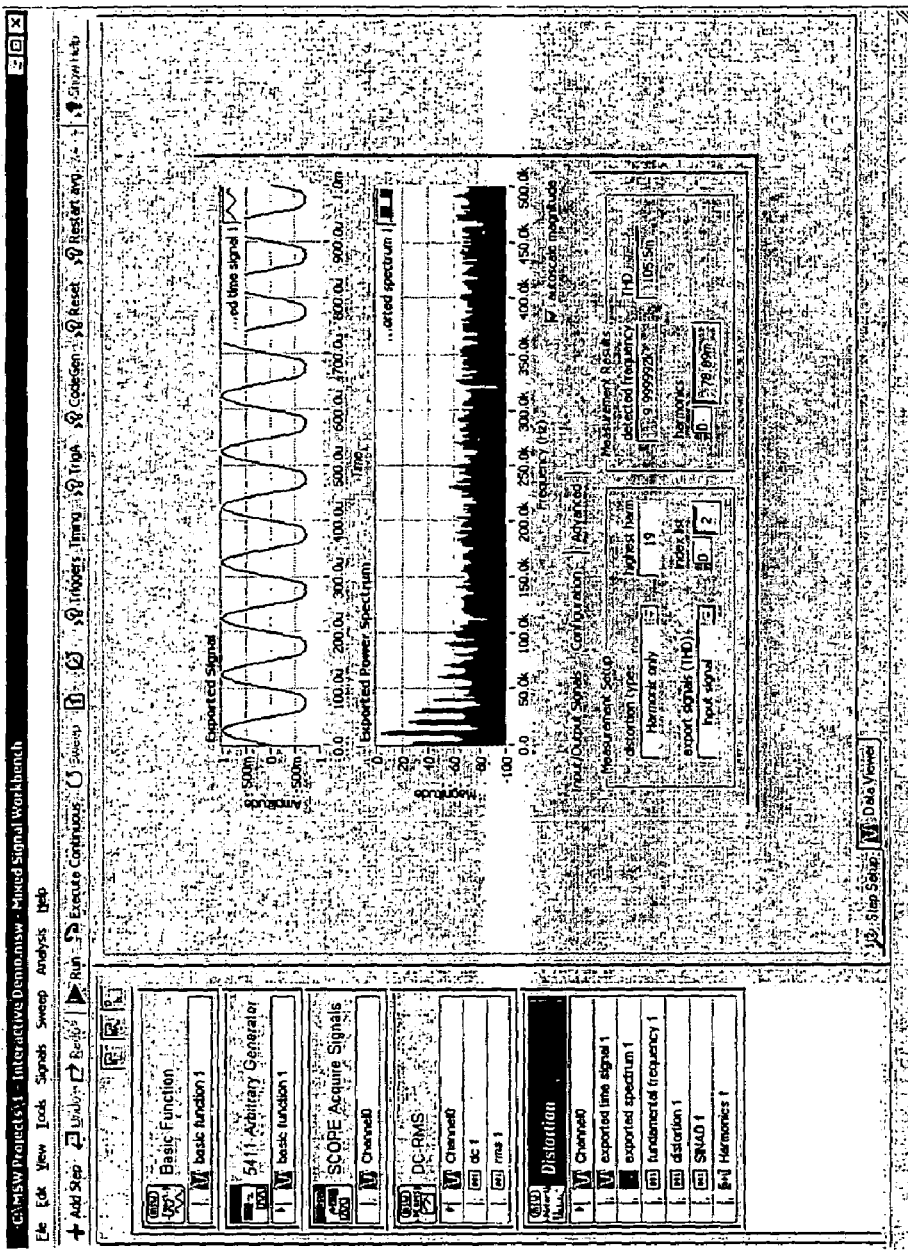

FIGS. 7-8G—Signal Analysis Function Development Environment: Example Walk-Through FIGS. 7-8G illustrate use of a graphical user interface (GUI) for a signal analysis function development environment, according to various embodiments. More specifically, the GUI shown in these figures illustrates one embodiment of an interface whereby a user may interactively specify (and perform) a signal analysis function according to various embodiments of the method of FIG. 5, described above. In other words, an example walk-through is provided to illustrate one example of the process and to illustrate corresponding aspects of the GUI. FIG. 7 illustrates the hardware setup for the system, and FIGS. 8A-8G are screenshots of the GUI illustrating various steps (and results) in the specification of the signal analysis function. In this example, a Unit Under Test (UUT), specifically an LC-Diode filter circuit, is stimulated with a test signal, and the circuit's response captured and analyzed.

As FIG. 7 shows, in this particular example, the system includes a computer monitor 702 and keyboard/mouse 704 coupled to a PCI or PXI chassis 706, where the chassis includes a plurality of boards or cards, including a PC-Controller (e.g., a computer on a card, with a bus, e.g., a PCI or PXI bus) 82A, an analog signal generator (e.g., an NI-5411 Arbitrary Waveform Generator (Arb)) 708, a high speed analog signal digitizer, also referred to as a Scope (e.g., an NI-5112 High Speed Digitizer) 710, and a DAQ board (e.g., an NI-6115 SMIO (Simultaneous-Sampling Multifunction I/O) board) 712, which is another type of analog signal digitizer. Note that in this embodiment, the PC-Controller 82A functions as the host computer for the system. Thus, in this embodiment, substantially all of the hardware for the system other than human interface devices, i.e., the monitor, keyboard, and mouse, is included in a PCI or PXI chassis, including the host computer itself, where each hardware device comprises a PCI or PXI card or board.

As FIG. 7 also shows, the Arb 708, the Scope 710, and the DAQ 712 are each coupled to the Unit Under Test 720, in this example, the LC-Diode filter circuit mentioned above, via physical analog connections, e.g., BNC cables are their equivalent. As indicated by the directional connections, the Arb 708 may be operable to send signals to the UUT 720, and the Scope 710 and DAQ 712 may be operable to receive signals from the UUT 720. Of course, each of the other hardware devices or boards is preferably communicatively coupled to the PC-Controller or host computer 82A, whereupon various software programs according to the present invention may be executed, e.g., software portions of VIs, the development environment, and so forth.

As mentioned above, FIGS. 8A-8G illustrate a walk-through of an exemplary signal analysis function development session using on embodiment of the GUI. It should be noted that this walk-through assumes that the function blocks have already been selected, but not configured yet (beyond the optional default configuration), and so in the description below, steps are described for interactively configuring the function blocks to perform the desired signal analysis function, i.e., the test of the LC-Diode filter circuit. It should be noted that the original selection or specification of the operations or function blocks would proceed in substantially the same manner, but the user would invoke the operation itself, rather than a configuration panel for the operation. It should be further noted that the embodiments described below are meant to be exemplary only, and are not intended to limit the features or operation of the system to any particular set of features, steps, or mechanisms.

In the example shown in FIG. 8A, the function blocks currently specified include a Basic Function function block, an Arbitrary Generator (type or model 5411) function block, corresponding to the Arb board 708 of FIG. 7, a Scope Acquire Signals function block corresponding to the Scope 710, a DC-RMS function block, and a Distortion function block, each of which is described in more detail below.

As noted above, in some embodiments, the GUI may include an "Execute Continuously" button which may be selected to configure the environment to execute each operation in a substantially continuous manner upon selection of the operation by the user, and so initially the user may activate this feature by pressing the button.

FIG. 8A illustrates signal specification and creation using the Basic Function block, where the user may initiate creation of the signal by first selecting the Basic Function block, e.g., by clicking on the Basic Function block with a mouse, via a top-level menu of the GUI, or, in one embodiment, via a context-menu in the function block display window or section of the GUI.

The user may then invoke a configuration GUI for the Basic Function block, shown in the display section of the GUI, e.g., by right-clicking or double-clicking on the function block or otherwise invoking the configuration GUI for the Basic Function block. For example, the user may right-click on the function block to invoke an options menu for the function block, then select a "Configure" option (or equivalent) to invoke the configuration GUI.

In the embodiment shown, the configuration GUI for the Basic Function block includes a number of fields or controls for specifying the waveform to be output by the Basic Function block, e.g., signal type, here selected to be a "Sine Wave", amplitude (1.00000), frequency (10 KHz), offset(V) (0.000), and phase(deg.) (0.000), provided in a "Basic Function Setup" section. Additional controls may be provided in a "Sampling Conditions" section for sample rate(Hz) (1 MHz) and block size(samples) (1000), as well as a check box for a "Reset at run" option. Note that in one embodiment, the configuration GUI may be tabbed as shown to provide a configuration panel (with the above controls) displayed by user selection of a "Configuration" tab, and an "Output Signals" panel (not shown selected) displayed by user selection of an "Output Signals" tab, which may be operable to indicate the current output signals of the function block, e.g., via name and/or icon. In this embodiment, the configuration GUI also includes a display area for displaying signals related to the selected function block, here shown displaying the specified sine output signal.

Note also that in this embodiment, two tabs are provided at the bottom of the display section, titled "Step Setup" and "Data View", facilitating user selection between a configuration mode and a display mode, as described above with reference to FIG. 6. As FIG. 8A shows, the "Step Setup" tab is currently selected for the configuration process described herein.

Once the Basic Function operation has been configured, the specified signal (sine wave) data may be generated, e.g. algorithmically or read from file. This signal data is output substantially continuously by the configured function block.

Turning now to FIG. 8B, the next function block in the diagram is shown selected, specifically, the 5411 Arbitrary Generator function block, operable to receive specified signal data, e.g., the "basic function 1" signal data, as input and generate a corresponding analog signal based on the signal data (e.g., utilizing an arbitrary waveform generator board). In one embodiment, the user may specify this relationship between the Arbitrary Generator function block and the signal data by right-clicking on the "basic function 1" signal (plot, legend, or label) in the graph, thereby invoking a menu of options from which the user may select a "Generate Signal with the Arb" signal operation option (or its equivalent). Alternatively, the user may right-click or otherwise select the "basic function 1" output signal icon displayed by the Basic Function block (labeled "basic function 1") to invoke the signal operation options. In one embodiment, the menus invoked via signals or signal icons may be context-sensitive menus that only display options that are appropriate for the signal or data type of the indicated signal. Other means of invoking the operation options for the signal data are also contemplated.

As FIG. 8B shows, once the user has specified this I/O relationship between the signal data and the Arbitrary Generator function block, an input signal icon (labeled "basic function 1") may be displayed by the Arbitrary Generator function block, indicating that the Arbitrary Generator function block is configured to receive the signal data from the Basic Function block and generate an analog signal based on the signal data.

As FIG. 8B also shows, the specification of the Arbitrary Generator function block may invoke a configuration GUI for the Arbitrary Generator function block, here shown in the tabbed section labeled "Configuration". The configuration GUI for the Arbitrary Generator may provide one or more GUI elements for specifying and displaying various parameters for the arbitrary waveform generation functionality of the Arbitrary Generator function block, e.g., hardware configuration parameters such as, for example, a device specification (shown as Dev6: PXI-5411), a channel name, sample rate (set to 1 MHz), Gain (set to 1), Offset (set to 0.0), a filter toggle, and an input data or signal designation (set to "basic function 1"). In one embodiment, one or more of the parameters may have default values which may be overridden by the user as desired.

In the example shown, the graph section of the GUI (above the configuration section) may operate to display the generated signal, where the graph is labeled accordingly ("Generated Signal"). Thus, the GUI may provide means for configuring the operation, as well as for displaying the results of the specified configuration. In one embodiment, the GUI may automatically display the output signal or signals from the currently selected function block, such that when a new or different function block is selected, any previously displayed signal graph may be replaced or supplanted by the new or different signal graph. In another embodiment, each successive function block specification may result in the display of an additional signal graph. For example, each signal graph may be displayed in a separate window, where the windows may be tiled, cascaded, or otherwise organized for viewing by the user. Alternatively, the signal graphs may be displayed in a single window.

In one embodiment, a different graph may be used to display each basic type of signal. For example, time domain plots may be displayed in a first graph, while frequency domain plots may be displayed in a second graph. In one embodiment, tabular data may be displayed separately, e.g., in a different display window or section of the GUI.

In FIG. 8C, the third function block (SCOPE Acquire Signals) in the diagram is shown selected. This function block may be operable to acquire a signal from a specified source via a digitizer or "scope" card, such as the Scope 710, and provide the signal as output on a specified channel (here shown as Channel0). In other words, the SCOPE Acquire Signals function block may provide means for acquiring a signal, e.g., from an external signal source or from other hardware comprised in the host system, and outputting the acquired signal for use by other function blocks and/or display.

Similar to the above described function block, in one embodiment, the function block may be configured in the following manner: The user may invoke an operations options menu from the "generated signal" plot above, e.g., by right-clicking in the signal area (or on the signal plot, legend, or signal icon, e.g., in the graph or on the function block), to invoke an options menu, and selecting an "Acquire Analog Signal with the Digitizer" option (or its equivalent), resulting in display of a configuration GUI for the SCOPE Acquire Signals function block. In the embodiment shown, the SCOPE Acquire Signals function block is configured to acquire the analog signal generated by the Arb described above.

As FIG. 8C shows, in this example, the configuration GUI includes three panels, tabbed and labeled "Configuration", "Triggers and Timing", and "Output Signals", respectively, where the Configuration panel is shown active or displayed. As described above, the Configuration panel may include one or more GUI elements for specifying and displaying various parameters for the functionality of the corresponding function block. For example, the Configuration panel for the SCOPE Acquire Signals function block may include hardware configuration parameters such as, for example, a device specification (shown as Dev8: PXI-5112), a channel specification, and a mode designation (set to "Acquire N Samples). As shown, the Configuration panel may also include fields for specifying Vertical and Horizontal Configuration of the acquired signal, such as, for example, Minimum (−1) and Maximum Range (1), Probe Attenuation (1.0), Input Impedance (1 MOhm), an AC Coupled option, as well as sample rate (set to 1 MHz) and Record Length (set to 1000 points).

As described above, the Output Signals panel (not shown) may be operable to indicate the current output signal(s) of the function block, e.g., via name and/or icon, i.e., "Channel0", in this case. Details of the Triggers and Timing panel are described below with reference to FIG. 8D.

Note that this Configuration GUI also includes a signal graph display of the acquired signals, here labeled "Acquired Signals". Thus, the user may view the signal or signals acquired by the digitizer from the arbitrary waveform generator. As noted above, in one embodiment, multiple signals may be specified for display in the graph display area or window. For example, in one embodiment, the user may select and drag both signals "Channel0" and "basic function 1" to the graph display (the GUI's main graphical display in the "Data View" mode, as shown in FIG. 6 and described above), where the two signals may be overlaid in the same graph, e.g., for easy comparison, or respectively displayed in separate graphs as desired.

Note that the acquired signal "Channel0" of FIG. 8C is not currently triggered, and so triggering and timing parameters may need to be specified for the signal or operation. FIG. 8D illustrates one embodiment of the Triggering and Timing panel of the configuration GUI of FIG. 8C, whereby such parameters may be set. As FIG. 8D shows, in this example, the Triggers and Timing Panel may itself comprise multiple panels, namely "Reference Trigger", "Start Trigger", and "Advanced Timing" sub-panels. As shown, the Reference Trigger panel includes GUI elements for specifying and displaying Trigger Type (set to "Edge"), Analog Trigger Channel (set to 0), Trigger Holdoff (0.000), Pretrigger Samples (0), Trigger Slope (positive), Trigger Delay (0.000), Trigger Level (0.00), and Trigger Coupling (DC). Similar triggering parameters may be specified for the Start Trigger in the Start Trigger sub-panel (not shown).

In one embodiment, triggers and timing signals may be shared between boards (e.g., hardware components of the VIs) in the system, facilitating easy synchronization between devices and processes.

FIG. 8E illustrates addition of a second data acquisition function block, specifically, an "SMIO Acquire Signal" function block, which may be operable to acquire further data via another type of analog signal digitizer, e.g., the NI-6115 SMIO (Simultaneous-Sampling Multifunction I/O) board 712. For example, in one embodiment, the user may have invoked the corresponding SMIO Acquire Signal operation via a pop-up menu from the tool bar, right-clicking in the function block display area of the GUI, or by other means, resulting in the addition of the SMIO Acquire Signal function block in the diagram. As noted above, the function block's configuration GUI may be invoked and displayed automatically upon selection of the function block, or may be invoked explicitly by the user via interaction with the function block, as described above.

Similar to the SCOPE Acquire Signals function block example above, the SMIO Acquire Signal configuration GUI may provide one or more panels for configuring and displaying parameters regarding Configuration, Triggers and Timing, and Output Signals. As shown, in this example, the Configuration panel includes a Device field (set to Dev4: PXI-6115/ai), a Channel Configuration section with fields for Physical Channels (ai0), Input Range (ai0 max value (−0.5) and ai0 min value (−0.5)) and an a0 filter option (none), as well as an Acquisition Timing section whereby sampling specifications may be set, e.g., Acquire 1 or N Samples or Acquire Continuously, Samples to Read (2000), and Sample Rate(Hz) (200.00 k).

Other configuration panels, e.g., the Trigger and Timing panel and the Output Signals panel may provide access to other configuration parameters related to those areas of the respective signal operation, as described above. For example, in one embodiment, the user may configure the SMIO Acquire Signal function block (signal operation) to trigger based on a reference trigger from the SCOPE Acquire Signals hardware component, i.e., the Scope 710. The reference trigger may be a digital signal routed on the backplane of the PXI or PCI chassis. Thus, as noted above, timing and triggering signals may be shared between boards (e.g., hardware components of the VIs) in the system.

As FIG. 8E also shows, in this example, the configuration GUI also may be operable to display the acquired signals, here labeled "Acquired Signals" in the graph display of the configuration GUI. Note that in this embodiment, the graph includes an option for autoscaling the amplitude of the signal plot (top right of graphical display).

As the inclusion of the SMIO Acquire Signal function block in FIG. 8E was specifically to illustrate shared triggering between signal operations, the function block is not needed for the remainder of the walk-through, and so may be deleted, e.g., by right-clicking on the function block in invoke a menu, and selecting "Delete" (or equivalent). Alternatively, in one embodiment, the user may simply click on the function block and hit the "delete" key on the keyboard, whereupon the function block may be removed from the diagram.

While the above-described function blocks related to generation or acquisition of signals, other function blocks may be invoked and configured to perform analysis functions on the generated and/or acquired signals. FIG. 8F illustrates configuration of an analysis function block, specifically, the DC-RMS function block. The DC-RMS function block may operate to receive the Channel0 output signal from the SCOPE Acquire Signal function block, and compute scalar values for a DC (direct current) level and RMS (root mean square) for the signal. As FIG. 8F shows, in this embodiment, the configuration GUI displays the Channel0 signal in the graph display, labeled "Input Signal". Note that there is some distortion in the negative peaks (troughs) of the signal (rounding of the bottom peaks) caused by the filter under test.

As FIG. 8F also shows, the configuration GUI for this function block includes panels or sections with fields for specifying parameter values for the DC and RMS computations, e.g., a Measurement Setup section that includes fields for "Averaging Type" (set to linear), and "Window" (set to Rectangular), as well as an Input/Output Configuration section for setting and/or indicating Input Data (Channel0), and outputs, e.g., Output: (dc 1) and Output 2: (rms 1).

In this embodiment, the configuration GUI also includes a Measurement Results section that displays the computed results, i.e., a DC Value (51.6706 m) and an RMS Value (641.35 m), as well as controls for setting scaling values for the displayed results. Thus, in some embodiments, the configuration GUI may display both the input signal(s) and output(s) (results) for a function block. For example, if both the inputs and the outputs of a function block were signal waveforms, the configuration GUI may display both the input and the output signals in the graph display of the configuration GUI, either separately or together in a single graph as appropriate.

Note that in the Data View mode for the environment GUI, such scalar results are preferably displayed in tabular form, e.g., in the form of a spreadsheet, as opposed to a signal plot or graph.

FIG. 8G illustrates configuration and use of another example analysis function block, specifically, a Distortion analysis function block, operable to measure and analyze distortion for an input signal, in this case, the Channel0 signal. As described above, a configuration GUI for the Distortion function block may be invoked by the user, e.g., by right-clicking on the Channel0 signal or signal icon and selecting "Distortion" from a pop-up context-sensitive menu.

As FIG. 8G shows, the configuration GUI for the Distortion function block may include various panels and sections for specifying and displaying configuration parameters for the distortion analysis. For example, an Input/Output Signals configuration panel may include fields specifying and/or indicating the input signal(s) and resulting output signal(s) for the block. This information may also be indicated by the signal icons displayed by the function block itself, where in this case, the input signal is specified as "Channel0", and the output signals include "exported time signal 1", "exported spectrum 1", "fundamental frequency 1", "distortion 1", "SINAD 1", and "Harmonics 1", any of which may be displayed by the configuration GUI and/or the main display of the environment.

As shown, the configuration GUI shown in FIG. 8G for the Distortion function block also includes a Configuration panel for specifying various parameters for the analysis, e.g., a Measurement Setup section with fields such as "distortion type" (here set to Harmonic Only), Highest Harmonic (19), Export Signals(THD) (set to input signal), and an index list indicator, as well as a Measurement Results section with fields such as, for example, Detected Frequency(Hz) (9.999992 k), THD (105.5 m), and Harmonics (78.89 m).

Note that in this example configuration GUI, three types of data displays are used: scalar data are displayed numerically in the Measurement Results section, the Exported Signal is displayed in a time-domain graph (top graph), and a Power Spectrum for the Exported Signal is displayed in a frequency-domain graph (bottom graph).

In a Data View mode of the environment GUI, these data may be displayed similarly, although the scalar data is preferably displayed in tabular form (instead of numeric fields), e.g., in the form of a spreadsheet-like scalar table. For example, as described above, in one embodiment, the user may drag signal icons for the exported signal (exported signal 1) and the exported spectrum (exported spectrum 1) from the Distortion function block onto the main display of the environment GUI, thereby invoking display of the two graphs, where the particular form of the graph may be dependent upon the signal type, e.g., time-domain vs. frequency domain. The user may also drag the distortion signal icon (distortion 1) from the Distortion function block onto the main display, invoking automatic generation and display of a spreadsheet-like scalar table for the scalar data. Thus, the particular form of the display for a specified signal or data may be automatically determined based on the signal or data type of the displayed information.

Figure 8H:
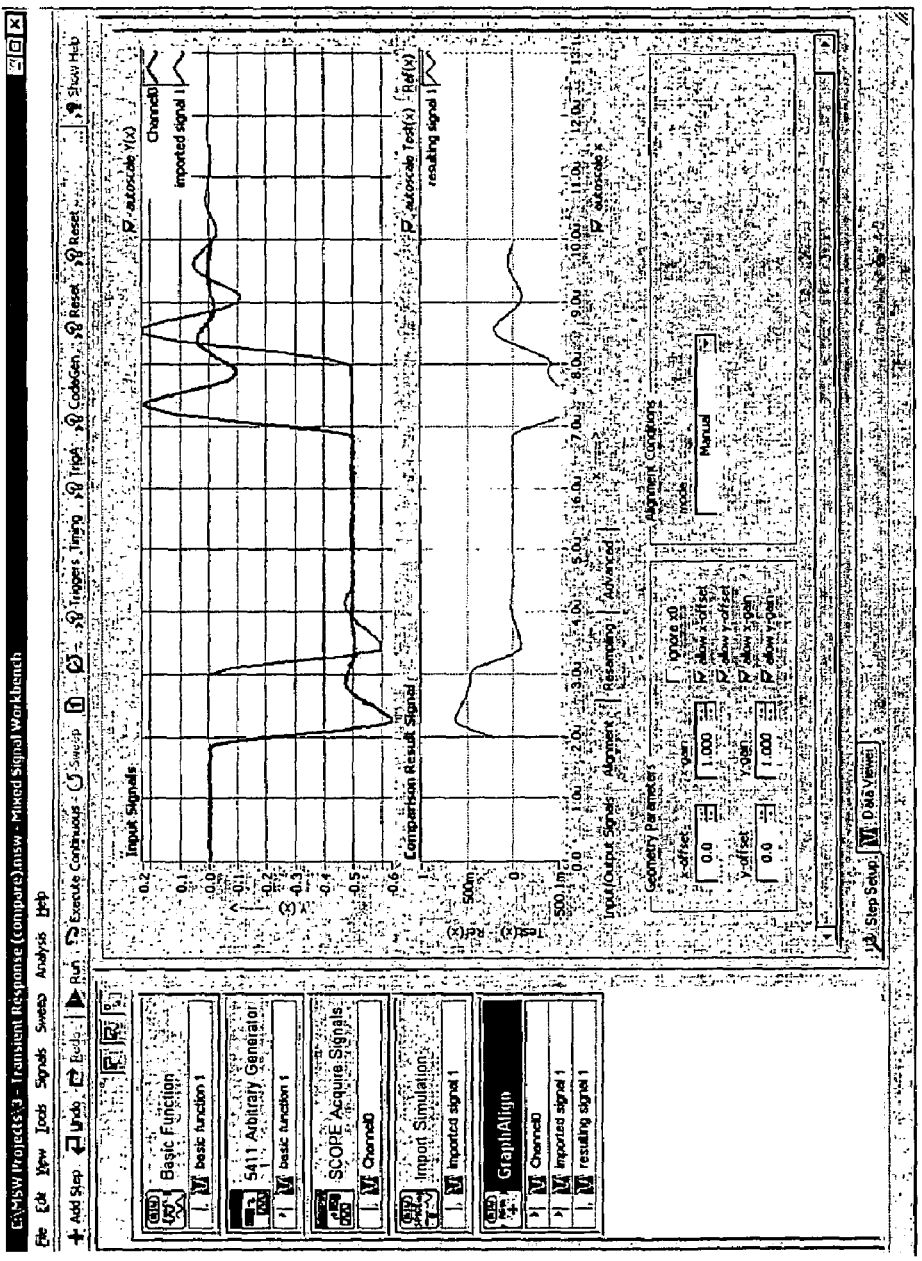
FIGS. 8H and 8I illustrate further examples and use of function blocks, according to one embodiment.
Figure 8I:
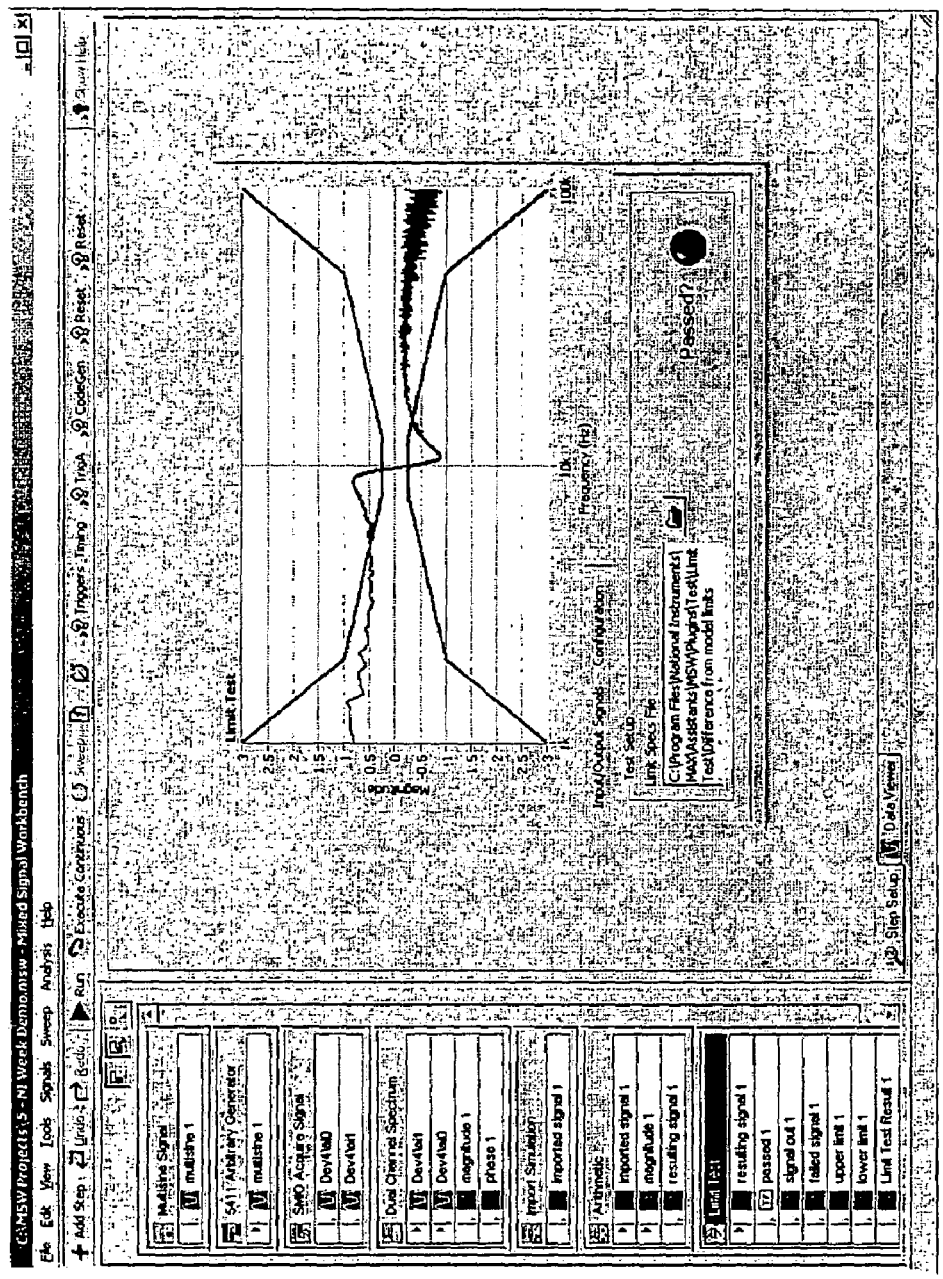

FIGS. 8H and 8I—Further Examples of Function Blocks

FIGS. 8H and 8I illustrates further examples of function blocks and their use, according to one embodiment. As noted above, the function blocks shown and described herein are meant to be exemplary only, and are not intended to limit the function blocks or their use to any particular function or form.

FIG. 8H illustrates a Graph Align function block that implements a signal alignment tool. In the embodiment shown, this tool allows the user to align two signals with each other. As described above, based on the selected (or just added) function block, the GUI may provide various display and/or configuration elements or panels in accordance with the function block.

In the embodiment shown, alignment may be performed manually or automatically. For example, the manual approach may allow the user to adjust the offset and gain of the signals by selecting a point in the graph and moving the cursor. In contrast, the automatic method may use an algorithm and the expected type of waveform (e.g., impulse/step/periodic) to perform the alignment. In either case, the offset and gain values that result in a substantial alignment of the signals are preferably returned or displayed to the user.

As FIG. 8H shows, in this embodiment, two input signals, "Channel 0", provided by the Scope Acquire Signal function block described above, and "imported signal 1", provided by an Import Simulation function block in the function sequence shown, are displayed in an upper graph display of the GUI, labeled "Input Signals". As indicated by the Graph Align function block, the two signals are received as input to the function block and a "resulting signal 1" provided as output, here shown in a lower graph display of the GUI, labeled "Comparison Result Signal".

As shown, in this embodiment, the GUI includes various tabbed configuration panels for specifying the signal alignment, including alignment conditions such as mode, shown set to "Manual", and geometry parameters for setting gain and offsets for the signals to effect the alignment, which may be set using the spinner controls and/or check boxes shown. In one embodiment, the user may also modify the parameters directly by entering a numeric value. As FIG. 8H also shows, in some embodiments, additional configuration panels may facilitate further operations or configuration, including, for example, re-sampling of one or more of the signals.

Thus, the Graph Align function block may be included in the function sequence, and configured to facilitate manual or automatic alignment of two or more signals, thereby providing further means for characterizing or analyzing signals.

FIG. 8I illustrates various other example signal analysis function blocks and their use in an example test sequence. As FIG. 8I shows, in this embodiment, the test sequence includes a "Multisine Signal" function block that operates to provide sine wave signal data, the Arbitrary Generator (type or model 5411) function block described above, operable to receive the sine wave signal data and generate a signal "multisine 1", an SMIO Acquire Signals function block for acquiring and providing analog input signals Dev4\ai0 and Dev4\ai1 (e.g., from Device 4), a Dual Channel Spectrum function block, operable to receive the Dev4\ai0 and Dev4\ai1 signals and output magnitude and phase signal information (magnitude 1 and phase 1) for the signals, an Import Simulation function block, operable to provide an imported simulation-generated signal "imported signal 1", an arithmetic function block, operable to receive the magnitude 1 and imported signal 1, and output a resulting signal, in this case, "resulting signal 1".

Finally, the signal "resulting signal 1" is provide to a Limit Test function block (according to one embodiment), which performs a limit test on the signal, illustrated graphically in a graphical display of the GUI labeled "Limit Test". As FIG. 8I shows, in this embodiment, the Limit Test function block outputs various signals and/or data, including a "passed 1" signal, "signal out 1", "failed signal 1", "upper limit 1", "lower limit 1", and a "Limit Test Result 1" signal, indicating specifics of the test and its results.

As FIG. 8I also shows, in this embodiment, the GUI includes a configuration panel whereby the user may specify or determine a "Limit Specs" file for specifying various aspects of the limit test, and which also displays a visual or graphical indicator of whether the test was passed or failed, labeled "Passed?". As illustrated in the graphical display, in this particular example, the signal has violated the limits, and so has failed the limit test.

Thus, various function blocks may be defined and used to perform any of a variety of analyses, operations, and tests, using embodiments of the systems and methods described herein.

Figure 9:
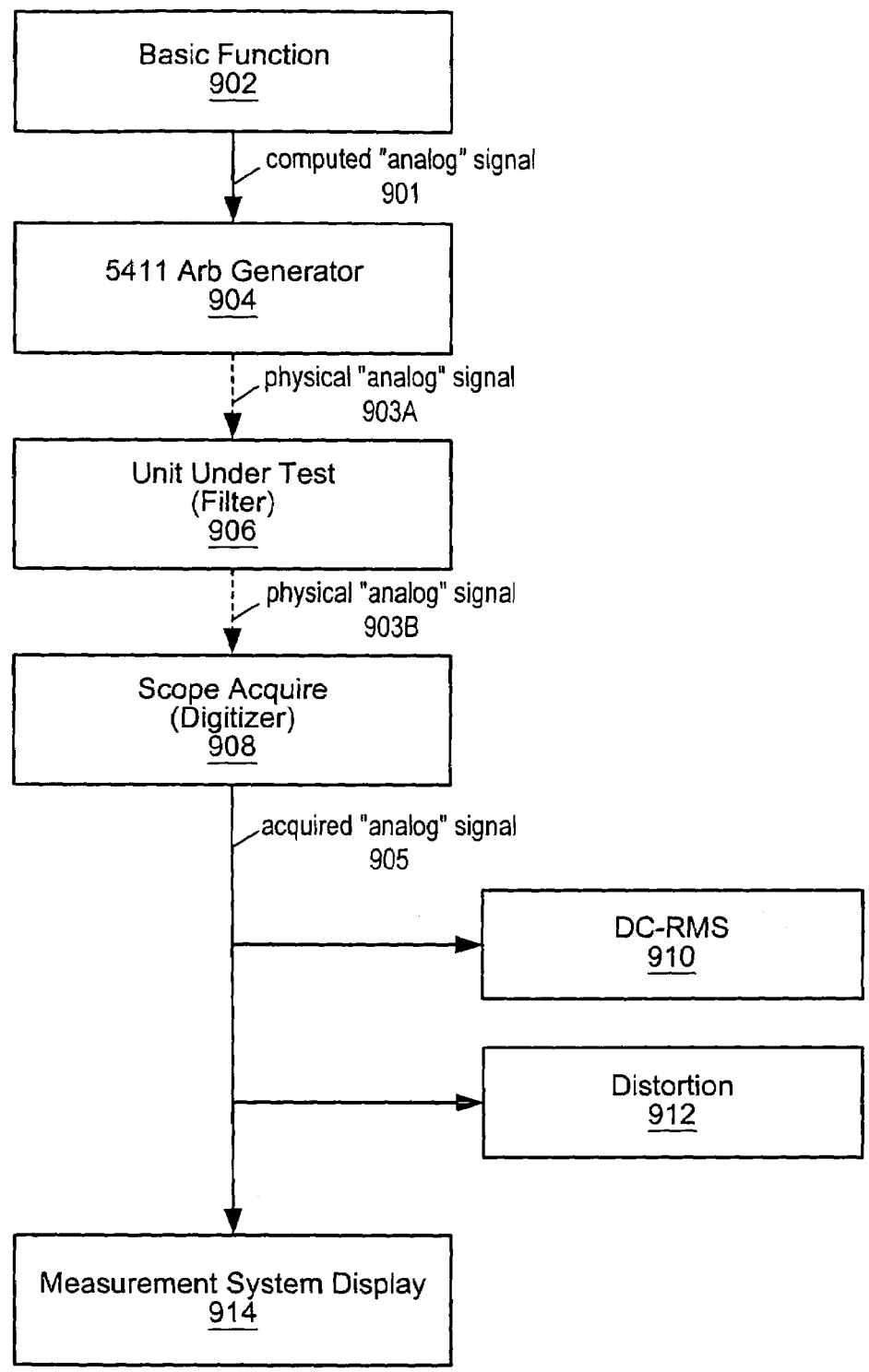
FIG. 9 is a data flow diagram of the example system and process of FIGS. 8A-8G, according to one embodiment.

FIG. 9—Data Flow Diagram for the System of FIGS. 8A-8G

FIG. 9 is an example data flow diagram for the example system and process described above with reference to FIGS. 7-8G, according to one embodiment. More specifically, FIG. 9 illustrates the flow of data and/or signals in terms of the function blocks specified and configured above. It should be noted that the data flow diagram shown is exemplary only, and is not intended to limit the invention to any particular form, organization, operations, or functionality. In this example, Basic Function function block 902 couples to 5411 Arbitrary Waveform Generator 904, which in turn couples to Unit Under Test (UUT) 906, i.e., the LC-Diode Filter mentioned above. The UUT 906 further couples to Scope Acquire (digitizer) 908, which also couples to DC-RMS function block 910 and Distortion function block 912. In the embodiment shown, the Scope Acquire 908 also couples to Measurement Display System 914, e.g., the graphical display of the GUI. Note that in this example, the UUT 906 and the Measurement System Display 914 are not function blocks, but rather respectively comprise hardware coupled to the host computer 82, and a graph or display window of the GUI, while the other blocks shown represent exemplary function blocks, as described above.

As FIG. 9 shows, the Basic Function function block 902 operates to generate a computed "analog" signal 901, i.e., digital data that describes a desired analog signal, here shown provided to the 5411 Arbitrary Waveform Generator 904. As described above, the Arb 904 may operate to receive the computed "analog" signal 901 and generate a physical analog signal 903A, i.e., the actual analog signal specified or represented by the computed "analog" signal 901, providing the generated physical analog signal 903A to the UUT 906, e.g., as a test signal for the LC-Diode filter.

As FIG. 9 also shows, the UUT 906 processes (filters) the physical analog signal 903A and produces a resultant (filtered) physical analog signal 903B as output. The physical analog signal 903B is then shown provided to the Scope Acquire (digitizer) function block 908 as input. The Scope Acquire (digitizer) may operate to digitize the physical analog signal 903B and may generate acquired "analog" data 905 comprising the digitized signal. Note that the Scope Acquire function block 908 represents a VI which in this example includes both a software portion (e.g., a graphical program) and a hardware component, e.g., a "scope" card coupled to the host computer 82. Thus, the Scope Acquire VI operates to acquire the physical analog signal 903B, and, as shown, may provide the acquired "analog" data 905 to two additional function blocks, namely, DC-RMS function block 910 and Distortion function block 912, each of which may perform a respective analysis function on the acquired "analog" data 905, as described above.

Note that as shown, the Scope Acquire function block 908 may also provide the acquired "analog" data 905 to the Measurement System Display 914 for graphical display of the data. In other words, in addition to providing the acquired data 905 as input to the two analysis function blocks 910 and 912, the Scope Acquire function block 908 also provides the data 905 to a visualization component of the GUI, i.e., a graph, for viewing by the user. It should be noted that this particular I/O relationship (between the Scope Acquire function block 908 and the Measurement System Display 914) is exemplary only, and that in alternate embodiments, the acquired data 905 may be processed first by one or more analysis function blocks, e.g., by one or both of the DC-RMS function block 910 and Distortion function block 912, and then provided to the Measurement System Display 914 for graphical presentation. In other words, rather than providing the acquired data 905 directly to the Measurement System Display 914, the Scope Acquire function block 908 may provide the acquired data 905 to one or more analysis function blocks, which may process or operate on the data and then provide the processed data to the Measurement System Display 914.

Thus, the system may perform a specified signal analysis function in accordance with I/O relationships specified by the user between user-specified function blocks, a UUT, and the GUI. It should be noted that more complex systems and processes may also be implemented, where, for example, a plurality of UUTs and/or a plurality of VIs and additional hardware devices, e.g., standalone instruments, may couple to a variety of function blocks, and where the system operates to perform a complex signal analysis function on one or more signals and graphically display one or more results.

It should be noted that in some embodiments, the details of the configuration GUI for a function block may change automatically based on the input and output signals for the block, or may be modified explicitly by the user. It should be further noted that in some embodiments, any of the function blocks may be added, removed, and/or modified at edit time and/or at runtime.

Figure 10:
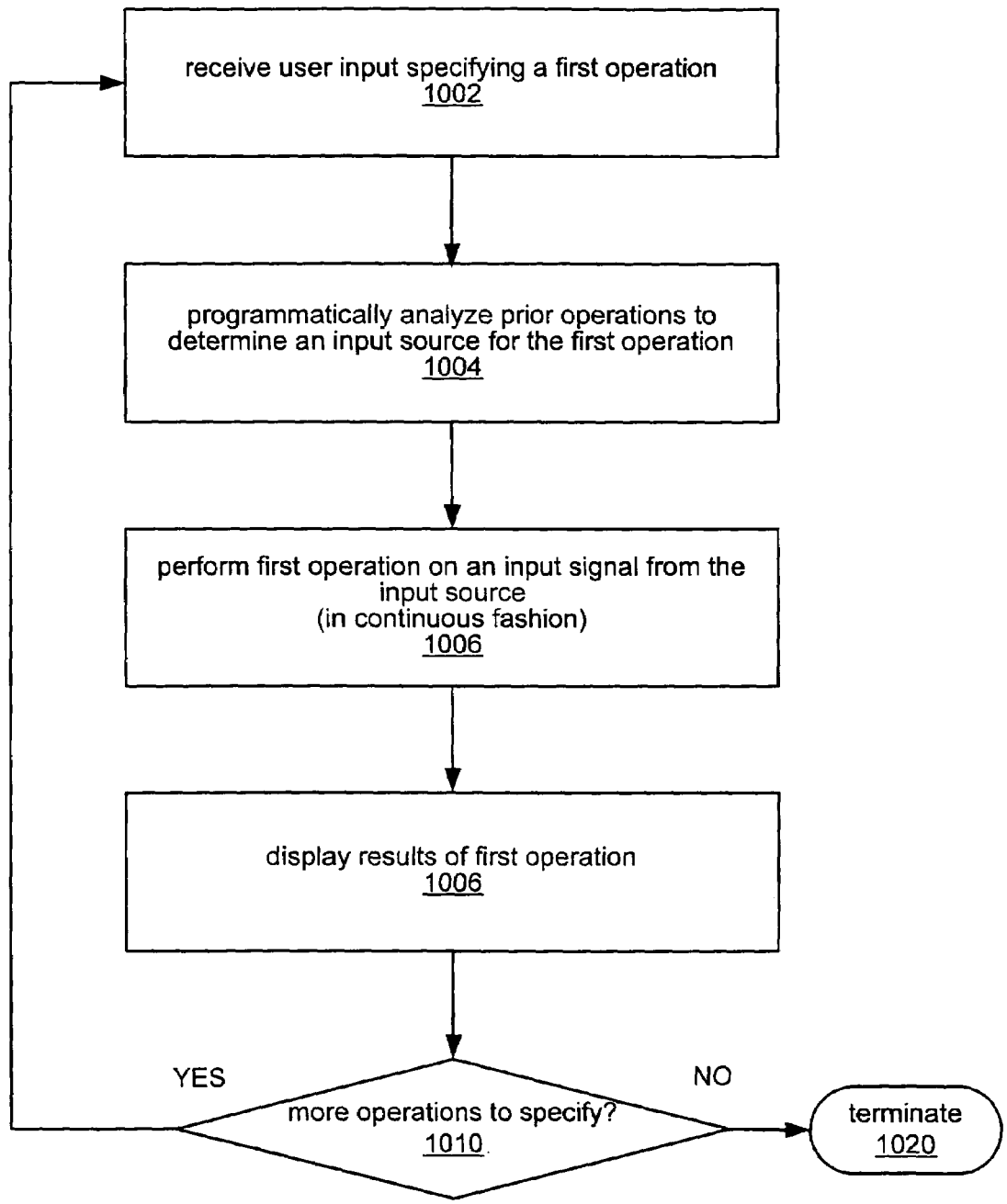
FIG. 10 flowcharts one embodiment of a method for automatically configuring function blocks of a signal analysis function, according to one embodiment.

FIG. 10—Automatic Configuration of Function Blocks

In one embodiment of the present invention, input and/or output sources for a selected function block (signal operation) may be automatically selected by the system, e.g., based on heuristics or other rules. In other words, in embodiments where each signal operation is comprised in or associated with a respective function block, when a first function block is selected by the user that requires an input signal of a certain type, the system may attempt to programmatically determine a prior selected function block that provides as output a signal of that type, and may automatically assign that signal/function block as the input for the first function block.

FIG. 10 is a flowchart of one embodiment of a method for specifying a signal analysis operation. More specifically, FIG. 10 flowcharts one embodiment of a method for programmatic (automatic) configuration of a function block. It should be noted that in various embodiments, some of the steps shown may be performed concurrently, in a different order than shown, or omitted. Additional steps may also be performed as desired.

As FIG. 10 shows, in 1002, user input specifying a first operation may be received, where the operation implements at least a portion of a signal analysis function. In other words, the user may select or invoke a signal operation as described above with reference to FIG. 5, e.g., by right-clicking on a prior function block, signal plot or signal icon, thereby invoking a menu, or otherwise invoking presentation of selectable operations, and selecting the first operation therefrom.

Then, in 1004, prior operations input by the user may be programmatically analyzed to determine an input source for the first operation, where the input source provides a first input signal. In other words, operations that have already been specified previously by the user may be analyzed to find an operation that provides an output signal suitable for use as input to the first operation.

For example, in one embodiment, programmatically analyzing prior operations input by the user to determine an input source for the first operation may include programmatically analyzing the first operation to determine one or more appropriate signal types for the first operation, and determining a prior operation of the prior operations that provides an output signal of an appropriate signal type, where the appropriate signal type includes one of the determined one or more appropriate signal types for the first operation, where the prior operation includes the input source, and where the output signal includes the first input signal.

In some embodiments, the first operation may require a plurality of inputs, and so programmatically analyzing prior operations input by the user to determine an input source for the first operation may include programmatically analyzing the first operation to determine one or more inputs required for the first operation and respective data types of each of the one or more inputs, and determining one or more prior operations of the prior operations that provide respective output signals of the respective data types, where the one or more prior operations include the input source, and where the respective output signals include the first input signal.

In one embodiment, the method may also include assigning the output signal (or signals) of the appropriate signal type to the first operation as the first input signal. Said another way, once an output signal has been determined that is of the appropriate type, then the first operation may be configured to receive the determined output signal (or signals) as input.

As noted above, in one embodiment, the first operation may correspond to a first function block. In this case, programmatically analyzing the first operation to determine one or more appropriate signal types for the first operation may include querying the first function block to determine the one or more appropriate signal types for the first operation. Similarly, where the first operation requires a plurality of input signals, programmatically analyzing the first operation to determine one or more appropriate signal types for the first operation may also include querying the first function block to determine a number of inputs required for the first operation, and programmatically analyzing prior operations input by the user to determine a plurality of input sources for the first operation corresponding to the number of input signals required for the first operation.

In another embodiment, determining a prior operation of the prior operations that provides an output signal of the appropriate signal type may include querying a database to determine the prior operation that provides an output signal of the appropriate signal type, where the database includes information indicating respective output signal types of the prior operations. It should be noted that in various embodiments, the database may be stored and accessed on the host computer 82, or on a computer coupled to the host computer 82, e.g., over a network, such as, for example, the Internet.

In one embodiment, querying the database to determine the prior operation that provides an output signal of the appropriate signal type may include analyzing input/output (I/O) dependencies among the prior operations and the first operation, where the I/O dependencies indicate a proximity ordering of the prior operations with respect to the first operation, and then querying the database based on the proximity ordering of the prior operations, beginning with an initial prior operation that is closest to the first operation with respect to I/O dependencies, and ending as soon as a prior operation is found that provides an output signal of the appropriate signal type. In other words, the method may include analyzing the prior operations regarding input signal types and sources, and output signal types and sources for the prior operations and the first operation to determine an ordering of the operations (proximity ordering) based on the input and output dependencies of the operations, where, for example, each operation is considered adjacent to another if the output of one is the input of the other. Thus, in one embodiment, the proximity ordering may reflect or correspond to a breadth first traversal of a dependency graph (in a computer science theoretic sense) for the set of operations.

In an embodiment where the first operation requires a plurality of input signals, and where each of the plurality of input signals has a respective signal type, querying the database to determine the prior operation that provides an output signal of the appropriate signal type further may include, for each of the plurality of input signals, querying the database based on the proximity ordering of the prior operations, beginning with an initial prior operation that is closest to the first operation with respect to I/O dependencies, and ending as soon as a prior operation is found that provides an output signal of the appropriate signal type. In other words, the method may iterate through the plurality of input signals for the first operation, and for each input signal, analyze the prior operations according to the proximity ordering to determine the prior operation (if any) that produces an output signal of the same type as (or a type compatible with) the input signal.

In another embodiment where the first operation requires a plurality of input signals, and where each of the plurality of input signals has a respective signal type, querying the database to determine the prior operation that provides an output signal of the appropriate signal type may include iteratively querying the database regarding each of the prior operations to determine one or more prior operations that provide respective output signals of each of the respective signal types, based on the proximity ordering of the prior operations, beginning with an initial prior operation that is closest to the first operation with respect to I/O dependencies, and ending as soon as prior operations are found that provide respective output signals of the respective signal types or when there are no further prior operations to consider. In other words, the method may iterate over the prior operations according to the proximity ordering, querying the database regarding each operation and comparing the output signal (or signals) from the operation to determine whether the output signal is of the same as, or a compatible type with, any of the input signals of the first operation.

As noted, in a preferred embodiment, the method may stop searching for an input source for a particular input signal of the first operation as soon an input source is found that provides an output signal of the appropriate type.

Thus, an input source (or input sources) may be determined that provides signals suitable for input to the first operation.

In 1006, the first operation may be performed on the first input signal received from the input source, thereby producing an output signal. As mentioned above, in a preferred embodiment, the first operation may be performed in a substantially continuous manner, thus, the first operation may (in continuous fashion) process signals from the determine input source and generate corresponding output signals.

In response to performing the first operation in 1006, in one embodiment, the output signal may be displayed on a display, e.g., in a GUI displayed by a display device such as a computer monitor, as indicated in 1008. For example, as described above, the output signal may be displayed in the display section of the GUI as a signal plot or graph, as tabular data, e.g., in a spreadsheet type format, and/or via other information display means, such as, for example, software-implemented indicators, e.g., gauges, meters, digital displays, and so forth.

As indicated in 1010, the method may determine whether there are additional operations to be specified by the user, e.g., based on user input, and, if no further operations are to be specified, the method may terminate, as indicated in 1020. If the method determines that further operations are to be specified, then the method may continue with step 1002 and proceed as described above, where the programmatically analyzing, performing, and displaying may be performed for each of a plurality of first operations input by the user.

In one embodiment, if none of the prior operations provides an output signal of the appropriate type, the method may facilitate selection of a different operation by the user as a signal source for the first operation. For example, programmatically analyzing prior operations input by the user to determine an input source for the first operation may include programmatically analyzing the first operation to determine one or more appropriate signal types for the first operation, determining whether any prior operation of the prior operations provides an output signal of an appropriate signal type, where the appropriate signal type includes one of the determined one or more appropriate signal types for the first operation, and, if any prior operation of the prior operations provides an output signal of an appropriate signal type, assigning the output signal of the appropriate signal type to the first operation as the first input signal, as described above.

If no prior operations provide an output signal of an appropriate signal type, then one or more additional operations that provide an output signal of the appropriate signal type may be displayed, and additional user input received selecting an additional operation from the additional operations, where the additional operation includes the input source for the first operation, and where the output signal of the additional operation includes the first input signal. In other words, if a suitable prior operation cannot be found, additional operations may be presented to the user for selection, where the additional operations each preferably provide an output signal of the appropriate type for use as input to the first operation. Said another way, if no prior operation provides an output signal that is suitable for use as input by the first operation, the method may determine one or more other operations that provide a signal suitable for input to the first operation (e.g., that have not been previously included or selected by the user), and present these one or more other operations to the user for selection. For example, the one or more other operations may be presented in a palette, as options in a menu or dialog, or by any other means, as is well known in the art.

In a preferred embodiment, upon selection (by the user) of an additional operation, the method may further include programmatically analyzing prior operations input by the user to determine an input source for the additional operation, where the input source provides an additional input signal, and performing the additional operation on the additional input signal received from the input source, thereby producing an additional output signal. In other words, once the additional (the other) operation is selected by the user, the method may attempt to automatically determine an input signal source for the additional operation, as described above with respect to the first operation.

As mentioned above, in a preferred embodiment, the first operation and the prior operations each correspond to a respective function block. In one embodiment, the method may further include receiving user input modifying a configuration of a first function block, thereby changing input signal specifications for a corresponding operation, where original input signal specifications for the corresponding operation specify a first input signal type for the corresponding operation, and where the changed input signal specifications specify a second, different, input signal type for the corresponding operation. In other words, once one or more operations have been specified by the user, resulting in a corresponding one or more function blocks being displayed in the GUI (and the performance of the one or more operations), the user may provide input modifying one or more parameters for one of the function blocks, where the corresponding operation functions in accordance with the one or more parameters, and where the modified function block and corresponding operation require an input signal of the second, different, input signal type.

Prior operations input by the user may then be programmatically analyzed to determine an input source for the corresponding operation, where the input source provides the second input signal of the second, different, input signal type, and the corresponding operation performed on the second input signal received from the input source for the corresponding operation, thereby producing a corresponding output signal.

In one embodiment, the respective function blocks may be displayed in a diagram that visually represents I/O relationships between the function blocks, as described in some detail above. In one embodiment, when the I/O relationships between the function blocks change (e.g., as a result of modifying one or more of the function block/operation configurations, the addition or removal of an operation, etc.), the diagram may be automatically updated in accordance with the changed I/O relationships between the function blocks. For example, if the user modifies a function block/operation to receive a different type of input signal than was originally specified, and the method automatically determines an assigns a different input signal source (i.e., a different function block) than currently specified (replacing the original input source for that function block), the diagram may be automatically updated to reflect the new configuration of or I/O relationships between the function blocks.

The techniques described above with respect to input signals for the first operation or function block may also be applied with respect to output signals. For example, in an embodiment where the first operation and each of the prior operations corresponds to a respective function block, the method may also include receiving user input modifying a configuration of a first function block, thereby changing output signal specifications for a corresponding operation, where original output signal specifications for the corresponding operation specify a first output signal type for the corresponding operation, and where the changed output signal specifications specify a second, different, output signal type for the corresponding operation. The prior operations input by the user may be programmatically analyzed to determine one or more function blocks configured to receive an output signal of the first function block according to the original output signal specifications, and if the one or more function blocks are configurable to receive the output signal according to the changed output signal specifications, the one or more function blocks may be configured to receive the output signal according to the changed output signal specifications.

In one embodiment, if the one or more function blocks are not configurable to receive the output signal according to the changed output signal specifications, for each respective function block of the one or more function blocks, prior operations input by the user may be programmatically analyzed to determine an input source for the respective function block (e.g., to replace the original or current specified input signal), where the input source provides a respective input signal, and the corresponding operation of the respective function block performed on the respective input signal received from the input source, where said performing produces a respective output signal.

In other words, if a function block or operation is modified to output a different type of signal (instead of the type originally or previously specified), then any function blocks that are currently configured to receive an input signal of the original type may require a different input signal source to provide an input signal of the appropriate type (e.g., of the original type or of a type compatible with the original type), and so the prior operations may be analyzed to determine suitable input signal sources for the function blocks. Similar to the above, once the results of the modifications have been propagated through the function blocks, the function block diagram is preferably updated automatically to reflect any changes in the I/O relationships between the function blocks.

Thus, various embodiments of the systems and methods described above may operate to automatically determine input signal sources for selected function blocks or operations, thereby determining and/or modifying I/O relationships between the function blocks or operations, and optionally, to automatically update a function block diagram to reflect the I/O relationships.

FIGS. 11A-13E—Sweep Manager

In many signal analysis applications, e.g., device testing, values of one or more parameters may be varied during iterative performance of a function to characterize the UUT over a range of conditions, referred to as a parameter sweep or simply a sweep. For example, a signal analysis function may include one or more signal operations that may be specified for inclusion in a sweep, i.e., in a sweep loop.

In one embodiment, a GUI, e.g., the signal analysis function development environment GUI described above, may be provided that facilitates user specification of a sweep as part of a signal analysis function. FIGS. 11A-13E illustrate various embodiments of such a GUI and a method of use. The sweep-related functionality described below may be referred to as a sweep manager, where in various embodiments, the sweep manager may include a plurality of dialogs, menus, or other GUI elements, etc., e.g., in the form of a wizard or a graphical application program interface (API), whereby the user may interactively specify (and optionally perform) a sweep. It should be noted that the embodiments shown are intended to be exemplary only, and are not intended to limit the sweep manager to any particular functionality or appearance.

Figure 11A:
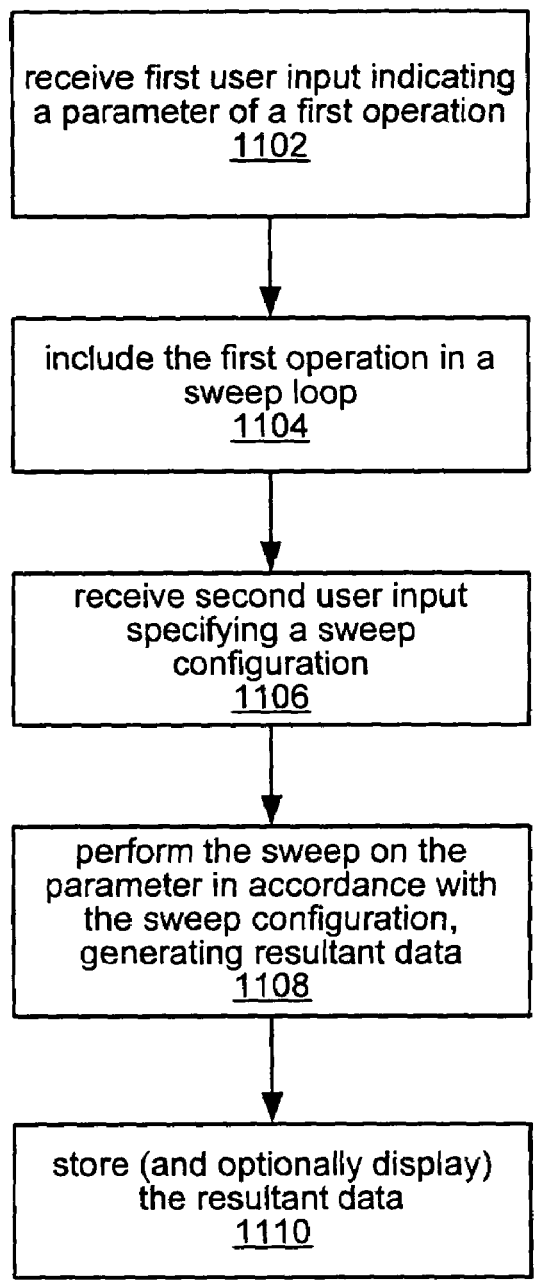
FIGS. 11A and 11B are flowchart diagrams illustrating embodiments of a method for specifying and performing a sweep as part of a signal analysis function.
Figure 11B:
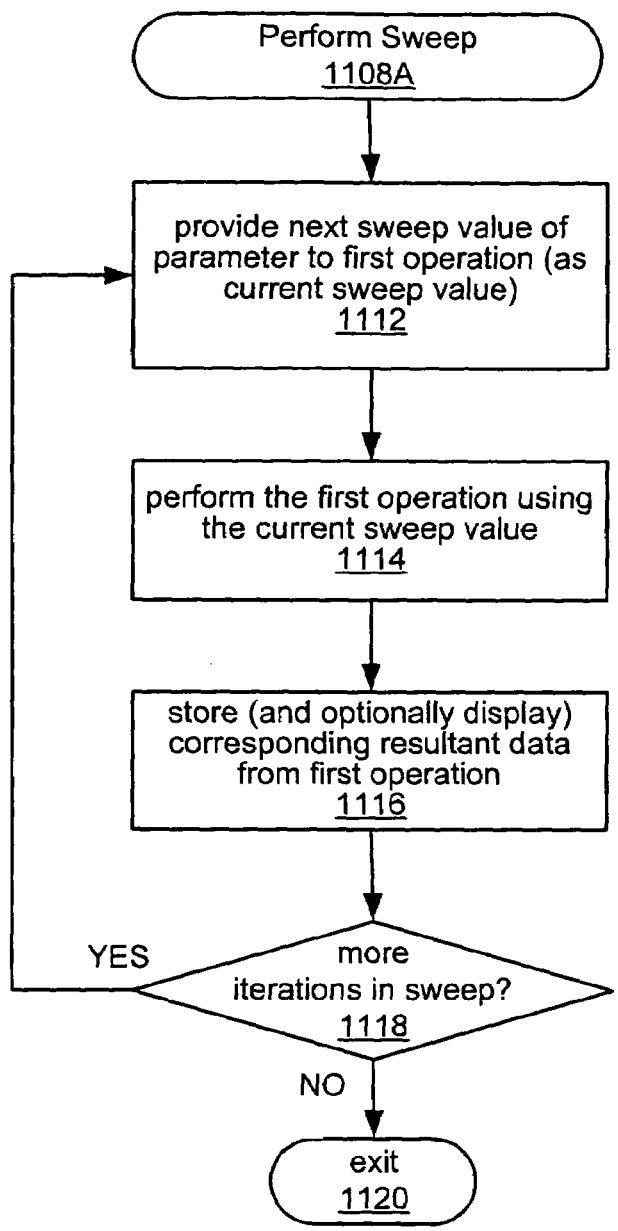

FIG. 11A is a flowchart diagram of a computer-implemented method for specifying and performing a sweep, e.g., in a signal analysis function, according to one embodiment. FIG. 11B is a more detailed flowchart diagram of another embodiment of the method of FIG. 11A. FIGS. 12A-13E illustrate embodiments of a GUI whereby a user may specify the sweep as part of the signal analysis function. More specifically, FIGS. 12A-12D illustrate an embodiment of the GUI in the form of a wizard whereby the user may specify the sweep by navigating through a sequence of dialogs. FIGS. 13A-13E illustrate an embodiment of the GUI in which various configuration dialogs are invoked by the user to specify the sweep.

It should be noted that in various embodiments, some of the steps shown in FIGS. 11A and 11B and described below may be performed concurrently, in a different order than shown, or omitted. Additional steps may also be performed as desired. As shown, this method may operate as follows.

As FIG. 11A shows, in 1102, first user input indicating a parameter for a first operation may be received, where the operation implements at least a portion of a signal analysis function. Receiving the first user input indicating the parameter for the first operation may be performed in a variety of different ways. For example, the user may provide the name of the parameter (and/or the first operation) to a text entry field, or may invoke display of parameters for the first operation, and select the desired parameter, e.g., with a pointing device, such as a mouse. Other means of receiving user input indicating the parameter are also contemplated.

Figure 12A:
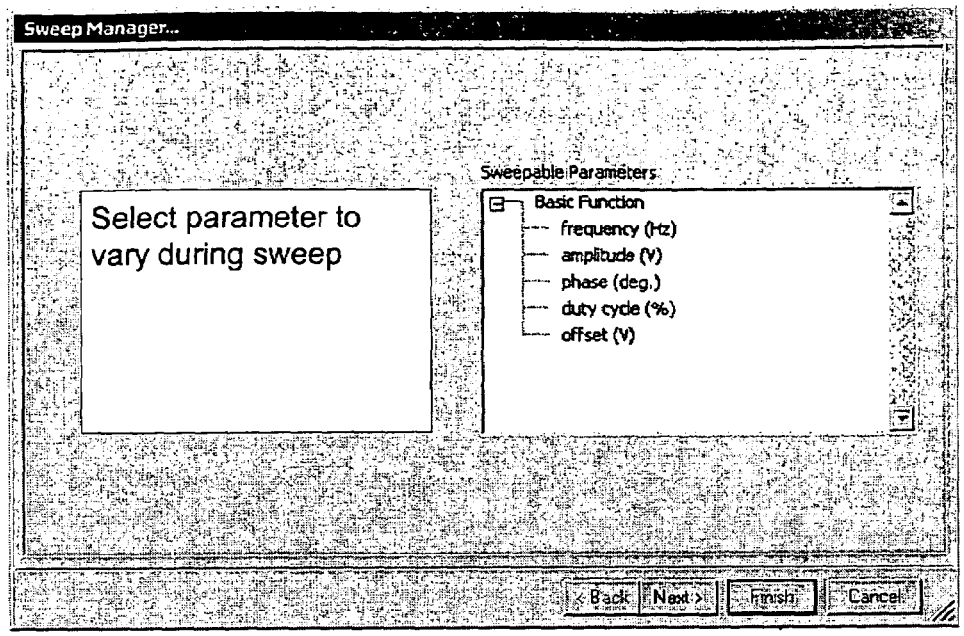
FIGS. 12A-12D illustrate an embodiment of a graphical user interface for performing the methods of FIGS. 11A and 11B.

FIG. 12A illustrates one embodiment of a GUI that may operate to display the parameters (e.g., sweepable parameters) of the first operation, and may further operate to receive the first user input indicating the parameter to be swept on. The GUI may be invoked by any of various means, e.g., by right-clicking on the function block of the first operation (in this particular example, the Basic Function function block) to invoke an options menu, and selecting a "Sweep Manager" option (or equivalent). As another example, the user may invoke the sweep manager from a menu in the development environment, and provide input indicating the first operation and/or the parameter. Other means of invoking the GUI are also contemplated.

As FIG. 12A shows, the GUI preferably includes a display of sweepable parameters for the first operation. In this embodiment, a dialog including a tree diagram is provided for displaying the parameters, where the parameters are each selectable with a pointing device, e.g., a mouse. Thus, the GUI may receive the user input indicating the parameter. In one embodiment, an indication that the parameter has been selected may be provided by the GUI. For example, in one embodiment the name of the selected parameter may be highlighted, as is well known in the art. Note that in the embodiment shown, "Back", "Next", "Finish", and "Cancel" buttons are provided for navigating through the sweep specification process. In other words, as noted above, the GUI presented in FIGS. 12A-12D is in the form of a wizard, whereby the user is guided through the sweep specification process via a plurality (sequence) of dialogs or panels.

In 1104, the first operation may be programmatically or automatically included in a sweep loop. In other words, the operation corresponding to the selected parameter may be included in the sweep, such that when the signal analysis function is performed, the first operation may be executed in the sweep, where the first operation is performed iteratively as the parameter is varied. Note that the first operation may be included in the sweep loop programmatically because when the user indicates the parameter to be swept on in 1102, the system (e.g., the development environment) can determine the operation to which the parameter belongs or corresponds, and thus can automatically include the operation in the sweep loop.

In 1106, second user input specifying a sweep configuration for a sweep on the indicated parameter may be received. In other words, the user may provide input configuring the sweep, e.g., via one or more dialogs, wizard, etc. For example, in one embodiment, specifying the sweep configuration may include specifying one or more of: a range of values for the indicated parameter, a number of iterations for the sweep (i.e., the number of values of the parameter or data points used in the sweep), an interpolation type, a step size for the sweep on the indicated parameter, one or more specific values in the range of values for the parameter; and a source for at least a portion of the sweep configuration, e.g., a file or user input. Note that some of these configuration parameters are redundant, e.g., the step size may be computed from the range and the number of points or values of the parameters (increments), assuming equal increments in the value.

Figure 12B:
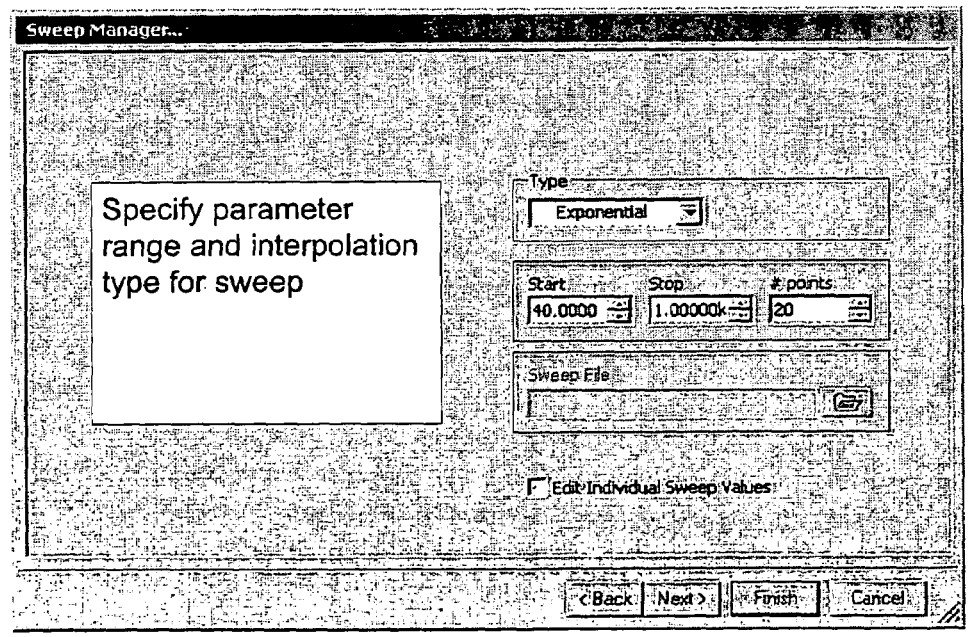

FIG. 12B illustrates another (wizard) dialog of the GUI mentioned above, whereby the user may view and set values of configuration parameters specifying the sweep. As FIG. 12B shows, in this example, GUI elements are provided for entry and display of interpolation type (shown set to "exponential"), start and stop values for the parameter indicating the parameter range for the sweep, and a value for the number of points (i.e., the number of values of the parameter) for the parameter sweep. Note that the number of points for the parameter sweep generally corresponds to the number of iterations of the sweep over that parameter, although in nested sweeps involving multiple parameters, described in more detail below, the sweep may include multiple passes through the range of a given parameter, and so the total number of iterations in the sweep may be greater than the number of data values for that parameter. As FIG. 12B also shows, in one embodiment, the user may provide a file name, e.g., a sweep file, which the system may use to access sweep configuration information stored in the file, and thus configure the sweep.

Figure 12C:
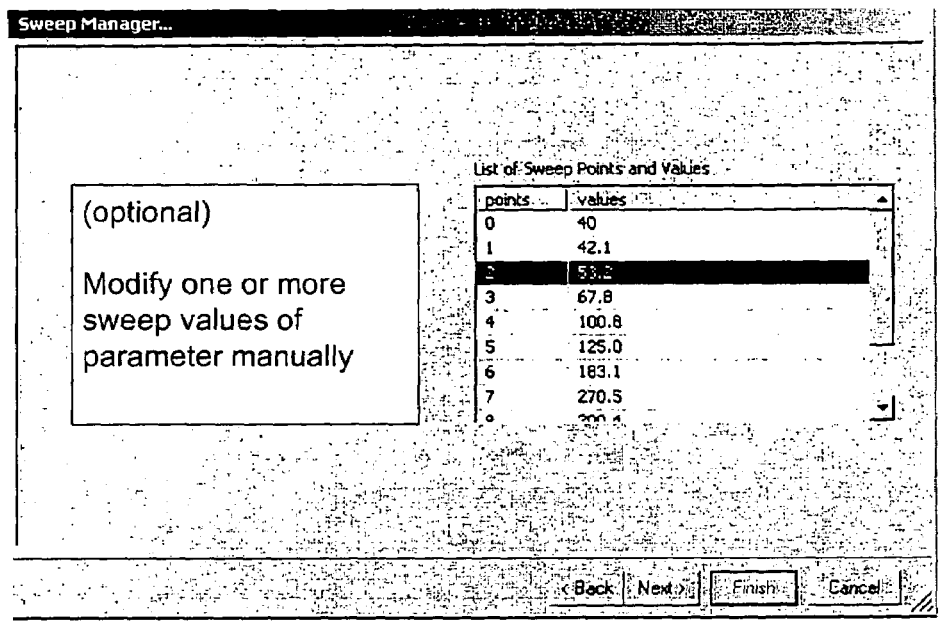

In one embodiment, the sweep values may be calculated based on the range provided by the user in 1106. However, in some cases, the user may wish to set or edit one or more of the calculated values "by hand", i.e., manually. For example, if the sweep is over a parameter on a hardware device, it may be that one or more of the calculated values may not be valid for that device, i.e., may not be allowable values according to the specification of the device. Allowing the user to manually edit a value may obviate having the calculated values be coerced at runtime by the application (i.e., the signal analysis function). Thus, in one embodiment, the GUI may include an "Edit Individual Sweep Values" field whereby the user may indicate that individual parameter values in the parameter range are to be modified manually. FIG. 12C illustrates a dialog for making such modifications.

As FIG. 12C shows, in one embodiment, a dialog or panel (or other GUI element) may be provided (e.g., invocable by the user) whereby the user may manually modify specific values in the range of values for the parameter. In the example of FIG. 12C, point or data value number 2 has been selected by the user to modify. In this example, the user may simply type in a new value, and so modify the relevant point or value.

Figure 12D:
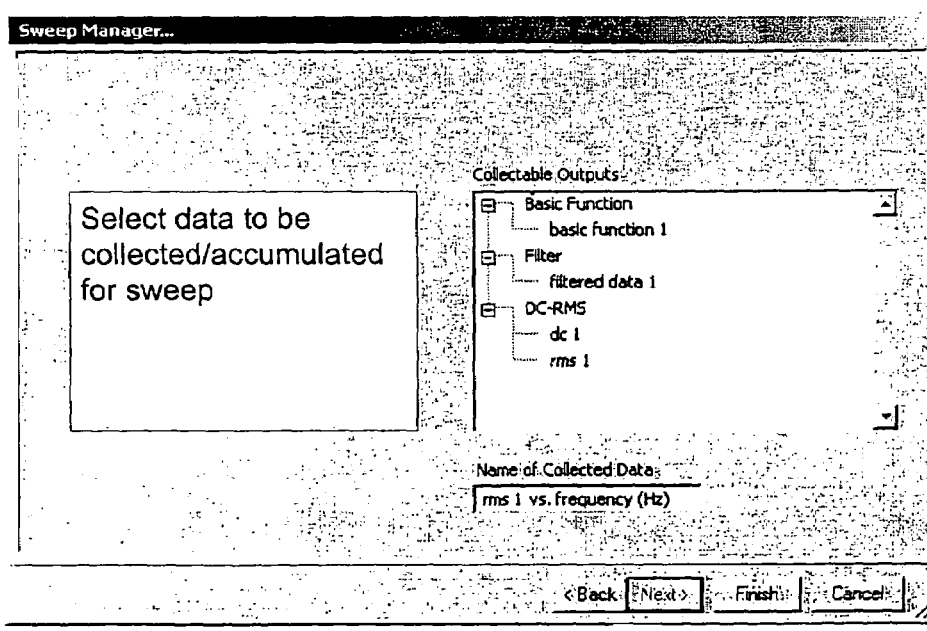

In one embodiment, specifying a sweep configuration may include specifying resultant data from the sweep. In other words, the user may specify output or results for the sweep, e.g., data that may be collected or accumulated and saved during the sweep, e.g., for each iteration of the sweep. FIG. 12D illustrates a dialog that displays selectable outputs for the sweep, e.g., outputs corresponding to one or more of the signal operations (function blocks) included in the signal analysis function. As FIG. 12D shows, in this example, a tree diagram is displayed in the dialog, where the tree diagram presents output signals or data (names or icons) corresponding to operations or function blocks (also shown), e.g., "basic function 1" from the Basic Function function block, "filtered data 1" from the Filter function block, and "dc 1" and "rms 1" from the DC-RMS function block. As FIG. 12D also shows, in one embodiment, a field may also be provided whereby the user may enter a name of the specified output(s), e.g., "rms 1 vs. frequency (Hz)", as shown. In one embodiment, a file browser may be provided to allow the user to browse the computer system for a desired configuration file.

FIGS. 13A-13E illustrate embodiments where the sweep functionality is represented by a sweep function block. The sweep function block may be invoked and included in a function block diagram as described above in detail, and illustrated in FIG. 13A. As also described above, the function block (the sweep function block) may have corresponding configuration dialogs (or equivalents) that the user may invoke to display and/or edit parameters associated with the function block.

Figure 13A:
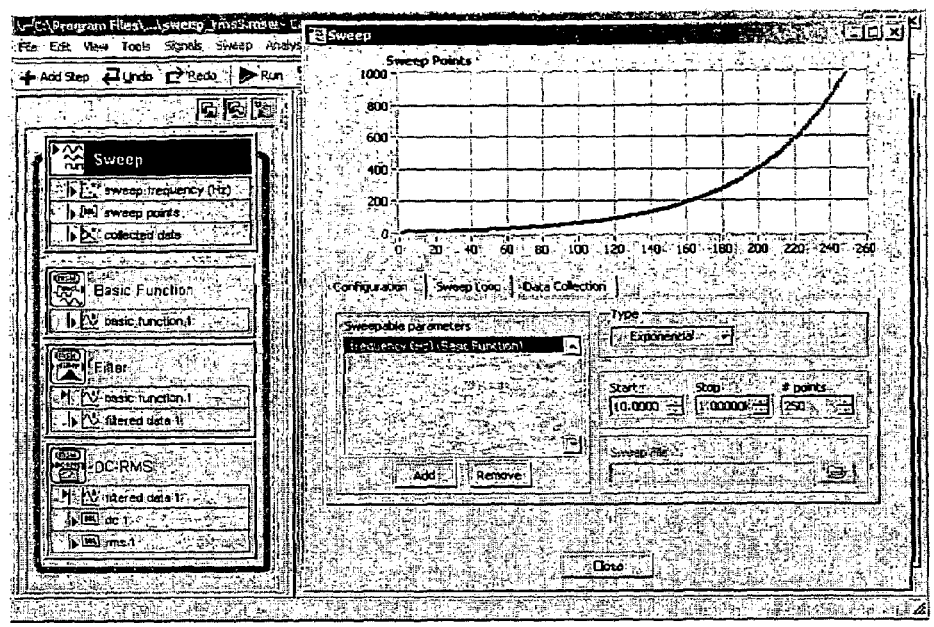
FIGS. 13A-13H illustrate another embodiment of a graphical user interface for performing the methods of FIGS. 11A and 11B.
Figure 13B:
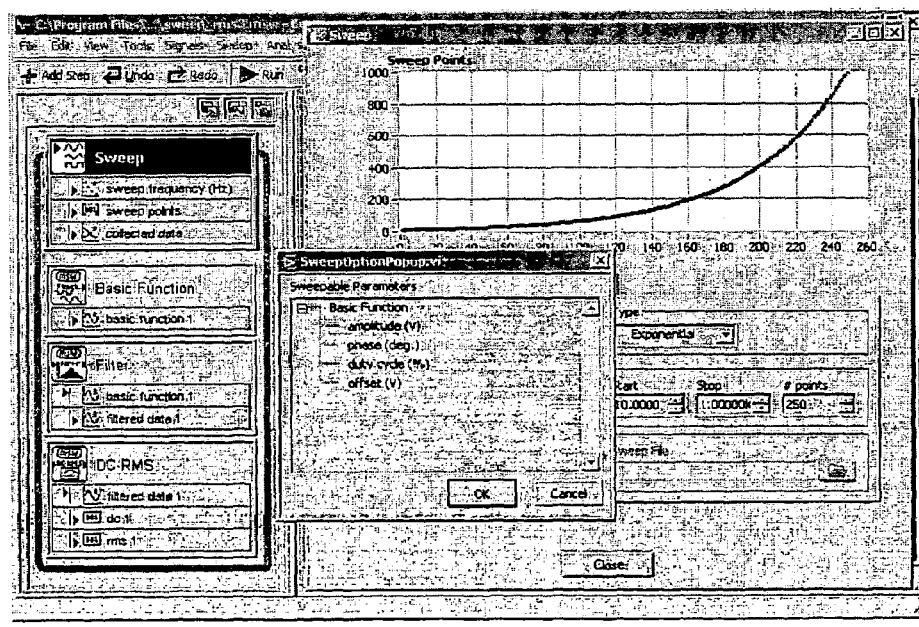

In the embodiment shown in FIG. 13A, a tabbed set of configuration dialogs are shown, where the current active panel is the "Configuration" panel for the sweep function block, including GUI elements for displaying, setting, selecting, and editing sweepable parameters, interpolation type, parameter range, and a configuration file, similar to the wizard dialog of FIG. 12A. FIG. 13B illustrates an embodiment where the user has invoked a popup dialog of sweep options, specifically, sweepable parameters of the Basic Function function block for the sweep from which the user may select the parameter or parameters to be swept. Note that the embodiments of FIGS. 13A and 13B also include a graphical display area where, in this example, the specified sweep points (data values for the parameter to be used in the sweep) may be displayed, either graphically (as shown), or alternatively, in tabular form.

In the example of FIG. 13A, the user has selected "frequency (Hz) (Basic Function)" as the parameter to sweep on. The user may then press the "Add" button below the sweepable parameters display, thereby specifying that parameter for the sweep. To specify a sweep over multiple parameters, e.g., in a parallel sweep, the user may select additional parameters to be swept on, e.g., pressing the "Add" button for each selected parameter. As noted above, given the selected parameter (e.g., frequency), the method may automatically determine the corresponding function block (e.g., the Basic Function function block), and add that function block to the sweep loop. The method may then create an output to the sweep function block and associate that output with the parameter being swept. Then, when executing (at runtime), the Basic Function function block knows to use the latest sweep value for that parameter (e.g., frequency) provided by the sweep block, rather than the value for the parameter received from its configuration dialog.

Similarly, once the resultant data or output to be collected or accumulated over the sweep has been specified, the method may automatically determine the function block that owns that output (e.g., the DC-RMS function block), determine all the function blocks in the diagram upon which the DC-RMS function block depends (e.g., the Filter function block and the Basic Function function block), and automatically add those function blocks to the sweep loop. The method may then create another output to the sweep function block for the resultant data or output, enabling the user to specify further operations on or otherwise use the resultant data or output.

More generally, as described above, in a preferred embodiment, the signal analysis function may include a plurality of operations, where, for example, the first operation may have dependencies on one or more others of the plurality of operations. In one embodiment, one or more other operations of the plurality of operations may be determined for inclusion in the sweep loop, where performing the sweep on the indicated parameter further includes performing the one or more other operations (included in the sweep loop). In one embodiment, determining the one or more other operations of the plurality of operations for inclusion in the sweep loop may include receiving third user input indicating the one or more other operations of the plurality of operations for inclusion in the sweep loop, and programmatically including the one or more other operations in the sweep loop.

Similar to the heuristic technique described above regarding the programmatic determination of signal sources for a function block, in one embodiment, determining the one or more other operations of the plurality of operations for inclusion in the sweep loop may include programmatically analyzing dependencies among prior operations and the first operation to determine the one or more other operations, where the first operation has a dependency on at least one of the one or more other operations, and programmatically including the one or more other operations in the sweep loop.

Figure 13C:
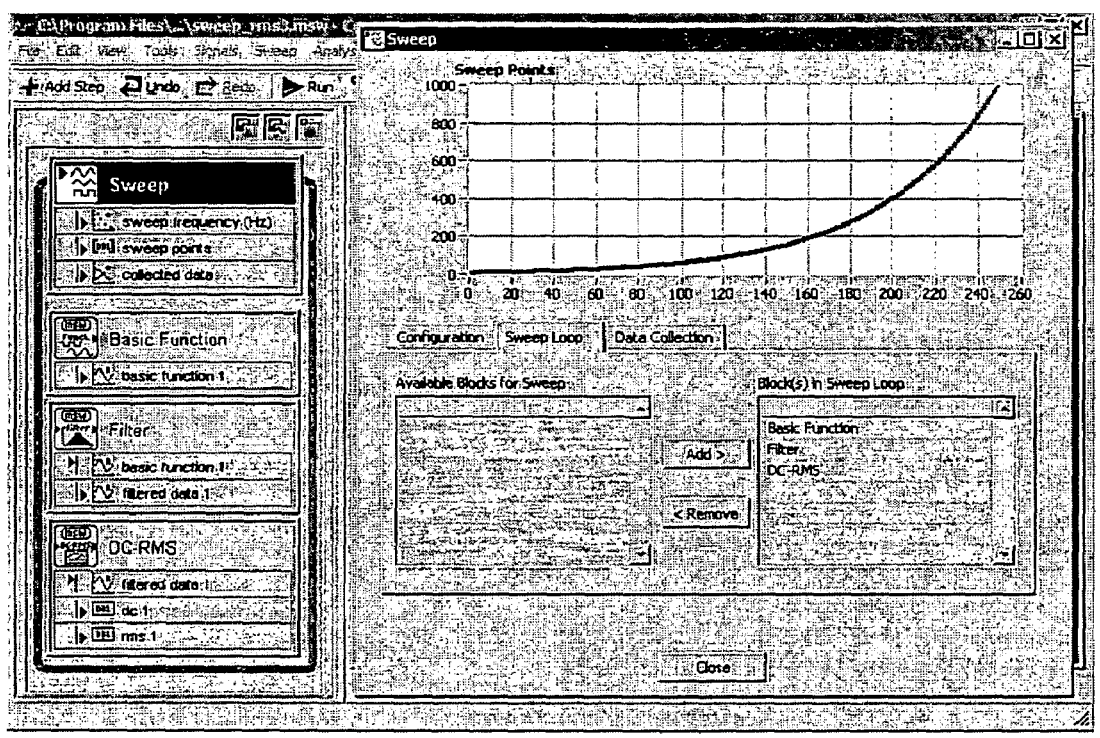

FIG. 13C illustrates an embodiment of the GUI of FIG. 13A where the Sweep Loop panel of the configuration GUI is displayed. As FIG. 13C shows, an "Add/Remove" GUI element is provided for manually adding and removing function blocks from the sweep loop. In this example, the Basic Function function block, the Filter function block, and the DC-RMS function block have been added to the sweep loop.

Figure 13D:
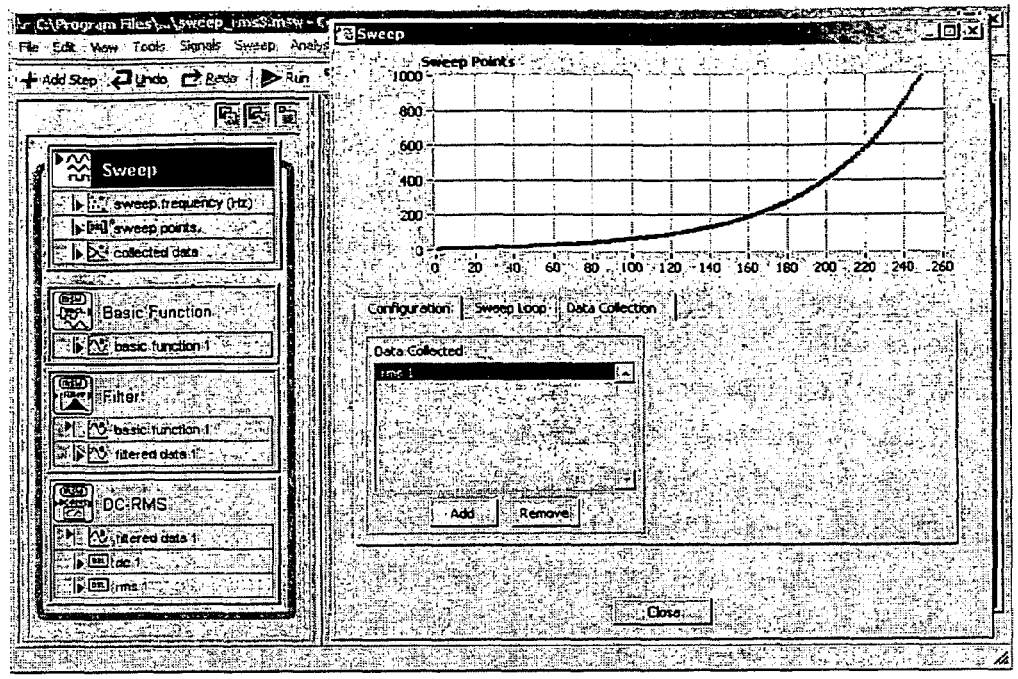
Figure 13E:
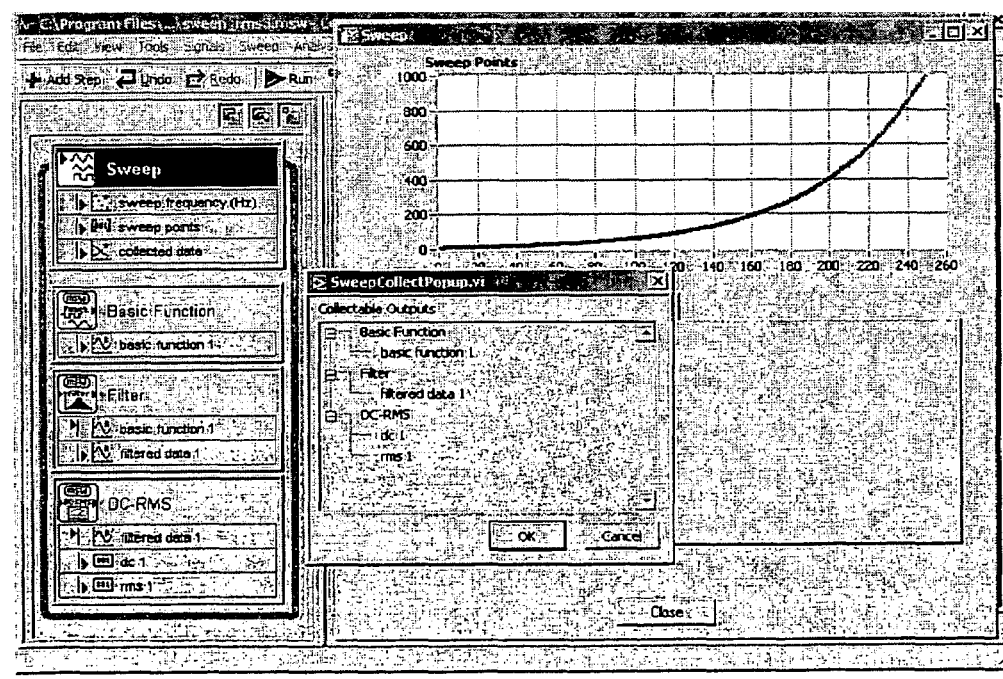

FIG. 13D illustrates an embodiment of the GUI of FIG. 13A where the Data Collection panel of the configuration GUI is displayed. As FIG. 13D shows, a GUI element may be provided that facilitates user selection of the output data to be collected during the sweep, here shown as "rms 1", indicating a root mean square output from the DC-RMS function block. FIG. 13E illustrates yet another embodiment of the GUI, where a popup dialog presents a tree diagram indicating the function blocks in the sweep loop and their respective outputs, similar to the tree diagram of FIG. 12D, where each of the indicated output signals may be selected by the user as outputs for the sweep. Thus, the GUIs of FIGS. 13D and 13E may correspond functionally with that of FIG. 12D, described above.

Thus, in one embodiment, the signal analysis operation may include a plurality of operations, including the first operation, where each of the plurality of operations corresponds to a respective function block, and where the corresponding function blocks for the plurality of operations may be displayed in a diagram that visually represents I/O relationships between the function blocks. As noted above, in a preferred embodiment, the configured sweep corresponds to a sweep function block, and the sweep function block is displayed in the diagram substantially indicating which of the corresponding function blocks are included in the sweep. In a preferred embodiment, the method may include graphically indicating in the diagram which of the corresponding function blocks are included in the sweep. For example, note that in the embodiment shown, the sweep function block is placed in the diagram at the beginning of the function blocks included in the sweep loop, and that the diagram also includes a graphical loop indicator drawn around the included function blocks, indicating the function blocks to be included in the sweep.

In various embodiments, the user may specify a single parameter sweep, a parallel sweep, and/or a nested sweep, i.e., a sweep within a sweep. A single parameter sweep is simply a sweep over a single parameter, as described above. A parallel sweep, also referred to as a diagonal sweep, refers to a sweep in which multiple parameters are varied in parallel (where the numbers of points for each parameter are preferably equal), i.e., all of the swept parameters are varied in tandem. It should be noted that a parallel sweep may involve multiple parameters from a single function block, single parameters from a plurality of function blocks, or a combination of the two. Similarly, multiple outputs (resultant data) may also be specified, i.e., a plurality of outputs may be collected over the same sweep run. A nested sweep involves multiple sweeps in a hierarchy, where the sweeps may be single parameter sweeps and/or parallel sweeps. Note that in one embodiment, in the case of nested sweeps, multiple sweep blocks may be included in the diagram, e.g., a respective sweep block per sweep.

Thus, receiving first user input indicating the parameter for the first operation further may include receiving further first user input indicating one or more additional parameters for the first operation, where the parameter and the one or more additional parameters include a plurality of parameters. Similarly, receiving the second user input specifying a sweep configuration for a sweep on the indicated parameter may further include specifying the sweep configuration for a sweep on the indicated one or more additional parameters. In one embodiment, the user may enter additional first user input specifying additional operations to be included in the sweep, e.g., in an iterative manner, where one or more parameters for each additional operation are specified as described above, and where a sweep configuration is further specified regarding the parameters.

In one embodiment, information specifying the plurality of operations included in the signal analysis function may be stored, where the information specifying the plurality of operations is executable in the signal analysis function development environment to perform the signal analysis function. For example, the information may include a script or equivalent that may be executed in the development environment. In another embodiment, a graphical program implementing the signal analysis function may be programmatically generated based on the stored information, where the graphical program is executable to perform the signal analysis function, i.e. independent of the development environment, as described in detail above.

In 1108, the sweep may be performed on the indicated parameter in accordance with the sweep configuration, thereby generating resultant data for the sweep. The resultant data from the sweep may be any type of data that relates to the signals being generated, acquired, and/or analyzed, examples of which are described above. For example, in various embodiments, the resultant data may include signal data in the form of a signal plot, tabular data, and so forth.

In one embodiment, where the GUI includes a sweep configuration dialog corresponding to the sweep configuration, and where the configuration dialog includes one or more GUI elements indicating the sweep configuration, the method may also include receiving third user input to the configuration dialog modifying the sweep configuration, thereby generating a modified sweep configuration. In other words, once the above sweep configuration has been performed, the user may be presented with a panel, dialog, etc., that includes one or more GUI elements displaying the sweep configuration, and which may operate to receive further user input modifying the configuration. Performing the sweep on the indicated parameter in accordance with the sweep configuration may then include performing the sweep on the indicated parameter in accordance with the modified sweep configuration.

In one embodiment, the sweep configuration dialog (or equivalent) may be invoked or displayed during run-time, i.e., while the sweep is being performed. In other words, in one embodiment, the sweep configuration may be modified during the sweep, i.e., dynamically, such that the remainder of the sweep is performed in accordance with the modified sweep configuration.

As described above, in some embodiments, the user may further configure the sweep to be performed on one or more additional parameters, e.g., in parallel and/or nested sweeps, and so performing the sweep on the indicated parameter in accordance with the sweep configuration may further include performing the sweep on the indicated one or more additional parameters. For example, the sweep configuration may specify a parallel sweep of at least a first subset of the plurality of parameters, and/or a nested sweep of at least a second subset of the plurality of parameters.

Finally, in 1110, the resultant data for the sweep may be stored, and as FIG. 11A indicates, may optionally be displayed on a display, e.g., in a display of the GUI. In one embodiment, the resultant data may be stored on the host computer system 82 and/or transmitted to another device coupled to the host system. Example output for a sweep is provided in FIGS. 13F-13H, described below.

Thus, in various embodiments, a Graphical User Interface (GUI) may be displayed on the display, where receiving the first input and receiving the second input may include receiving the first and second inputs to the GUI. As described above, in one embodiment, the GUI includes a wizard, e.g., a sweep wizard, where displaying the GUI may include displaying a sequence of dialogs to interactively guide the user in specifying the sweep. As also described above, in one embodiment, the GUI may include one or more configuration dialogs corresponding to the first operation, whereby the user may specify the sweep. In a preferred embodiment, the GUI may be included in a signal analysis function development environment, such as described herein.

Thus, the method may include displaying the GUI on the display, receiving the first and second inputs to the GUI, and displaying the resultant data for the sweep in the GUI.

FIG. 11B is a more detailed flowchart diagram of one embodiment of the method of FIG. 11A. More specifically, FIG. 11B flowcharts one embodiment of step 1108 of the method of FIG. 11A, where the sweep is performed on the indicated parameter in accordance with the sweep configuration.

As FIG. 11B shows, in 1112, a next sweep value of the parameter may be provided to the first operation as a current value of the parameter for the first operation. In various embodiments, the next sweep value may be retrieved from a file, computed in real-time, and/or received from another system or process, e.g., a system of process coupled to or comprised in the host computer system 82.

In 1114, the first operation may be performed using the current sweep value of the parameter, thereby generating corresponding resultant data, and the corresponding resultant data stored, as indicated in 1116. In one embodiment, the corresponding resultant data may also be displayed in the GUI, e.g., in a graph or table, e.g., as the data are generated.

The above steps may then be repeated in accordance with the sweep configuration. In other words, the providing a next sweep value, the performing the first operation using the current sweep value of the parameter, and the storing the corresponding resultant data may be performed in an iterative manner in accordance with the sweep configuration, as indicated in 1118, where after each iteration, the method may determine whether there are further iterations to perform, i.e., whether there are further sweep values of the parameter that have not been used, and if so, the method may continue with step 1112, and proceed as described above until there are no further sweep values to process, i.e., until a stopping condition specified in the sweep configuration obtains, in which case the method may terminate, as indicated in 1120.

In one embodiment, performing the sweep on the indicated parameter in accordance with the sweep configuration may include batch computing each of the sweep values in accordance with the sweep configuration prior to the repeating. In other words, before the iterative process begins, all of the sweep values may be computed. Then, at the beginning of each iteration, the next (successive) value may be provided to the first operation. Alternatively, in another embodiment, providing the next sweep value of the parameter to the first operation as a current value of the parameter for the first operation (step 1112 above) may include computing the next sweep value in accordance with the sweep configuration. In other words, each sweep value may be calculated as needed in the iterative process, i.e., "on the fly".

Thus, performing the sweep on the indicated parameter in accordance with the sweep configuration may include iteratively performing the first operation, where at each iteration the first operation is performed using a respective value of the parameter, and where at each iteration corresponding resultant data are generated. In one embodiment, performing the first operation may include performing the first operation using a hardware device, where iteratively performing the first operation may include triggering the hardware device at each iteration.

For example, an arbitrary waveform generator (hardware device) may be triggered each iteration to provide a stimulus signal to a filter, where the parameters determining the filtering attributes are varied for each iteration, and a corresponding output waveform generated (for each iteration). The output waveforms may all be plotted on a graph, e.g., overlaid on a 2D plot, or presented in a 3D graph, where the succession of waveforms generated by the sweep form a surface. In one embodiment, the resultant data for each iteration of the sweep may be displayed in real-time, i.e., as it is generated, such that an animated display of results is presented to the user as the sweep executes.

Figure 13F:
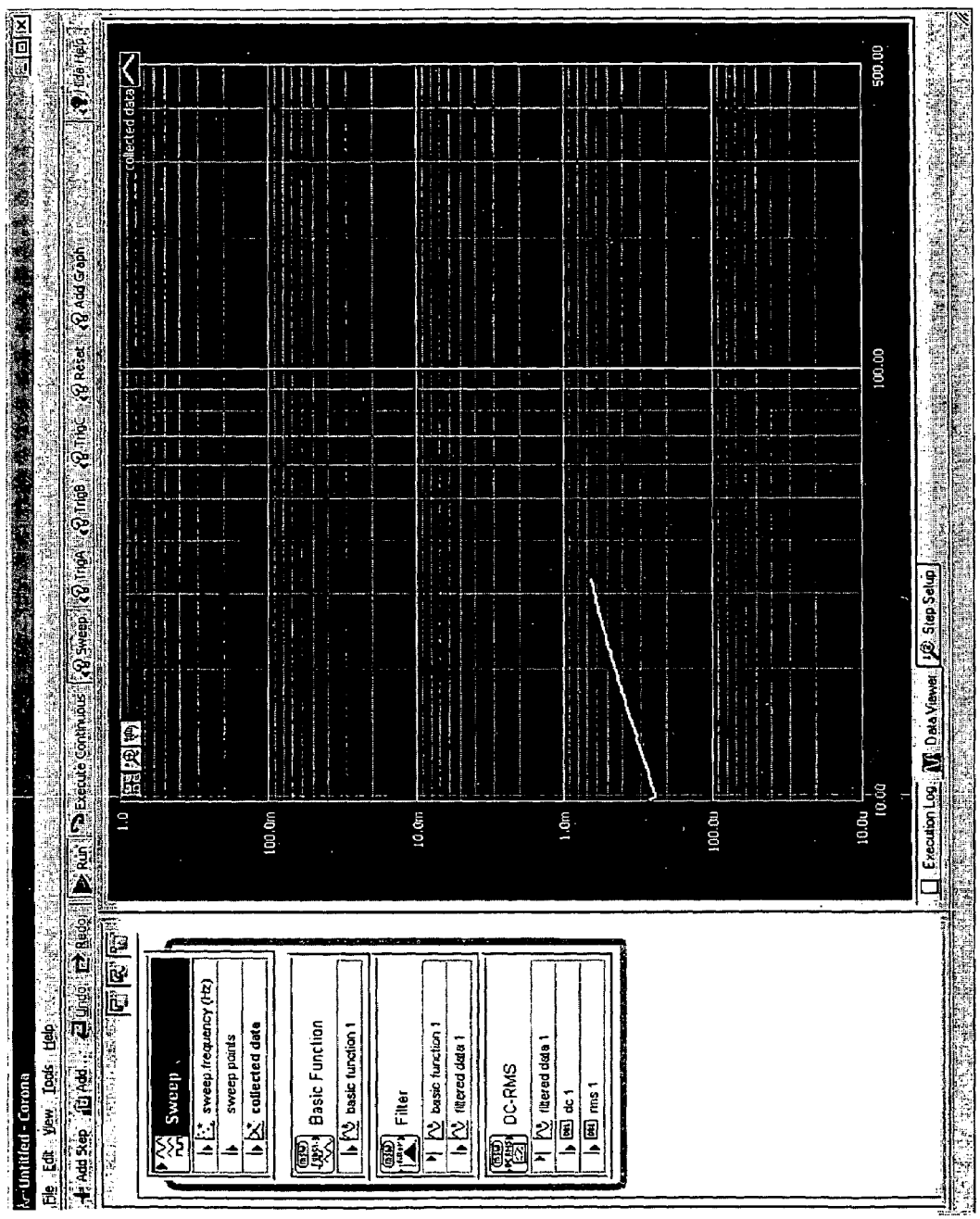
Figure 13G:
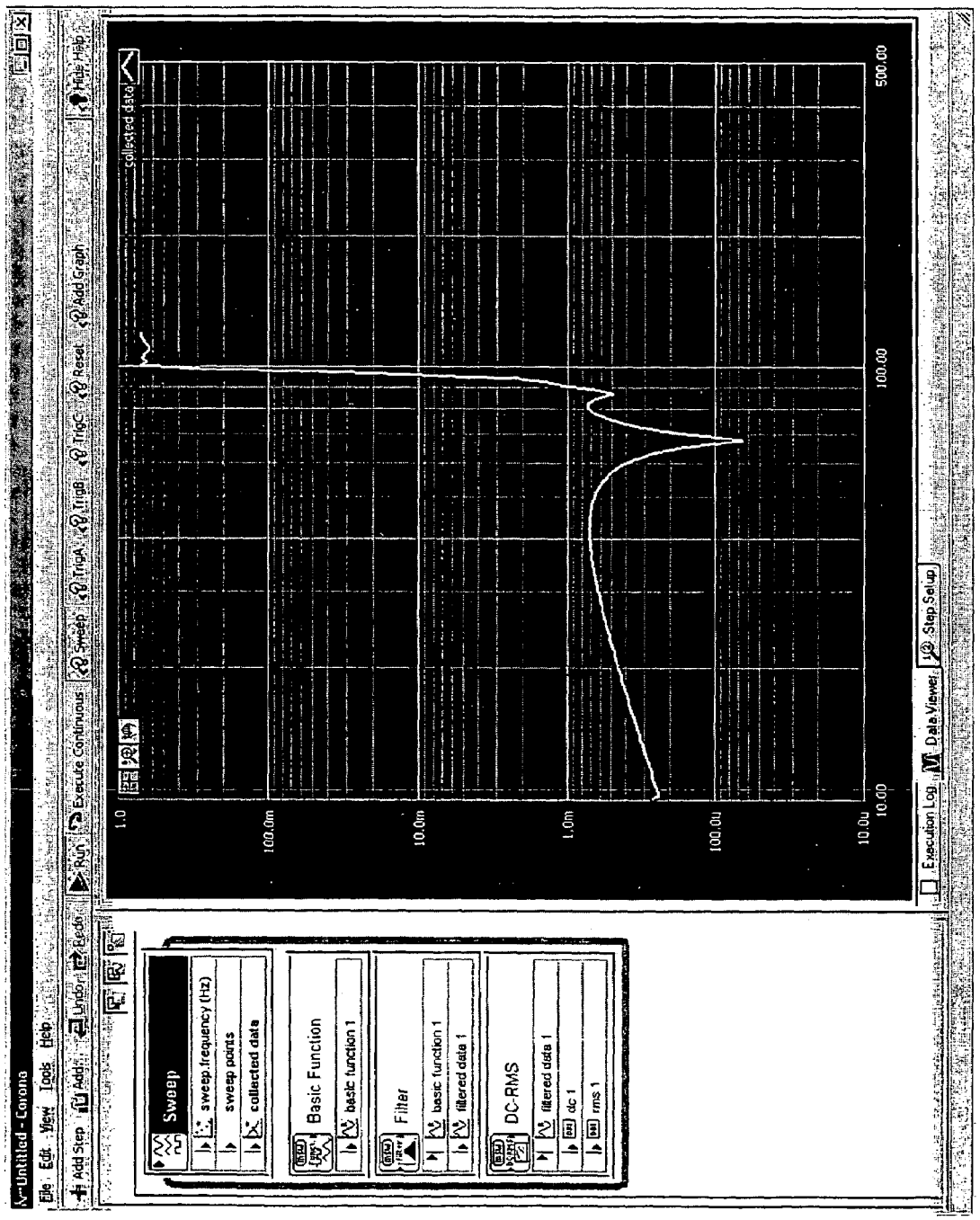
Figure 13H:
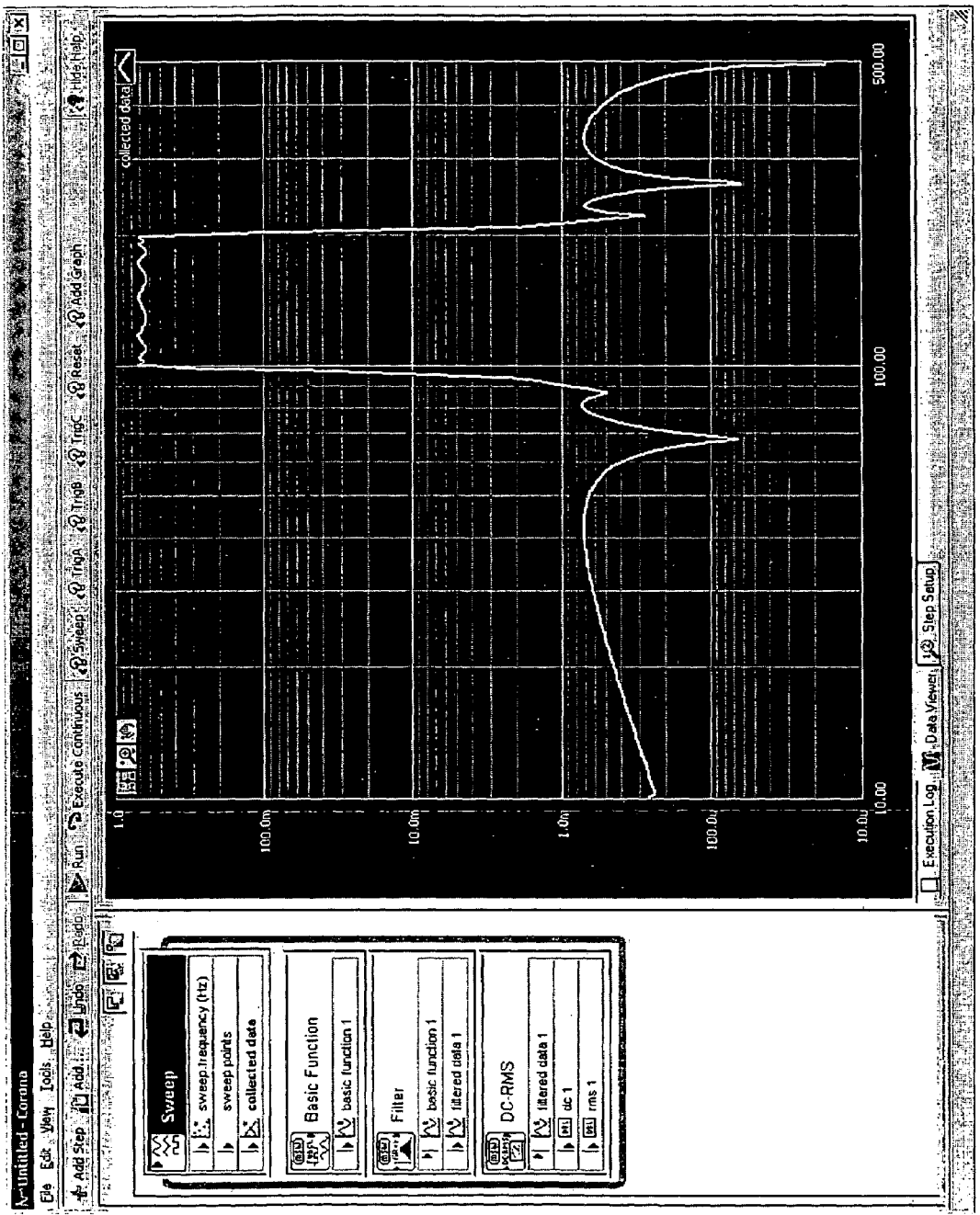

FIGS. 13F-13H illustrate example output from a sweep operation. As FIGS. 13F-13H show, a signal analysis function, represented by function blocks (as described above), includes a specified sweep operation that includes the Basic Function, a Filter, and a DC-RMS operation. FIG. 13F illustrates preliminary results of the sweep, labeled "collected data", FIG. 13G illustrates intermediate results of the sweep, and FIG. 13H illustrates the complete collected data from the sweep. Note that in each of these illustrates, the (tabbed) display window is a "Data Viewer" window, as opposed to the "Step Setup" window/panels described earlier during the specification of the sweep.

Thus, various embodiments of the systems and methods described herein may facilitate rapid (and relatively easy) specification and performance of sweeps in a signal analysis function, where the sweep may be over single parameter and/or multiple parameters, and where the sweep may be a parallel sweep, a nested sweep, or a combination of both.

Figure 14:
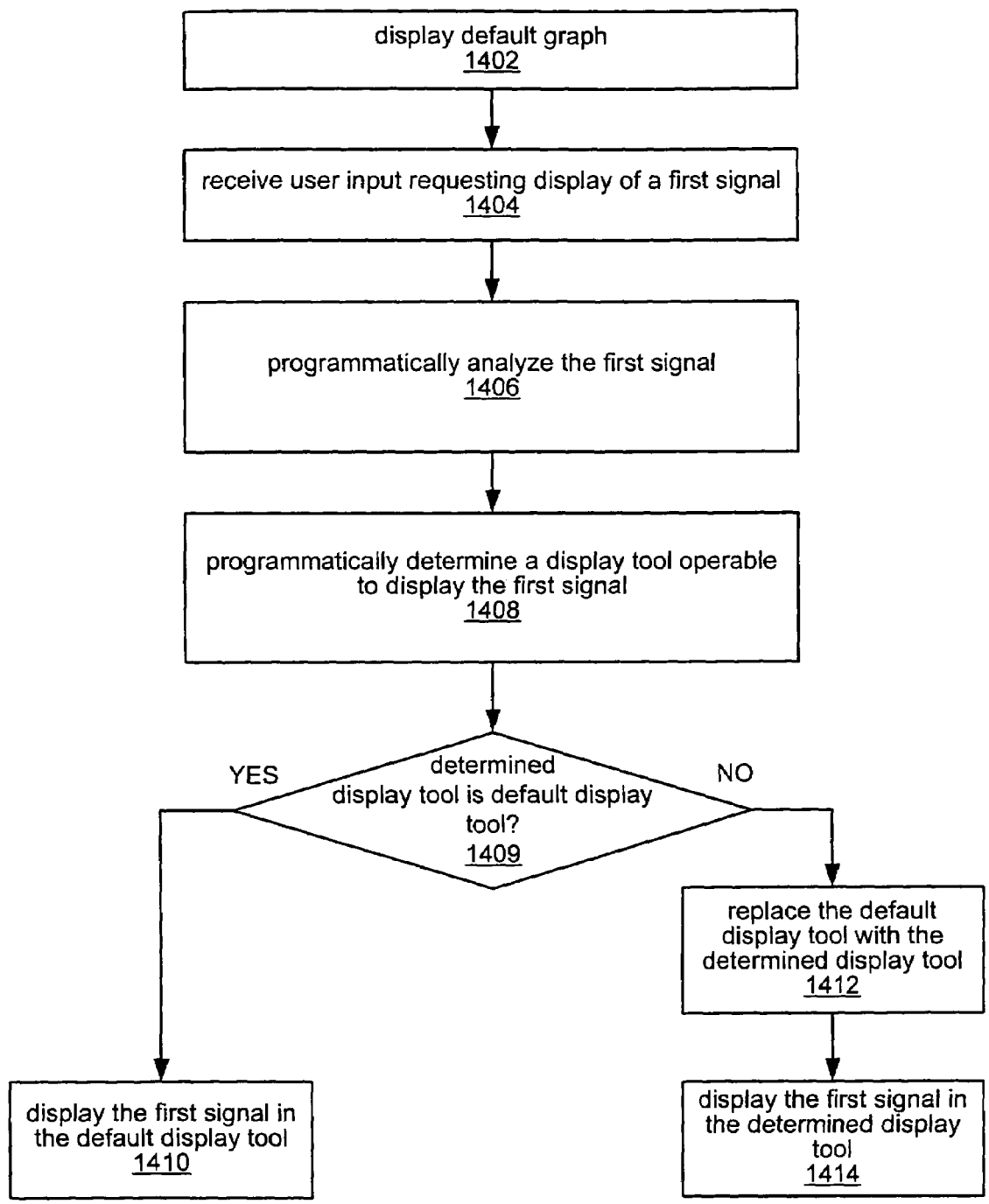
FIG. 14 flowcharts one embodiment of a method for automatically displaying signal data based on signal type, according to one embodiment.
Figure 15A:
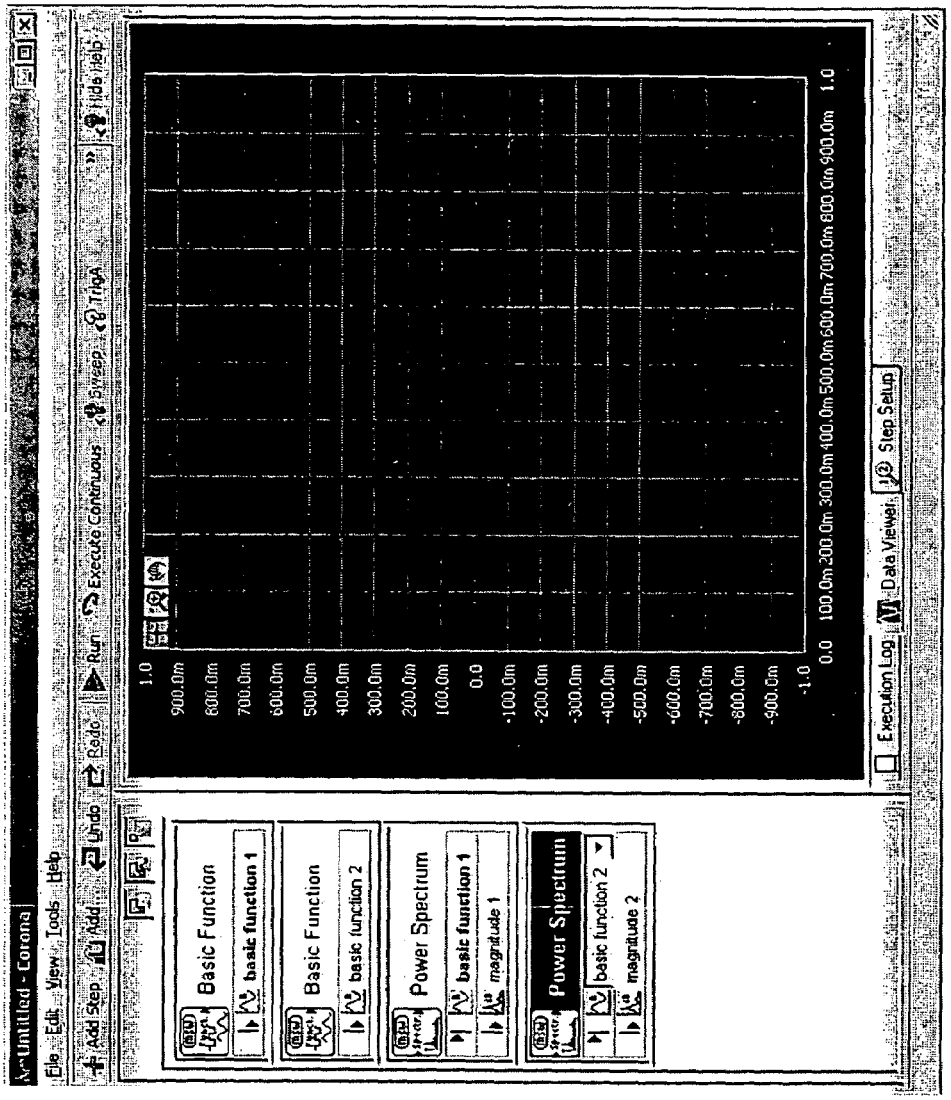
FIGS. 15A-15F illustrate automatically displaying signal data based on signal type, according to various embodiments.
Figure 15B:
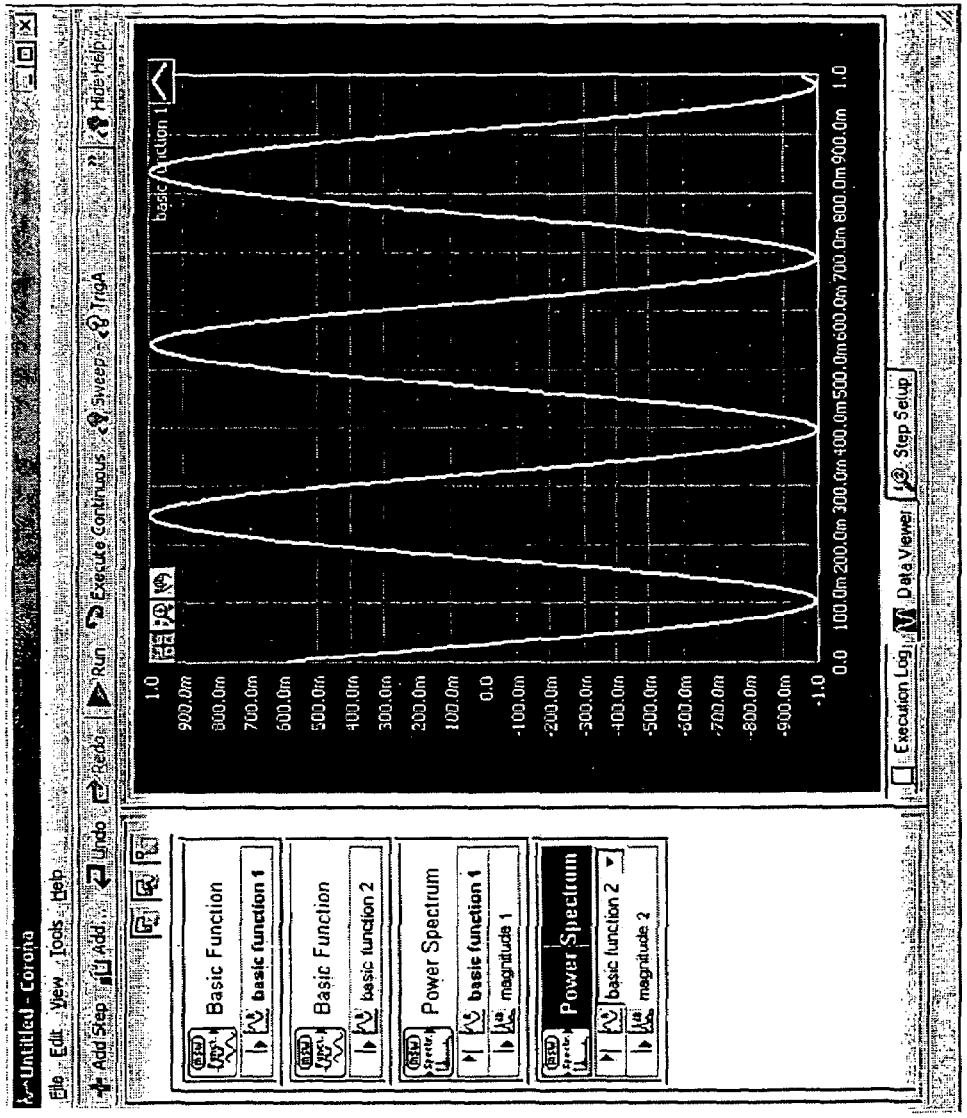
Figure 15C:
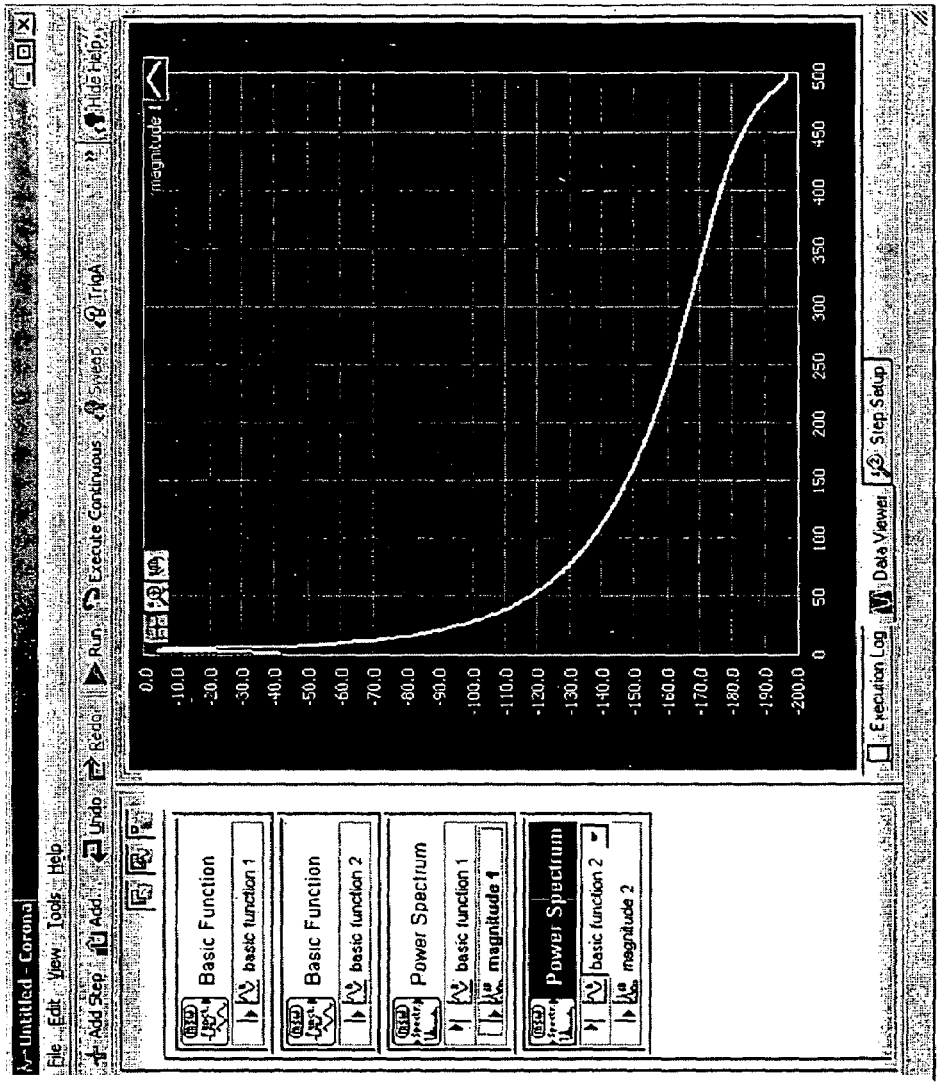
Figure 15D:
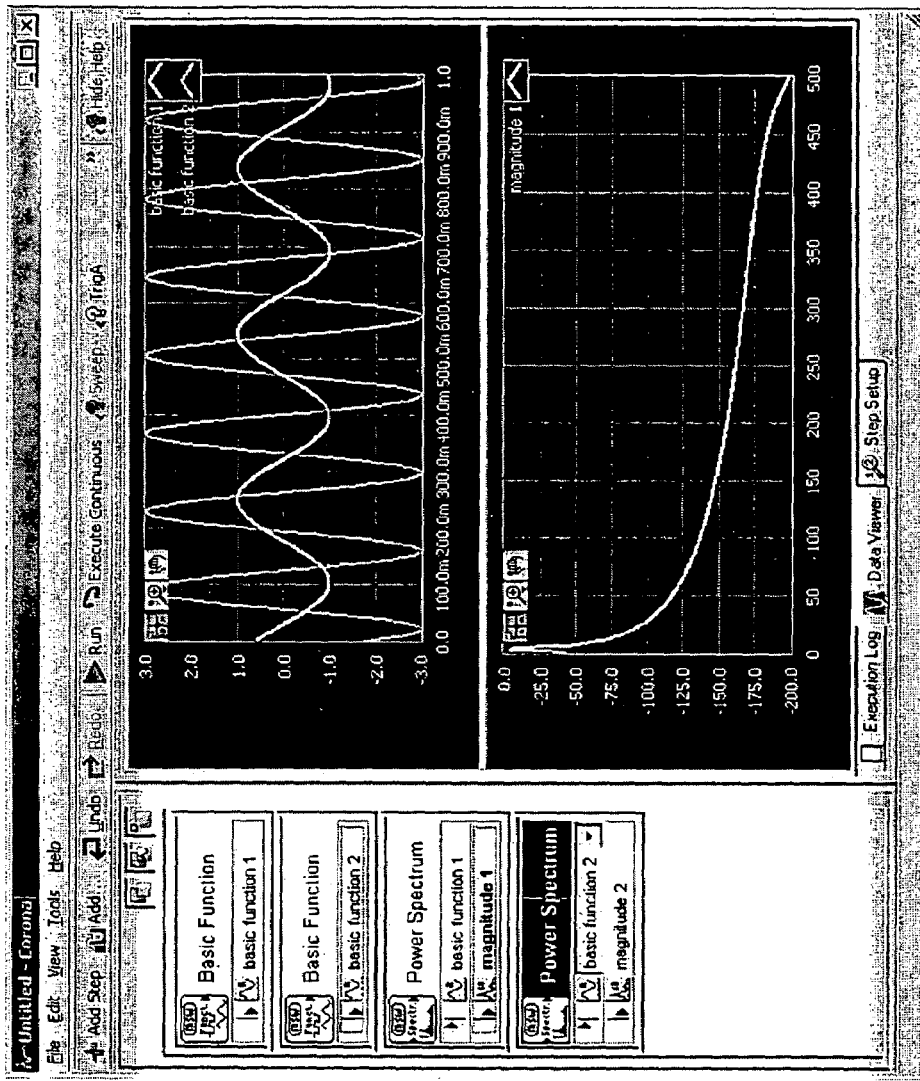
Figure 15E:
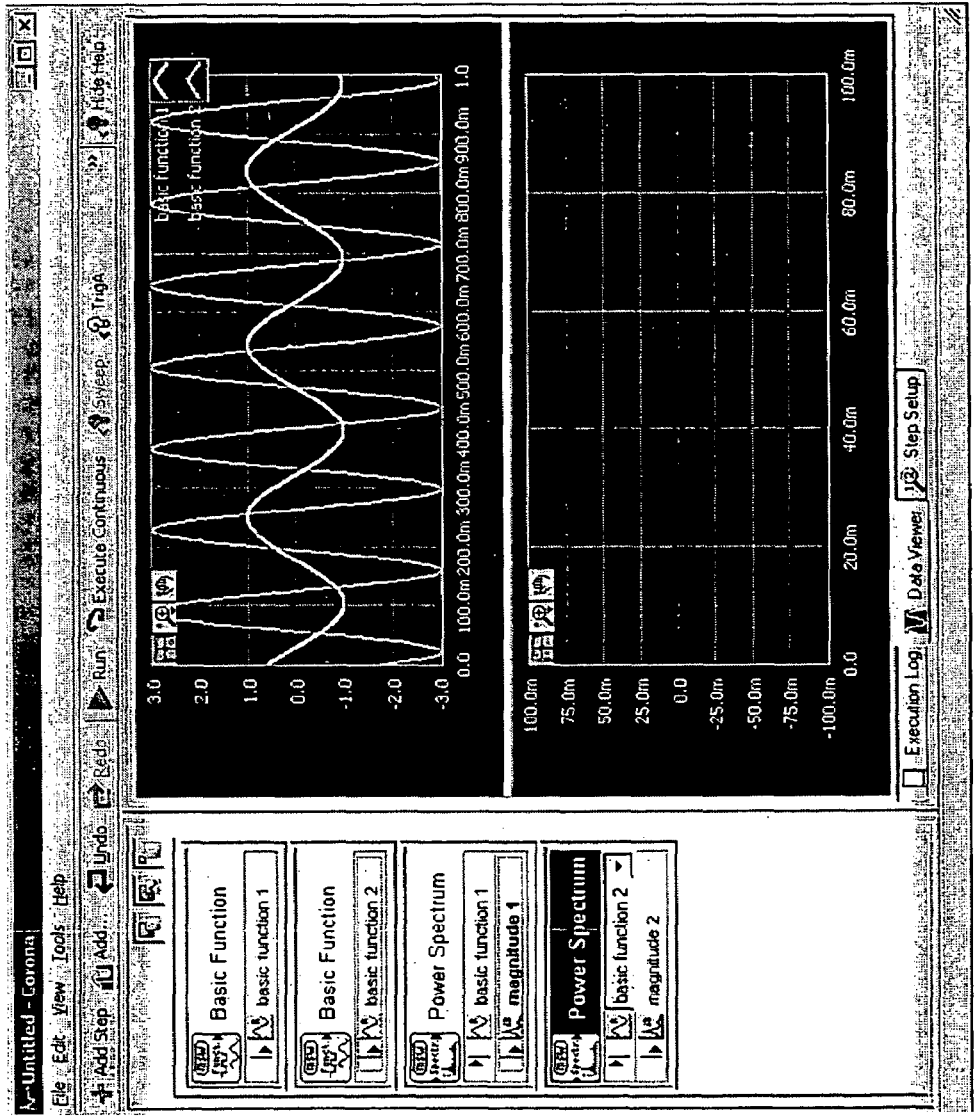
Figure 15F:
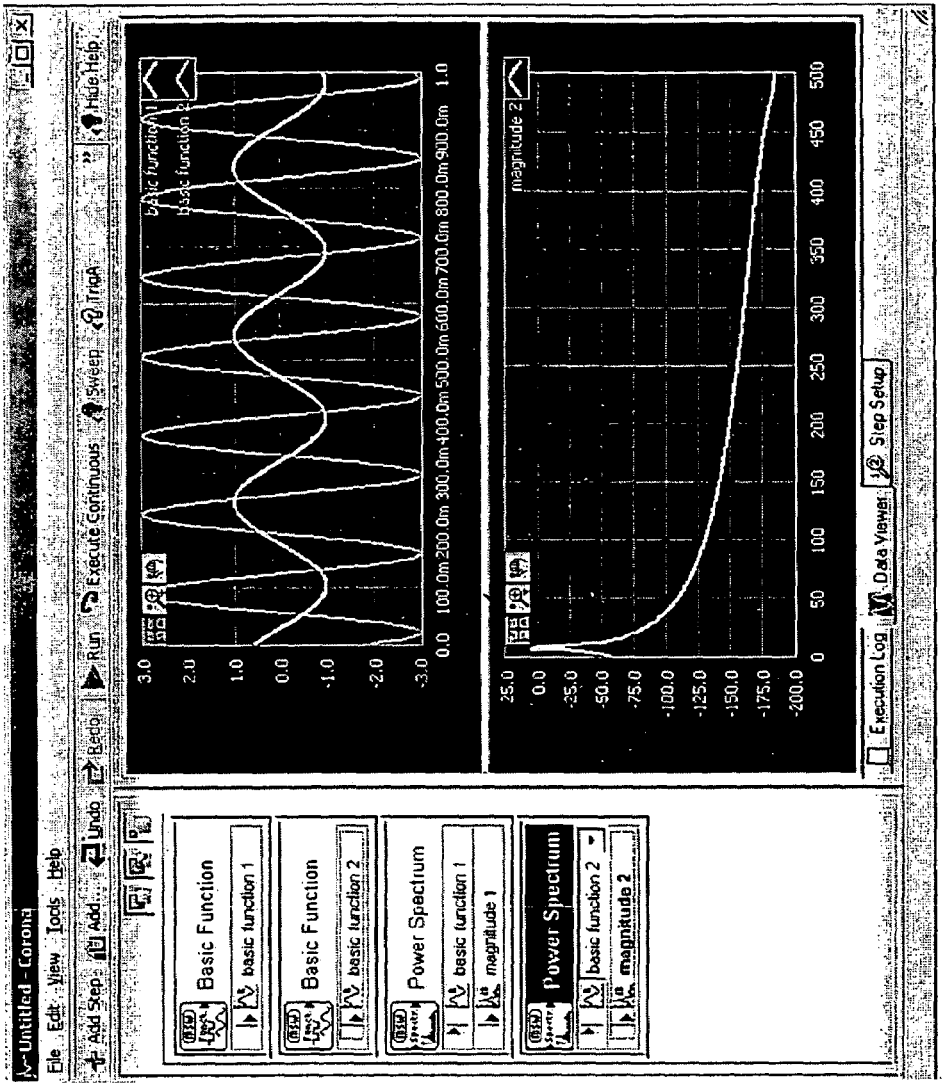

FIGS. 14-15F—Automatic Signal Display

In one embodiment, the graphical display of the GUI of the signal analysis function development environment may include additional functionality. For example, many applications may use or manipulate multiple types of data, e.g., time-domain waveforms, frequency-domain waveforms, digital-domain waveforms, xy-pairs, and scalars, among others, and there may be different ways of viewing these different data types, e.g., different display tools. For example, a time-domain waveform typically cannot be viewed on the same graph as a frequency-domain waveform. Note that as used herein, the term "display tool" may refer to any type of graphical display tool, i.e., graph, table, chart, and so forth. Note also that as used herein, the data displayed in such display tools may be referred to as "signals" or "signal data". Whatever the data type or the display tool, it would be desirable for a user to have the capability to view and interact with different types of data without having to manually distinguish one data type from another.

Thus, in one embodiment, various display tools may be provided for displaying a plurality of data types to the user, e.g., via graphs, tables or other formats, as needed. Thus, in one embodiment, display tools, e.g., graphs and tables, such as included in some embodiments of the signal analysis function development environment described herein, may automatically distinguish between different data types and may present the data in a manner commensurate with the data's type. For example, when display of a signal is requested, e.g., by the application or by the user, the burden of choice among display types may be removed from the user and the appropriate display tool created or selected automatically by the application to view the signal. In one embodiment, exceptions to this automatic functionality may be handled manually, e.g., by the user.

FIG. 14 is a flowchart of one embodiment of a method for automatically displaying signal data based on signal type. Various embodiments of these display tools, also referred to as "automatic display tools", "smart display tools", or "smart graphs", are described below with reference to FIGS. 15A-15F. Note that although the embodiments described below are presented in the context of the signal analysis function development environment described above, the display tool techniques described herein are broadly applicable to data display in other application domains and tools. For brevity, the term "application" is used below to refer to the software environment in which the method is performed. In one embodiment, the method may proceed as described below. Note that in various embodiments, some of the steps shown may be performed concurrently, in a different order than shown, or may be omitted. Additional steps may also be performed as desired.

As FIG. 14 shows, in 1402, a default display tool may be displayed, where the default display tool may be operable to display signal data of a default data type. In one embodiment, the default display tool may comprise a graph for displaying signal plots, or, alternatively, may comprise a (blank) table for displaying tabular data.

In one embodiment, the default display tool may be displayed in response to user input, e.g., invoking generic data display functionality in the application. In a preferred embodiment, the application may launch with the default display tool visible.

FIG. 15A illustrates an example GUI display from the signal analysis function development environment described above, where a specified signal analysis function is represented by a set of function blocks, as also described above. In this example, two basic function waveforms are provided by respective Basic Function function blocks, and power spectra for the waveforms generated by respective Power Spectrum function blocks, as shown. A default display tool is also shown in the GUI of FIG. 15A. For example, as FIG. 15A shows, in one embodiment, the default display tool may take up substantially the entire viewing area of the GUI. In this example, the default display tool is a time-domain graph for displaying time-domain signal plots.

In 1404, first user input may be received requesting display of a first signal. The user input may be received in a variety of ways. For example, in a preferred embodiment, the user may "drag and drop" a signal icon corresponding to the first signal onto the default graph, as described earlier. In another embodiment, the user may right-click on the signal icon to invoke various options related to the signal, and may select a "display" option or equivalent. In yet another embodiment, the user may right-click on the default graph to invoke a list or menu of signals from which the first signal may be selected. Other means of requesting display of the first signal are also contemplated.

In 1406, the first signal may be programmatically analyzed in response to the first user input. In a preferred embodiment, the first signal may be programmatically analyzed to determine a data type of the first signal. Note that as used herein, the term "data type" may refer to broad signal types, such as time-domain data (values vs. time), frequency domain data (values vs. frequency), and spatial-domain data (x vs. y), and may also refer to programming data types, such as, for example, integer, floating point, and Boolean data, including arrays or vectors of such data, among others. In one embodiment, user-defined data types may also be accommodated. For example, the user may define various "custom" data types, and may also specify or provide respective display tools for displaying data of these user-defined types.

In 1408, a display tool operable to display the first signal may be programmatically determined based on the analysis performed in 1406. In a preferred embodiment, the display tool may be determined based on the data type of the first signal. For example, in one embodiment, programmatically determining the display tool based on the determined data type may include performing a table look-up based on the determined data type to determine the display tool. In other words, the method may use the determined data type for the first signal to lookup a suitable display tool, i.e., a display tool suitable for displaying signal data of the determined data type.

The first signal may then be displayed in the display tool. Depending upon the data type of the first signal, and the type of the default display tool, the display of the first signal may be performed in different ways. For example, as FIG. 14 shows, in 1409, a determination may be made as to whether the determined display tool of 1408 is the default display tool (of 1402 above), i.e., whether the default display tool is operable to display the first signal. Said another way, a determination may be made as to whether the determined data type is compatible with the default data type (of 1402 above), and if the determined data type is compatible with the default data type, the default display tool may be determined to be the display tool, and so in 1410, the first signal may be displayed in the default display tool.

FIG. 15B illustrates the GUI of FIG. 15A, where, following the example of FIG. 15A, the user has requested display of a time-domain signal, e.g., by dragging and dropping a signal icon onto the default display tool of FIG. 15A, and where the signal is displayed in response. Since the data type of the signal is supported by the default display tool, the signal is displayed by the default display tool, i.e., the default graph is of the correct type for displaying the signal.

If the determined display tool of 1408 is not the default display tool, then in 1412, the default display tool may be replaced with the determined display tool, and the first signal displayed in the determined display tool, as indicated in 1414. In other words, if the determined data type is not compatible with the default data type, a replacement display tool operable to display signals of the determined data type may be determined, the default display tool replaced with the determined (replacement) display tool, and the first signal displayed in the determined (replacement) display tool. In one embodiment, determining the replacement display tool may include creating the replacement display tool. In other words, the type of display tool may be determined based on the analysis of 1406 (e.g., by table lookup), and the display tool programmatically created, e.g., based on a pre-defined specification for that display tool type.

FIG. 15C illustrates the GUI of FIG. 15A, but where the user has requested display of a frequency-domain signal, e.g., by placing a frequency-domain signal icon on the default display tool. As described above, the application may automatically replace the default time-domain graph with a frequency-domain graph, thus providing the correct display tool for the signal of the frequency-domain type without consuming additional screen display space, as only one display tool, i.e., graph, is still presented.

As noted above, in a preferred embodiment, the first signal comprises signal data. Thus, depending upon the type of the signal data, the determined display tool may vary. For example, in an embodiment where the signal data comprise signal plot data, the display tool preferably includes a graph. Note that depending upon the data, the graph may be a 2D graph, a 3D graph, or any other type of graph suitable for displaying the data. In an embodiment where the signal data comprise tabular data, the display tool preferably comprises a table. In cases where the signal data comprises neither plot data or tabular data, the determined display tool may include an indicator operable to display the signal data. For example, if the signal data is a Boolean, a simple Boolean indicator, such as an "LED" type indicator, may be used to present the data (or datum). In cases where the data type of the signal is a user-defined type, user-defined or user-specified display tools may be provided and used as needed.

As noted above, in a preferred embodiment, the method of FIG. 14 is performed in the context of a GUI, e.g., in the signal analysis function development environment described above. For example, the method preferably includes displaying a Graphical User Interface (GUI), where receiving the first user input includes receiving the first user input to the GUI, and where displaying the first signal in the display tool includes displaying the first signal in the GUI. In other words, the display tool is displayed in the GUI.

In some cases, when the user requests display of the signal, there may already be a display tool displayed in the GUI, where the display tool displays one or more prior signals. For example, the method may include displaying a first display tool prior to receiving the first user input (of 1402), where the first display tool displays a prior signal of a first data type. In one embodiment, programmatically determining the display tool may include: if the determined data type is compatible with the first data type, determining that the first display tool comprises the display tool, and if the determined data type is not compatible with the default data type, determining a second display tool operable to display signals of the determined data type. Thus, displaying the first signal in the display tool may include: if the determined data type is compatible with the first data type, displaying the first signal in the first display tool with the prior signal, and if the determined data type is not compatible with the first data type, displaying the second display tool, and displaying the first signal in the second display tool.

As indicated above, in one embodiment, receiving the first user input requesting display of the first signal may include the user dragging and dropping a signal icon corresponding to the first signal onto the first display tool. As also indicated above, in one embodiment, determining the second display tool may include creating the second display tool.

The above situation may be extended to multiple prior signal displays, where for example, in one embodiment, a plurality of display tools may be displayed prior to receiving the first user input, where the plurality of display tools correspond respectively to a plurality of data types, and where each display tool displays one or more respective signals of a respective data type of the plurality of data types. Programmatically determining the display tool may thus include programmatically determining if the plurality of display tools comprises a matching display tool operable to display signals of a data type compatible with the determined data type, and if the plurality of display tools comprises a matching display tool, determining that the matching display tool comprises the display tool, and if the plurality of display tools does not include a matching display tool, determining a second display tool operable to display signals of the determined data type, wherein the second display tool comprises the display tool.

Similarly, displaying the first signal in the display tool may include: if the plurality of display tools comprises a matching display tool, displaying the first signal in the matching display tool, and if the plurality of display tools does not comprise a matching display tool, displaying the second display tool, and displaying the first signal in the second display tool.

Thus, in one embodiment, the method described above with reference to FIG. 14 may be performed iteratively, where additional or successive signals may be respectively displayed on prior display tools if they support the data types of the signals, or, in cases where the data types of the signals are not supported by the prior display tools, further display tools determined (and optionally created) for display of the signals.

FIG. 15D illustrates an example of the GUI of FIG. 15A, where the default display tool is already displaying prior signals, e.g., basic function 1 and basic function 2, when a request is made to display a third signal, in this case, a power spectrum. Note that the two prior signals are time-domain signals, while the new signal is a frequency-domain signal, and so a new display tool is programmatically determined (and optionally created). As shown, the new display tool is operable to display frequency-domain signals, and so is the appropriate display tool for the new signal.

Since a new display tool is not automatically determined (or optionally created) unless a type conflict is generated by a user requesting display of a signal on an incompatible display tool, a manual way of adding a display tool within the application may be provided.

In one embodiment, the user may manually request a display tool. For example, in one embodiment, once the first signal is displayed (in 1410 or 1414), second user input requesting display of a new display tool may be received. A default display tool may be displayed in response to the second user input, where the default display tool is operable to display signal data of a default data type, as described above.

Third user input requesting display of a second signal may then be received, e.g., by dragging and dropping a signal icon onto the default display tool. The second signal may be programmatically analyzed in response to the third user input to determine a data type of the second signal, and if the determined data type of the second signal is compatible with the default data type, the second signal may be displayed in the default display tool (as described above). If, on the other hand, the determined data type is not compatible with the default data type, the default display tool may be replaced with a replacement display tool operable to display the second signal (as also described above) and the second signal displayed in the replacement display tool.

Thus, in the event that the default display tool (or any prior display tool) is already displaying signals of a different type than currently requested, no replacement may take place, but an additional display tool may be displayed (and optionally created) of the appropriate type, and the requested signal displayed therein. Said another way, upon requesting a new display tool, a new instance of the default display tool may be determined and provided (and optionally created). If the user requests display of an incompatible signal, e.g., places an incompatible data type on the new unused default display tool instance, the application may automatically replace it with the appropriate display tool instance. It is important to note that multiple signals may be viewed on the same graph, as long as the types of the signals are compatible.

FIG. 15E illustrates an example of the GUI of FIG. 15A, where the default display tool is already displaying prior signals, e.g., basic function 1 and basic function 2, and where a request is made to display a new display tool (e.g., a manual request). As described above, the default display tool (a time-domain graph) is then displayed (in addition to the prior display tool), and the user may subsequently request display of additional signals using the newly displayed display tool. Note that if the user requests display of a signal that is not compatible with the newly displayed default display tool, the display tool may be automatically replaced with an appropriate display tool, as described above, and as illustrated in FIG. 15F, where a power spectrum signal, labeled "magnitude 2" is displayed in the replacement display tool (a frequency-domain graph).

Thus, various embodiments of the system and method described above may facilitate automatic presentation of signal data in an appropriate display tool, e.g., a graph, table, indicator, or other type of display tool, based on the signal data, e.g., based on the data type of the signal.

FIGS. 16A-17G—Soft Front Panel

In one embodiment, the GUI may include a soft front panel (SFP), where the soft front panel provides or includes an interface for a respective hardware device, e.g., a hardware board, and where the soft front panel emulates a front panel for the device. For example, if the device or board is a Digital Multi-Meter (DMM), the soft front panel preferably emulates the front panel (i.e., a physical front panel) of the DMM. In one embodiment, a soft front panel may be provided for each of a plurality of interactive virtual instrument (IVI) classes, e.g., for DAQ boards, DMMs, oscilloscopes, etc. Thus, the GUI may present an interface to the user that substantially replicates the functionality and appearance of a hardware front panel, where the user may select or invoke various operations, e.g., signal analysis operations, via controls presented on the soft front panel, where information specifying the selected or invoked operations may be stored, as described above.

Figure 16A:
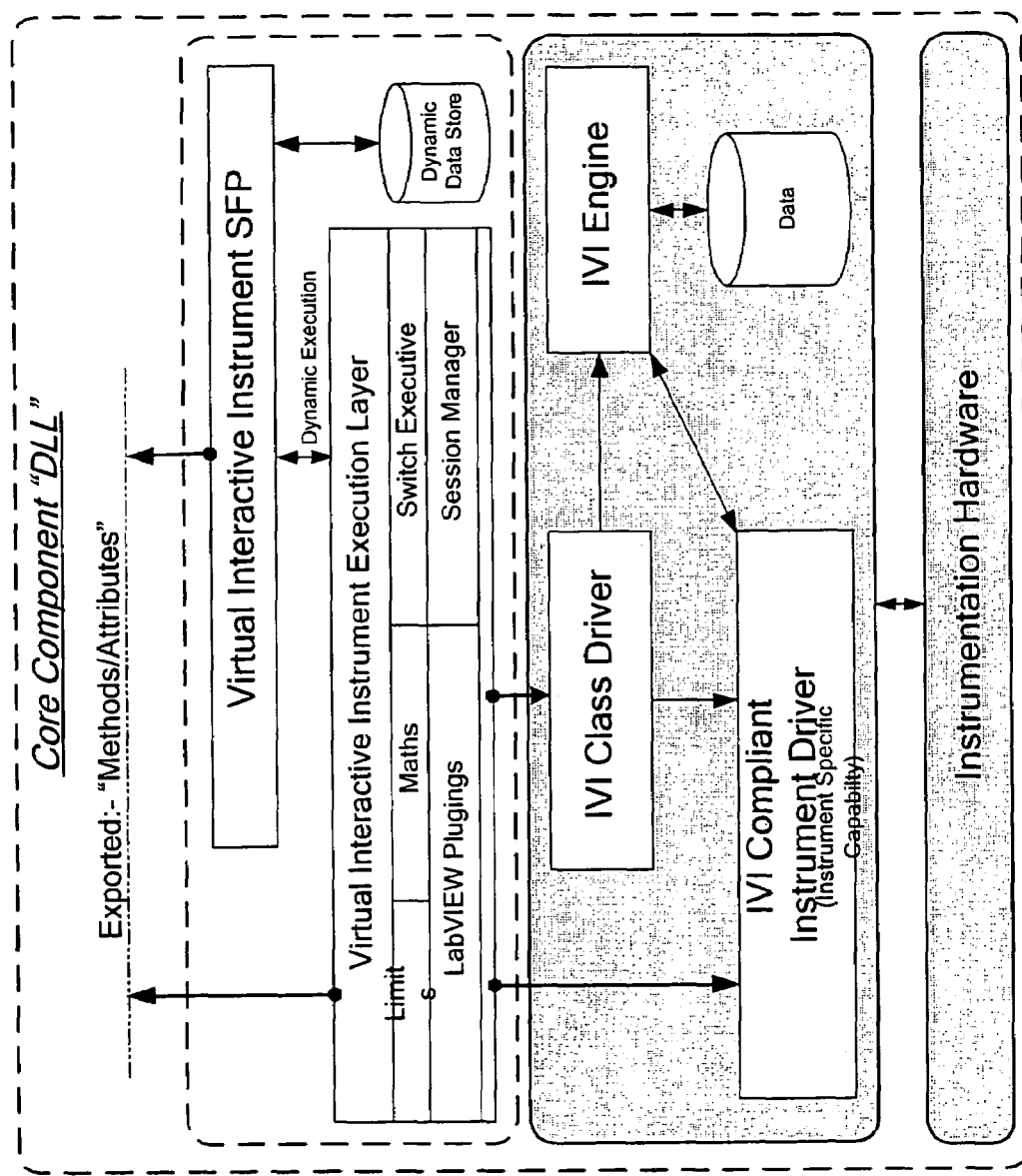
FIG. 16A is a block diagram of a virtual interactive instruments architecture, according to one embodiment.

FIGS. 16A-17G illustrate various aspects of one embodiment of the signal analysis system where soft front panels are included in the GUI. More specifically, FIGS. 16A and 16B illustrate an architecture and process flow for the system, according to one embodiment, and FIGS. 17A-17G are screenshots illustrating soft front panels, according to one embodiment.

Architecture

FIG. 16A is a block diagram of a virtual interactive instrument (VII) architecture and its components, according to one embodiment. As FIG. 16A shows, in one embodiment, the architecture may include a core component DLL (Dynamic Linked Library) that may export methods and attributes, e.g., for access and use by other systems, although other implementations are also contemplated, the DLL being but one exemplary implementation. Example exported methods are described below. Note that the embodiment shown utilizes portions of the LabVIEW graphical programming system, although other systems and approaches are also contemplated. The core component DLL may include or access a virtual interactive instrument (VII) SFP, examples of which are described below with reference to FIGS. 17A-17G. The VII SFP may couple to a dynamic data store, and may be dynamically executable via a virtual interactive instrument execution layer, as shown, where the virtual interactive instrument execution layer may include or couple to various functional components such as limits, maths (analysis), LabVIEW plugins, a switch executive, and a session manager, among others, which may operate to provide respective functionality for the interface.

As FIG. 16A also shows, in one embodiment, the VII execution layer may also couple to (and communicate with) various drivers, e.g., with a driver layer. More specifically, in the example shown, the VII execution layer may couple to or access an IVI class driver that may provide basic or generic IVI interface functionality, as well as an IVI compliant instrument driver, i.e., an instrument specific driver that may provide instrument specific functionality or capabilities, such driver functionality being well known in the art. As shown, the two IVI drivers may also couple to or communicate with an IVI engine, which may itself couple to a data store.

In the embodiment shown, the driver software may couple to or communicate with instrumentation hardware, such driver functionality being well known in the art. For example, a driver for a soft scope may communicate with a scope hardware board coupled to or included in the host computer system 82 to control or operate the scope.

Thus, in one embodiment, at the core of each virtual interactive instrument, a dynamic link library may encapsulate the functionality of the target IVI instrument class, where additional modular software components, e.g., layered over the DLL software, may provide common generic functionality. In one embodiment, the DLL may be accessed and utilized by various different related systems and products.

For example, in one embodiment, the VII DLL may be called from an executable through an exported "VIIADisplaySPF" method (or equivalent), which may in turn display the SFP to the user. The user may then interact via the SFP to drive the corresponding instrument.

In another embodiment, the VII DLL may be encapsulated or wrapped in a graphical program node, such as an Express VI block, as provided in the LabVIEW graphical program development environment, where functionality of the DLL may be invoked or executed via the node, e.g., by including and executing the node in a graphical program. For further information regarding Express blocks, please see U.S. patent application Ser. No. 09/886,496, titled "System and Method for Programmatically Creating Graphical Program Code in a Graphical Program", filed Jun. 20, 2001, which was incorporated by reference above.

In yet another embodiment, the VII DLL may be invoked from (or included in) another tool, such as, for example, National Instruments' TestStand product, where the VII DLL may be implemented within a Step Type. In this example, under step edit conditions, the SFP may be displayed for interactive instrument configuration. Then, when the step executes under a TestStand execution, a "VIIAExecution" method (or equivalent) may be called, passing in previously defined data contained within the step from the instrument's SFP.

Note that these are but exemplary embodiments, and are not intended to limit the implementation, invocation, or use of the VII DLL (or equivalent) to any particular system or approach.

Exported Methods

In one embodiment, the VII DLL may export various methods for use by external systems or processes. For example, in one embodiment, the VII DLL may export a "DisplaySFP" method and an "Execution" method, e.g., "VIIA-<class instrument name>-DisplaySFP" and "VIIA-<class instrument name>-Execution", where the <class instrument name>refers to the name of the particular virtual interactive instrument being used. Note that "VIIA" refers to Virtual Interactive Instrument Architecture.

For example, the DisplaySFP method may be called by an external application, where the method may display the SFP for the relevant instrument class, and set the SFP controls/labels to values contained within the method's parameter list. The user may then interactively configure the instrument and execute the settings, e.g., by clicking on a "RUN" command (or equivalent), which may in turn call the Execution method, passing in any required information.

In one embodiment, the parameter list for the method may include software pointers to structures for each functional component of the VII architecture. In one embodiment, the pointers/structures may be defined or designated as specific data types, e.g., via a typedef mechanism, as is well known in the art of programming. In one embodiment, the typedef may be a "strict typedef", where not only the data type of generated structures of the respective "strict" data type are the same, but all aspects of the structures are the same, e.g., appearance, etc. Such a parameter list may facilitate passing configuration settings from the SFP to the calling application.

Examples of parameter structure headings may include, for example, IVI attributes to support configuration of the corresponding instrument, switch executive attributes, maths (analysis) attributes, and limits/masks attributes, among others.

In one embodiment, the Execution method may be called by an external application. Internally, the method may interrogate data contained within the structures in the parameter list and execute methods of internal components in a predefined manner.

Figure 16B:
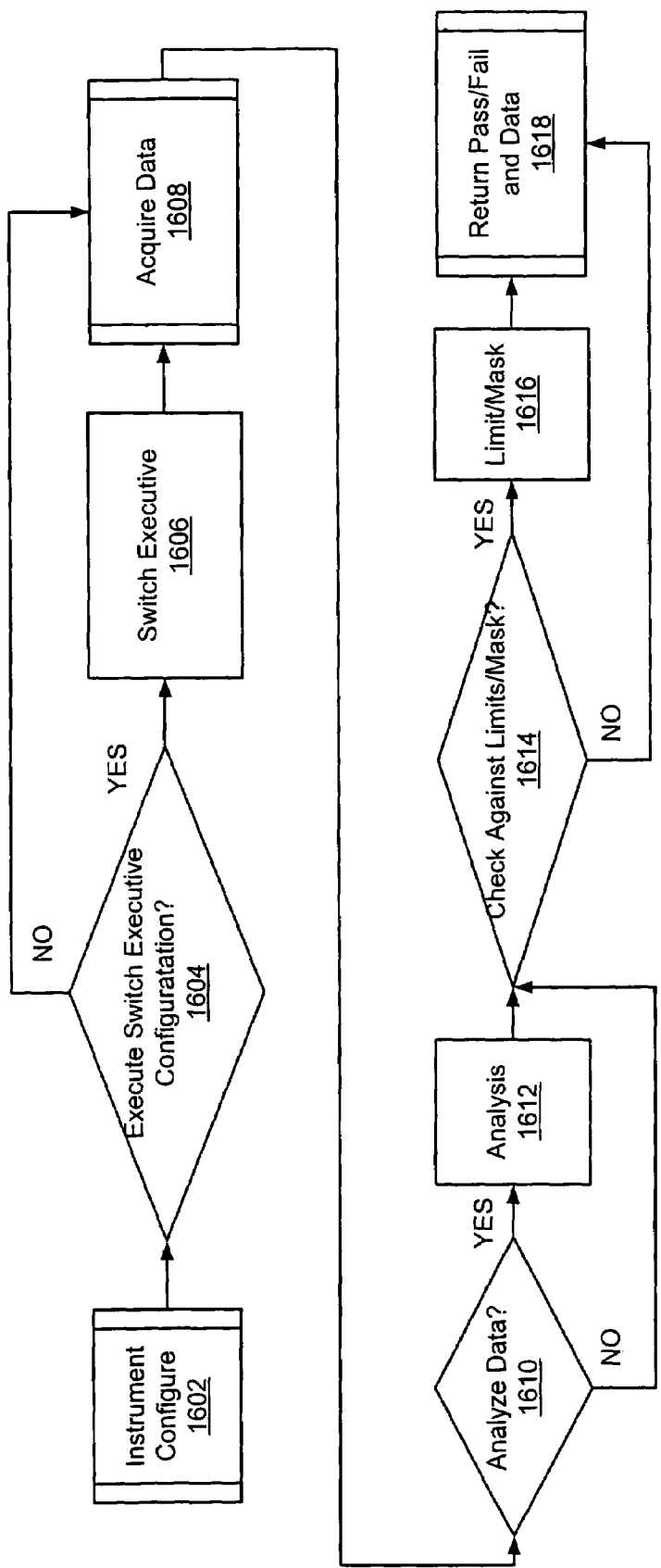
FIG. 16B flowcharts one embodiment of a method of use for the system of FIG. 16A.

FIG. 16B illustrates basic execution flow of internal components within the VII architecture, according to one embodiment.

FIGS. 17A-17G illustrate various embodiments of a soft front panel. In a preferred embodiment, a virtual interactive instrument soft (or software) front panel may be created for each of a plurality of IVI instrument classes. In one embodiment, the SFP may expose the base and extension methods/attributes of the instrument class to the user via an easy to use GUI, i.e., the SFP. Additional functionality may be exposed from the underlying components of the VII architecture to facilitate advanced analysis functionality, e.g., "Maths" (analysis) and Limit/Mask checking capability, for example, using LabVIEW VI polymorphic/plug-in technologies. It should be noted that the example SFPs described below are intended to be exemplary only, and are not intended to limit the SFPs to any particular appearance or functionality.

Figure 17A:
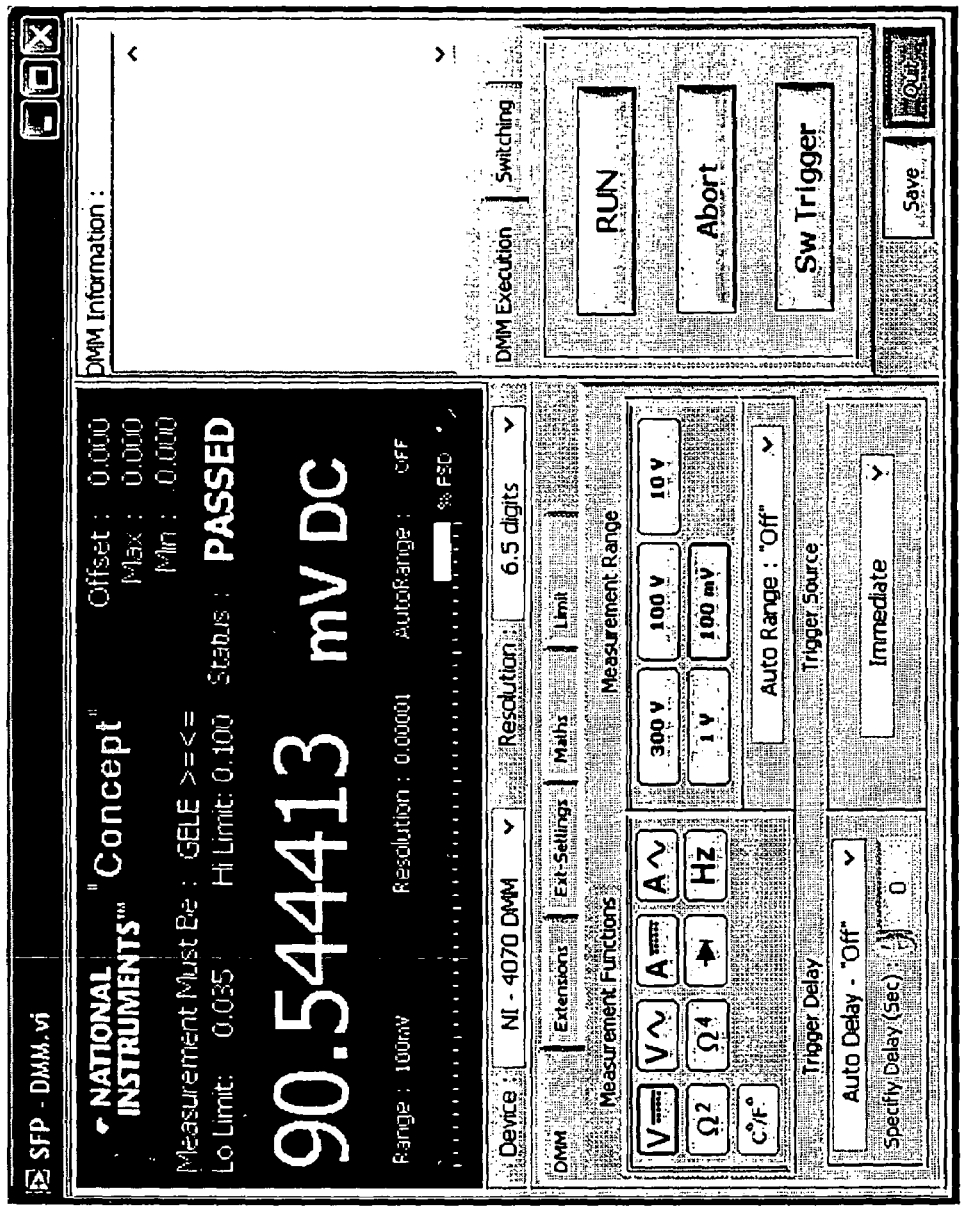
FIGS. 17A-17G illustrate various embodiments of an example soft front panel.

FIG. 17A illustrates an example of a Virtual Interactive DMM SFP, according to one embodiment. As FIG. 17A shows, the SFP comprises a GUI with a variety of displays, indicators, and controls, for interactive operation of the DMM. In this example, the top left section of the GUI comprises a primary display that may operate to display outputs and/or settings for DMM operations, including, for example, Offset, Max, Min, Range, Resolution, AutoRange, measurement limits, and test results (e.g., PASS/FAIL), among others. Also included in this example SFP is a display area for DMM information, e.g., for display of any type of information, e.g., auxiliary data, which may be useful to the user to operate or monitor the DMM.

Below the primary display of the SFP is shown a plurality of tabbed configuration panels for configuration and display of various parameters of or for the DMM, where in this example, the configuration panels include a base class panel labeled "DMM", an Extensions panel, an Extra Settings panel, a Maths or Analysis panel, and a Limit panel. Directly above these panels are ring controls for selecting a device (labeled "Device") and for setting data resolution (labeled "Resolution"). To the right of the tabbed configuration panels is a tabbed set of operational panels, including a DMM Execution panel with RUN, Abort, and Sw Trigger buttons, and a Switching panel (described below with reference to FIG. 17G). As shown, the bottom right of the SFP includes Save and Quit buttons for saving the configuration and exiting the process, respectively.

In this example, the IVI base class configuration panel may allow the user to select the measurement resolution, function, range and the IVI compliant DMM from the Device ring control and click the "RUN" Button contained with the DMM Execution panel, thereby instigating the configured operation (e.g., measurement) utilizing the underling Virtual Interactive Instrument Execution method, described above. The returned (measurement) data may then be displayed within the digital display of the SFP.

Figure 17B:
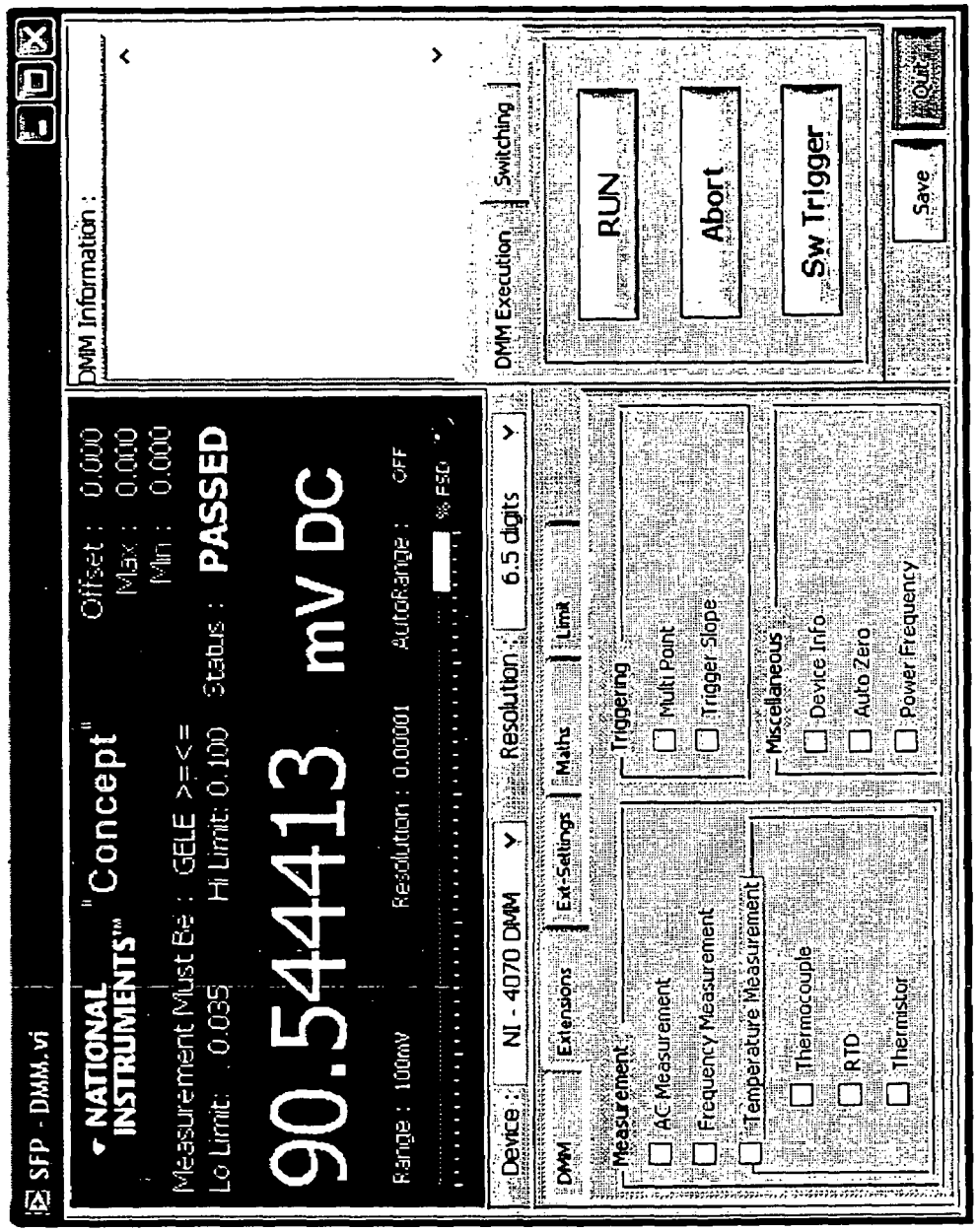

FIG. 17B illustrates the SFP of FIG. 17A, but with the Extensions configuration panel selected and displayed. As FIG. 17B shows, the Extensions panel may include sections for configuring Measurement, Triggering, and Miscellaneous parameters. For example, the Measurement section provides selectable options for measurements such as (but not limited to) AC Measurement, Frequency Measurement, and Temperature Measurement, where the Temperature Measurement further includes options specifying Thermocouple, RTD (Resistive Thermal Device), and Thermistor, although it should be noted that other types of measurement are also contemplated. In the embodiment shown, the Triggering section includes options for Multi-Point triggering and for Trigger slope. As shown, the Miscellaneous section includes options for Device Information, Auto Zero, and Power Frequency.

Figure 17C:
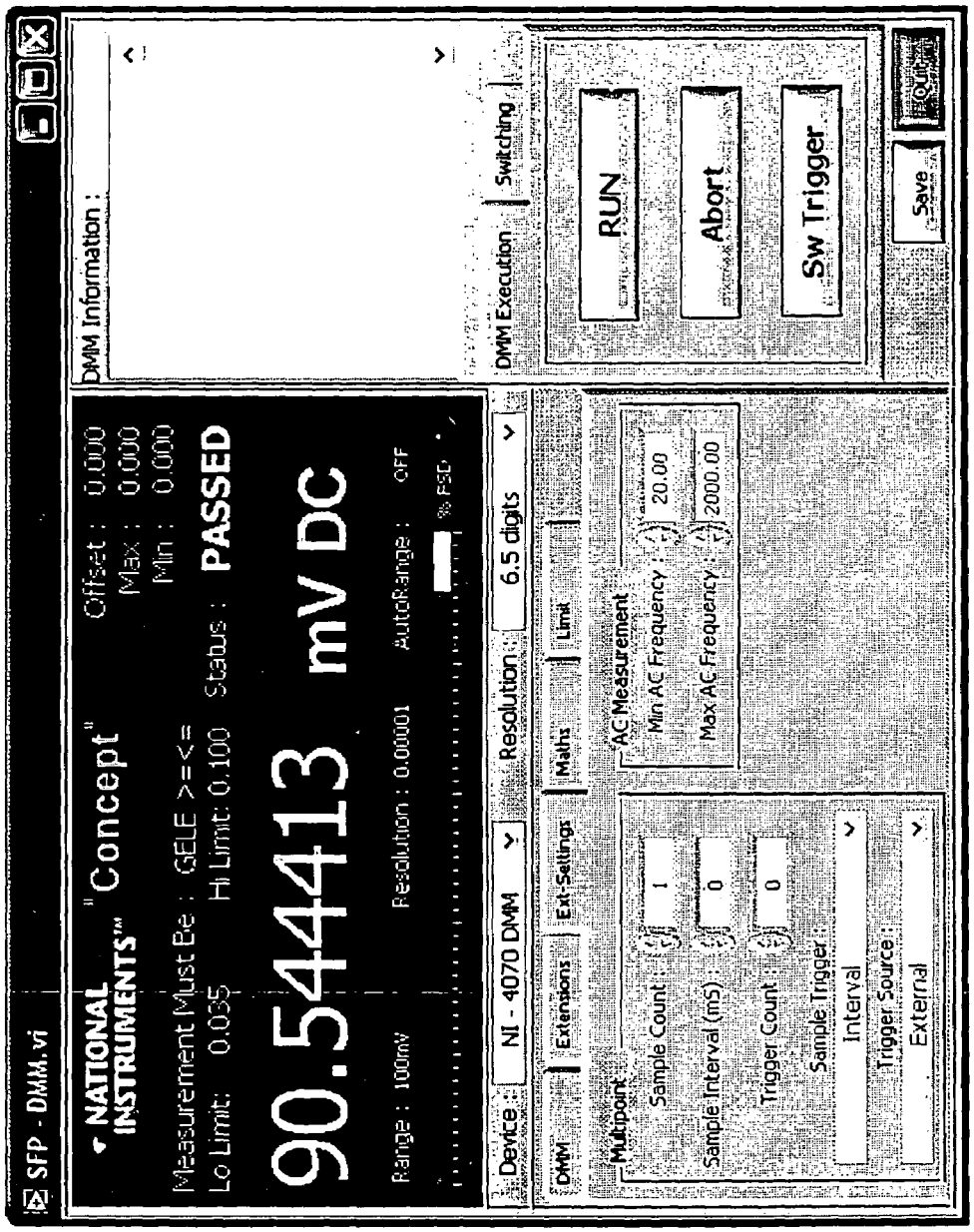

FIG. 17C illustrates the SFP of FIG. 17A, but with the Extra Settings configuration panel selected and displayed. As FIG. 17C shows, the Extra Settings panel may include sections for configuring Multipoint and AC Measurement parameters. For example, the Multipoint section provides fields for Multipoint options such as (but not limited to) Sample Count, Sample Interval (mS), Trigger Count, Sample Trigger, and Trigger Source. The AC Measurement section includes fields for Min and Max AC Frequency.

Figure 17D:
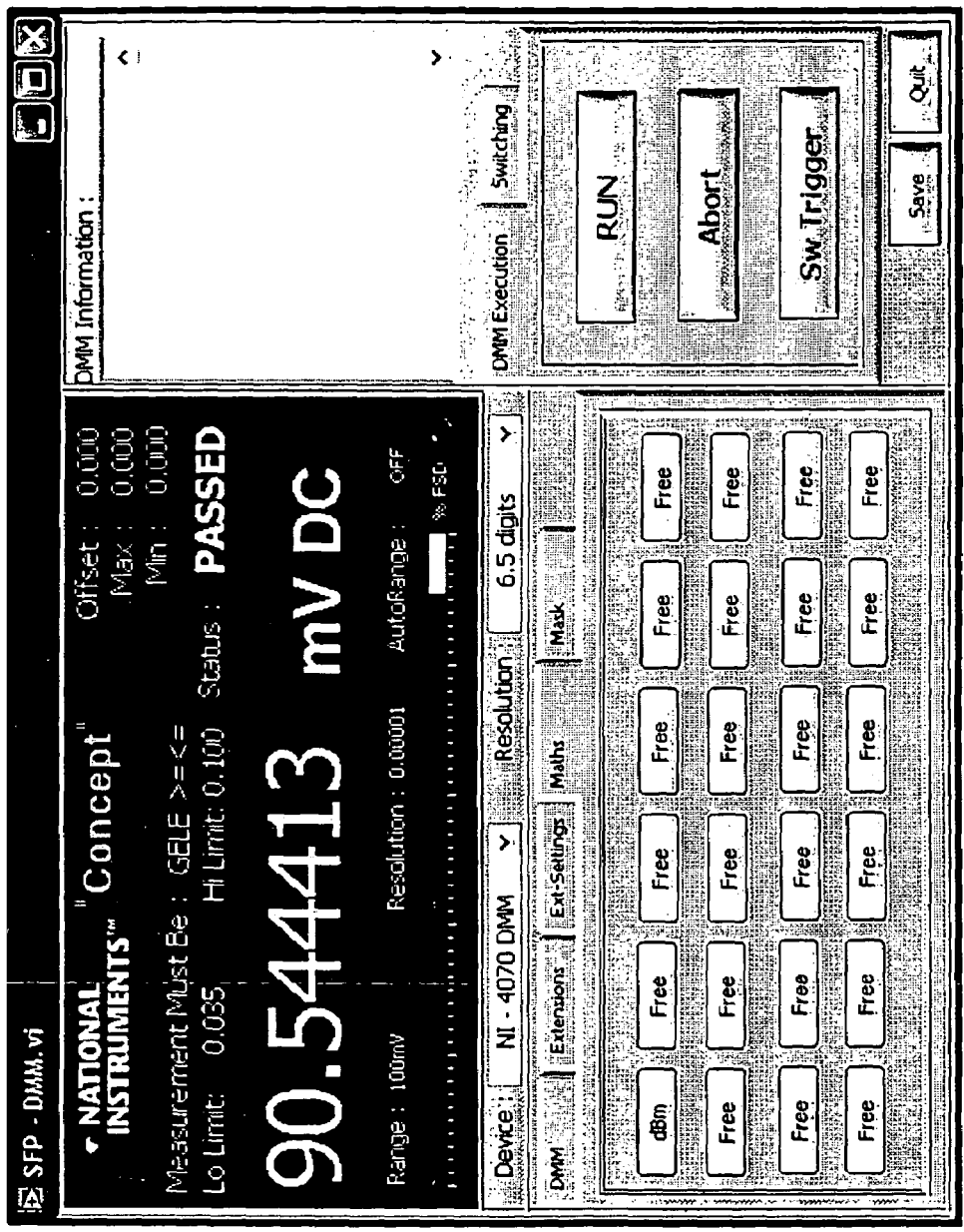

FIG. 17D illustrates the SFP of FIG. 17A, but with the Maths or Analysis configuration panel selected and displayed. As FIG. 17D shows, in this embodiment, the Maths panel may include a plurality of user selectable (and user definable) controls, each of which may be associated with a predefined function, e.g., a user defined graphical program, and which may be selected by the user to invoke the respective function, e.g., for inclusion in a signal analysis function (or any other type of function). In other words, each of the plurality of controls may be configured to allow user invocation of custom or predefined functionality in the context of the SFP, e.g., providing "plug-in" functionality. In one embodiment, this type of user-customization may provide access by the user to any functionality desired, e.g., to functionality provided or supported by the LabVIEW graphical programming system. For example, in one embodiment, each "free button" may be associated with an analysis algorithm, e.g., developed within LabVIEW using a pre-defined template. Further description of this feature is provided below.

Figure 17E:
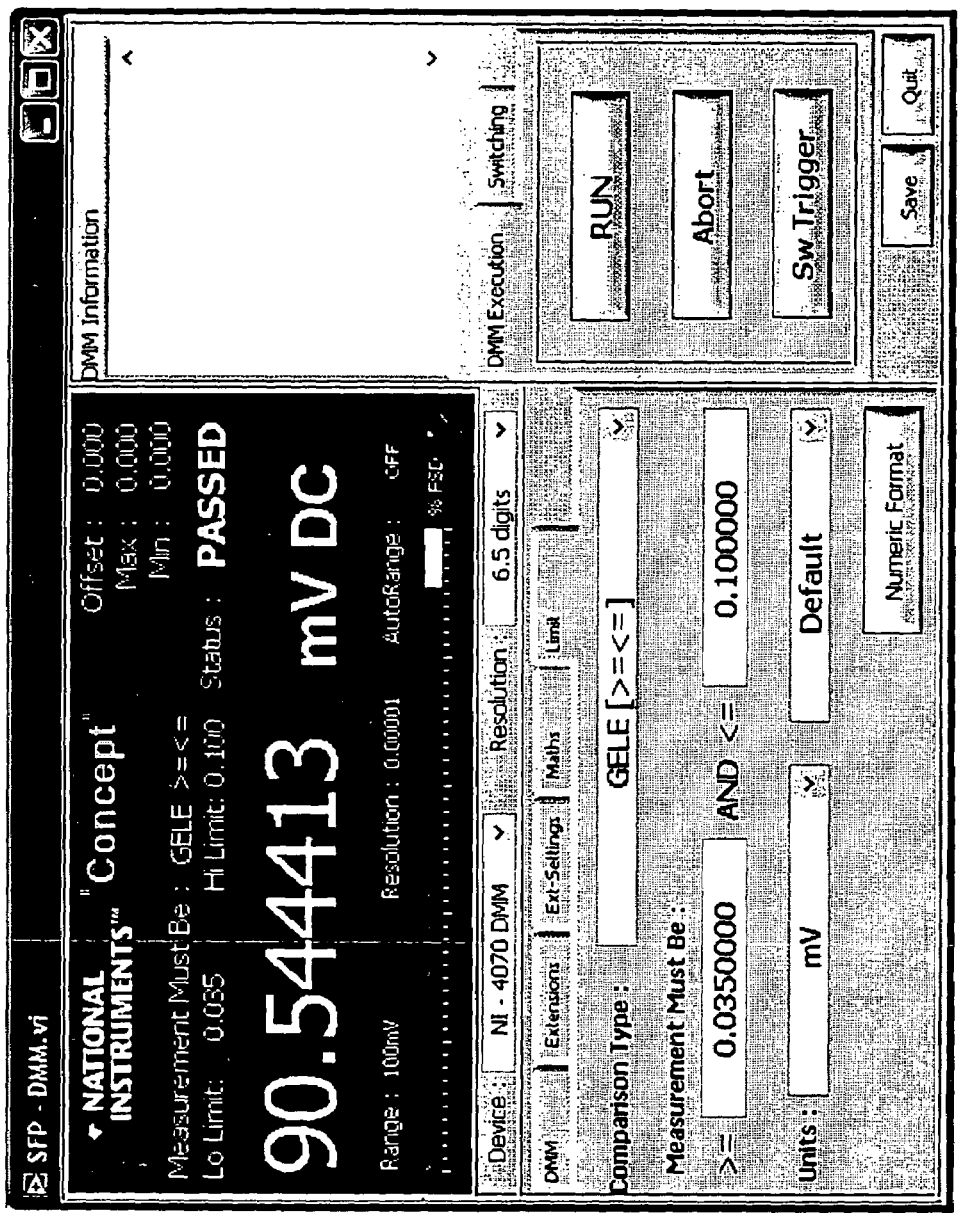

FIG. 17E illustrates the SFP of FIG. 17A, but with the Limits configuration panel selected and displayed. As FIG. 17E shows, in this embodiment, the Limits panel may include controls for Comparison Type, upper and lower bounds for the measurements, and units. A Numeric Format button is also shown, whereby the user may invoke a configuration panel or control to specify a display format for numeric data.

Figure 17F:
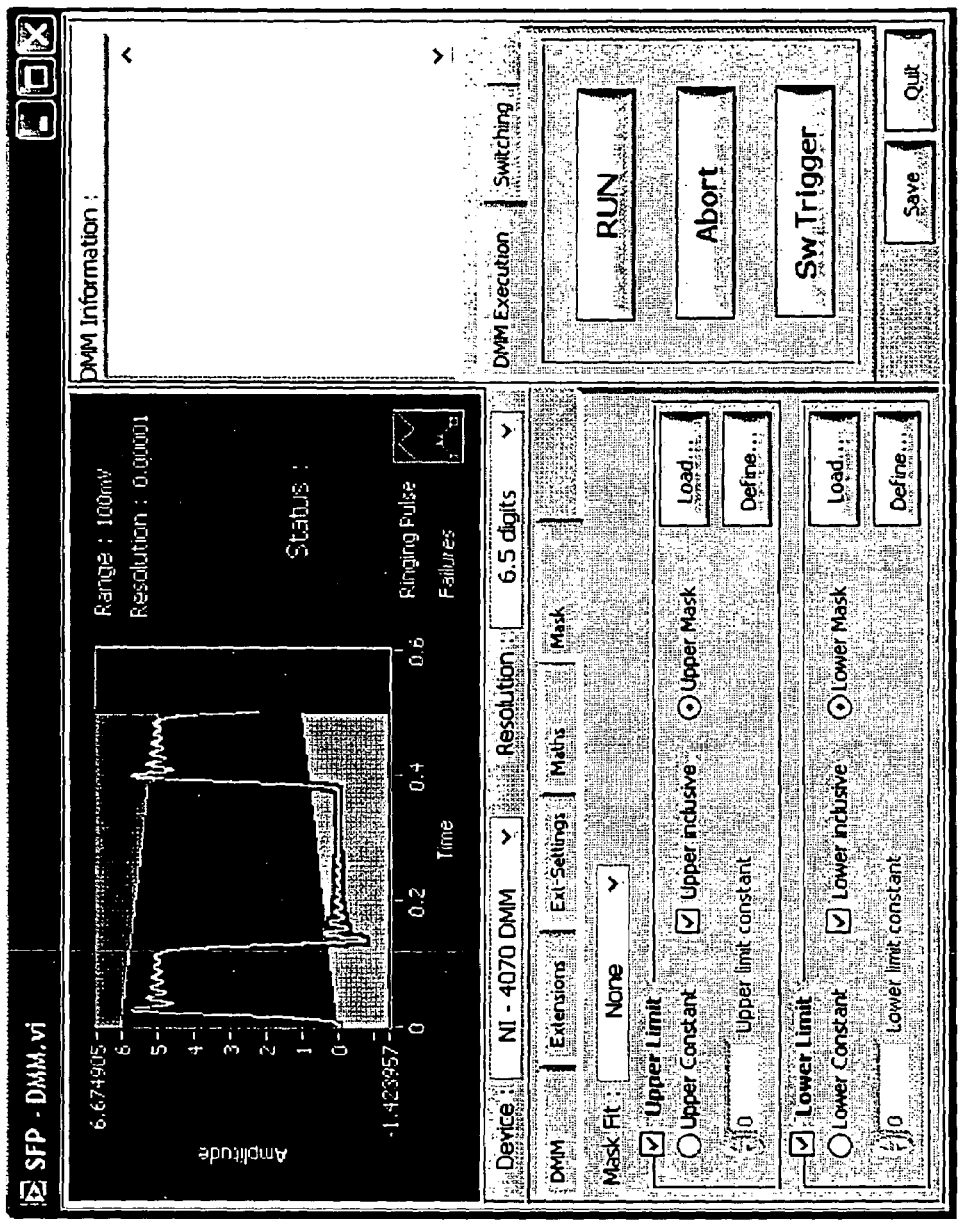

FIG. 17F illustrates the SFP of FIG. 17A, but with the Mask configuration panel selected and displayed. As FIG. 17F shows, in one embodiment, the Mask panel may include a control for specifying a Mask Fit, and may also include sections for specifying Upper and Lower Limits for the mask, e.g., options for Upper Constant, Upper Inclusive, and Upper Mask. Each of these sections may also include controls for loading and defining these limits. As FIG. 17F also shows, in this example, the primary display may be operable to display a signal with the specified mask overlaid on the signal plot, allowing the user to easily see how the mask test passes or fails. Note that in this example, a square wave signal has failed the test, and so the displayed test status indicates "FAILED". In one embodiment, the mask and/or the signal may be modified in response to the test results, where the displayed results may be updated automatically to reflect the relationship between the signal and the mask after the modification.

Figure 17G:
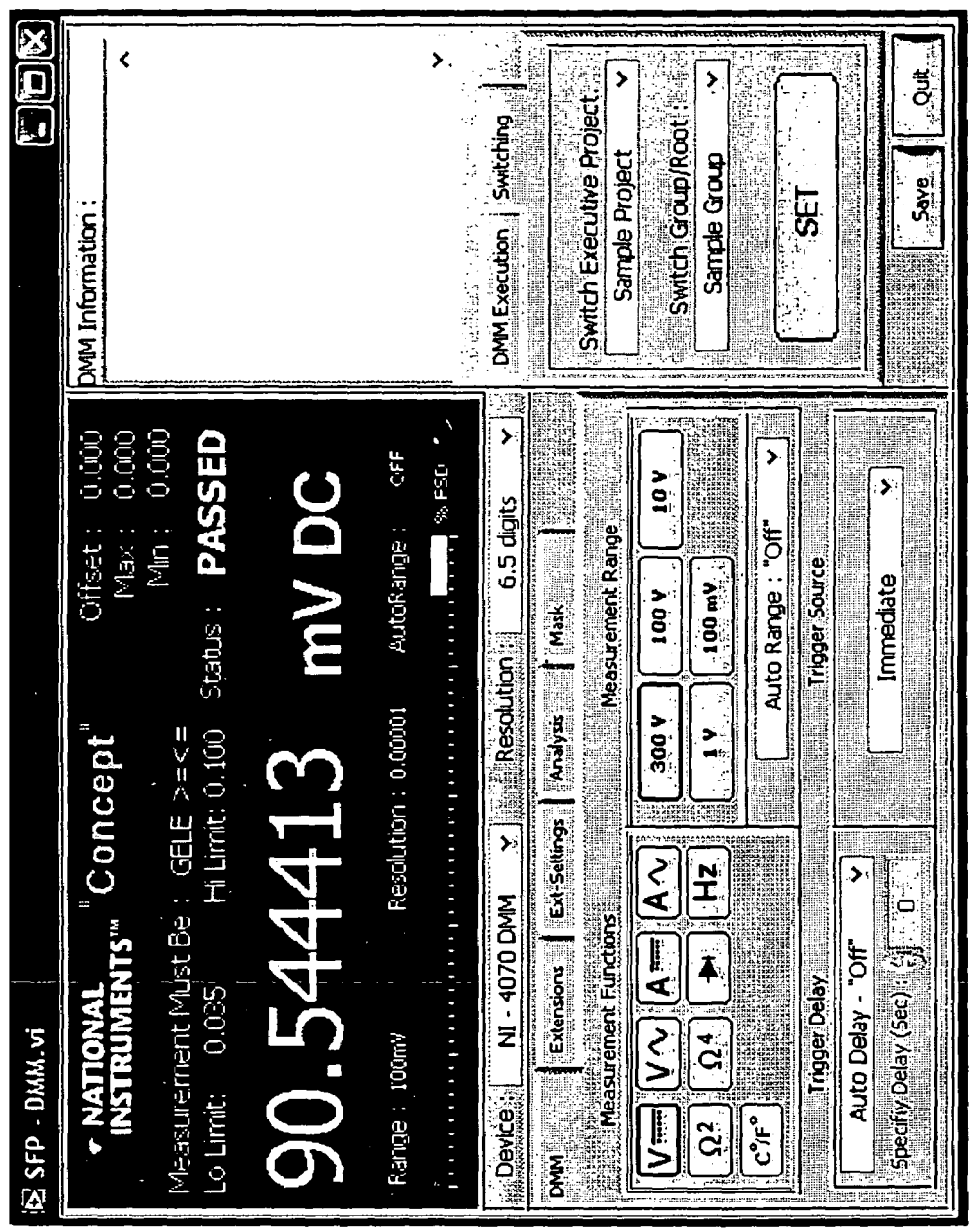

FIG. 17G illustrates the SFP of FIG. 17A, but with the Switching panel displayed, as shown in the bottom right of the SFP. As shown, the Switching panel may include fields for specifying (and displaying) a Switch Executive Project and a Switch Group/Root, and a SET button for setting the specified values of these parameters.

Thus, in one embodiment, the GUI for the signal analysis function development environment may include one or more SFPs for user interaction with corresponding instruments or devices. For example, in an alternative embodiment of the method of FIG. 5, receiving user input specifying an operation may include receiving user input indicating a pre-defined graphical program, where the pre-defined graphical program implements the first operation. In a preferred embodiment, the pre-defined graphical program may be associated with a control in the GUI, where the first operation is invocable via user input to the control. The associating may be performed in response to user input indicating an association between the pre-defined graphical program and the control. In one embodiment, the pre-defined graphical program may be displayed in the GUI. For example, the GUI may include a display area for displaying the block diagram of the graphical program.

In one embodiment, one or more of the operations of the signal analysis function may be associated with a respective control in the GUI, where the one or more operations are invocable via user input to the respective control. In other words, one or more signal operations may be grouped together, associated with a GUI control, and then invoked (as a group) via user selection or activation of the GUI control. Thus, in one embodiment, receiving user input specifying an operation may include receiving user input to the respective control for the operation, thereby invoking the one or more operations.

In one embodiment, an interface may be implemented for an instrument, e.g., for signal analysis in the following manner:

A soft front panel may be displayed, where, as noted above, the soft front panel comprises an interface for a respective hardware device, e.g., a hardware board, where the soft front panel emulates a front panel for the hardware device, and where the soft front panel comprises a first plurality of controls for invoking respective signal operations, and where the first plurality of controls substantially corresponds to a respective plurality of physical controls for the hardware device.

User input to one of the first plurality of controls may be received specifying an operation, where the operation implements at least a portion of a signal analysis function. Information specifying the operation may be stored, and the operation performed utilizing the instrument, thereby generating resultant data. In one embodiment, the resultant data may then be displayed in the soft front panel.

In one embodiment, displaying the soft front panel may include displaying a Graphical User Interface (GUI), wherein the GUI includes the soft front panel. The GUI may also include a second plurality of controls, where each of the second plurality of controls is operable to be associated with a respective one or more operations, and where the respective one or more operations are invocable via the associated one of the second plurality of controls.

In one embodiment, user input indicating a pre-defined graphical program may be received, wherein the pre-defined graphical program implements a first operation. The pre-defined graphical program may be associated with a first control of the second plurality of controls in the GUI, wherein the first operation is invocable via user input to the first control. In a preferred embodiment, said associating is performed in response to user input indicating an association between the pre-defined graphical program and the first control. In one embodiment, the pre-defined graphical program may be displayed in the GUI.

In another embodiment, the one or more operations of the signal analysis function may be associated with a first respective control of the second plurality of controls, where the one or more operations are invocable via user input to the first respective control.

Thus, various embodiments of the system and method may provide an interface for one or more instruments where the interface substantially replicates the front panel of a hardware instrument.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium comprising program instructions for specifying a signal analysis function, comprising:
   receiving first user input indicating a parameter for a first operation, wherein the operation implements at least a portion of a signal analysis function;
   programmatically including the first operation in a sweep loop;
   receiving second user input specifying a sweep configuration for a sweep on the indicated parameter; and
   performing the sweep on the indicated parameter in accordance with the sweep configuration, thereby generating resultant data for the sweep, wherein said performing the sweep on the indicated parameter in accordance with the sweep configuration comprises:
      providing a next sweep value of the parameter to the first operation as a current value of the parameter for the first operation;
      performing the first operation using the current sweep value of the parameter, thereby generating corresponding resultant data;
      storing the corresponding resultant data; and
      repeating said providing a next sweep value, said performing the first operation using the current sweep value of the parameter, and said storing the corresponding resultant data in an iterative manner in accordance with the sweep configuration.

2. The memory medium of claim 1, wherein the program instructions are further executable to implement:
   displaying the resultant data for the sweep on a display.

3. The memory medium of claim 2, wherein the program instructions are further executable to implement:
   displaying a Graphical User Interface (GUI) on the display;
   wherein said receiving first input and said receiving second input comprise receiving said first input and said receiving second input to the GUI; and
   wherein said displaying the resultant data for the sweep on the display comprises displaying the resultant data for the sweep in the GUI.

4. The memory medium of claim 1, wherein the resultant data comprise signal data.

5. The memory medium of claim 4, wherein the signal data comprise a signal plot.

6. The memory medium of claim 4, wherein the signal data comprise tabular data.

7. The memory medium of claim 1, wherein said specifying a sweep configuration comprises specifying one or more of:
   a range of values for the indicated parameter;
   a number of iterations for the sweep;
   an interpolation type;
   a step size for the sweep on the indicated parameter;
   one or more specific values in the range of values for the parameter; and
   a source for at least a portion of the sweep configuration.

8. The memory medium of claim 1, wherein said specifying a sweep configuration comprises specifying the resultant data.

9. The memory medium of claim 1, wherein said performing the sweep on the indicated parameter in accordance with the sweep configuration further comprises:
   batch computing each of the sweep values in accordance with the sweep configuration prior to said repeating.

10. The memory medium of claim 1, wherein said providing a next sweep value of the parameter to the first operation as a current value of the parameter for the first operation further comprises:
    computing the next sweep value in accordance with the sweep configuration.

11. The memory medium of claim 1, wherein said performing the sweep on the indicated parameter in accordance with the sweep configuration comprises:
    iteratively performing the first operation, wherein at each iteration the first operation is performed using a respective value of the parameter, and wherein at each iteration corresponding resultant data are generated.

12. The memory medium of claim 11,
    wherein performing the first operation comprises performing the first operation using a hardware device, and wherein said iteratively performing the first operation comprises triggering the hardware device at each iteration.

13. The memory medium of claim 1,
    wherein said receiving first user input indicating the parameter for the first operation further comprises receiving further first user input indicating one or more additional parameters for the first operation, wherein the parameter and the one or more additional parameters comprise a plurality of parameters;
    wherein said receiving second user input specifying a sweep configuration for a sweep on the indicated parameter further comprises specifying the sweep configuration for a sweep on the indicated one or more additional parameters; and
    wherein said performing the sweep on the indicated parameter in accordance with the sweep configuration further comprises performing the sweep on the indicated one or more additional parameters.

14. The memory medium of claim 13, wherein the sweep configuration specifies one or more of:
    a parallel sweep of at least a first subset of the plurality of parameters; and
    a nested sweep of at least a second subset of the plurality of parameters.

15. The memory medium of claim 1, wherein the signal analysis function comprises a plurality of operations, wherein the program instructions are further executable to implement:
    determining one or more other operations of the plurality of operations for inclusion in the sweep loop, wherein said performing the sweep on the indicated parameter further comprises performing the one or more other operations.

16. The memory medium of claim 15, wherein said determining the one or more other operations of the plurality of operations for inclusion in the sweep loop comprises:

receiving third user input indicating the one or more other operations of the plurality of operations for inclusion in the sweep loop; and programmatically including the one or more other operations in the sweep loop.

17. The memory medium of claim 15, wherein said determining the one or more other operations of the plurality of operations for inclusion in the sweep loop comprises:

programmatically analyzing dependencies among prior operations and the first operation to determine the one or more other operations, wherein the first operation has a dependency on at least one of the one or more other operations; and programmatically including the one or more other operations in the sweep loop.

18. The memory medium of claim 1, wherein the program instructions are further executable to implement:

displaying a Graphical User Interface (GUI) on the display;

wherein said receiving first input and said receiving second input comprise receiving said first input and said receiving second input to the GUI.

19. The memory medium of claim 18, wherein the GUI comprises a wizard, wherein said displaying the GUI comprises displaying a sequence of dialogs to interactively guide the user in specifying the sweep.

20. The memory medium of claim 18, wherein the GUI comprises one or more configuration dialogs corresponding to the first operation.

21. The memory medium of claim 18, wherein the GUI further comprises a sweep configuration dialog corresponding to the sweep configuration, wherein the configuration dialog includes one or more GUI elements indicating the sweep configuration, wherein the program instructions are further executable to implement:

receiving third user input to the configuration dialog modifying the sweep configuration, thereby generating a modified sweep configuration, wherein said performing the sweep on the indicated parameter in accordance with the sweep configuration comprises performing the sweep on the indicated parameter in accordance with the modified sweep configuration.

22. The memory medium of claim 18, wherein the GUI is comprised in a signal analysis function development environment.

23. The memory medium of claim 22, wherein the signal analysis operation comprises a plurality of operations, including the first operation, wherein each of the plurality of operations corresponds to a respective function block, wherein the program instructions are further executable to implement:

displaying the corresponding function blocks for the plurality of operations in a diagram, wherein the diagram that visually represents I/O relationships between the function blocks.

24. The memory medium of claim 23, wherein the configured sweep corresponds to a sweep function block, wherein the program instructions are further executable to implement:

displaying the sweep function block in the diagram substantially indicating which of the corresponding function blocks are included in the sweep.

25. The memory medium of claim 23, wherein the program instructions are further executable to implement:

graphically indicating in the diagram which of the corresponding function blocks are included in the sweep.

26. The memory medium of claim 23, wherein the program instructions are further executable to implement:

storing information specifying the plurality of operations, wherein the information specifying the plurality of operations is executable in the signal analysis function development environment to perform the signal analysis function.

27. The memory medium of claim 26, wherein the program instructions are further executable to implement:

programmatically generating a graphical program implementing the signal analysis function based on the stored information, wherein the graphical program is executable to perform the signal analysis function.

28. A method for specifying a signal analysis function, comprising:

receiving first user input indicating a parameter for a first operation, wherein the operation implements at least a portion of a signal analysis function;

programmatically including the first operation in a sweep loop;

receiving second user input specifying a sweep configuration for a sweep on the indicated parameter; and performing the sweep on the indicated parameter in accordance with the sweep configuration, thereby generating resultant data for the sweep, wherein said performing the sweep on the indicated parameter in accordance with the sweep configuration comprises:

providing a next sweep value of the parameter to the first operation as a current value of the parameter for the first operation;

performing the first operation using the current sweep value of the parameter, thereby generating corresponding resultant data;

storing the corresponding resultant data; and repeating said providing a next sweep value, said performing the first operation using the current sweep value of the parameter, and said storing the corresponding resultant data in an iterative manner in accordance with the sweep configuration.

29. A system for displaying signals, comprising:

a processor; and a memory coupled to the processor, wherein the memory stores program instructions for specifying a signal analysis function, wherein the program instructions are executable by a processor to:

receive first user input indicating a parameter for a first operation, wherein the operation implements at least a portion of a signal analysis function;

programmatically include the first operation in a sweep loop;

receive second user input specifying a sweep configuration for a sweep on the indicated parameter; and perform the sweep on the indicated parameter in accordance with the sweep configuration, thereby generating resultant data for the sweep, wherein to perform the sweep on the indicated parameter in accordance with the sweep configuration, the program instructions are executable to:

provide a next sweep value of the parameter to the first operation as a current value of the parameter for the first operation;

perform the first operation using the current sweep value of the parameter, thereby generating corresponding resultant data;

store the corresponding resultant data; and repeat said providing a next sweep value, said performing the first operation using the current sweep value of the parameter, and said storing the corresponding resultant data in an iterative manner in accordance with the sweep configuration.

30. A system for displaying signals, comprising:
    means for receiving first user input indicating a parameter for a first operation, wherein the operation implements at least a portion of a signal analysis function;
    means for programmatically including the first operation in a sweep loop;
    means for receiving second user input specifying a sweep configuration for a sweep on the indicated parameter; and
    means for performing the sweep on the indicated parameter in accordance with the sweep configuration, thereby generating resultant data for the sweep, wherein the means for performing the sweep on the indicated parameter in accordance with the sweep configuration comprises:
        means for providing a next sweep value of the parameter to the first operation as a current value of the parameter for the first operation;
        means for performing the first operation using the current sweep value of the parameter, thereby generating corresponding resultant data;
        means for storing the corresponding resultant data; and
        means for repeating said providing a next sweep value, said performing the first operation using the current sweep value of the parameter, and said storing the corresponding resultant data in an iterative manner in accordance with the sweep configuration.

31. A memory medium comprising program instructions for specifying a signal analysis function, comprising:
    receiving first user input indicating a parameter for a first operation, wherein the operation implements at least a portion of a signal analysis function;
    programmatically including the first operation in a sweep loop;
    receiving second user input specifying a sweep configuration for a sweep on the indicated parameter;
    performing the sweep on the indicated parameter in accordance with the sweep configuration, thereby generating resultant data for the sweep, wherein said performing the sweep on the indicated parameter in accordance with the sweep configuration comprises:
        iteratively performing the first operation, wherein at each iteration the first operation is performed using a respective value of the parameter, and wherein at each iteration corresponding resultant data are generated, wherein said performing the first operation comprises performing the first operation using a hardware device, and wherein said iteratively performing the first operation comprises triggering the hardware device at each iteration; and
    storing the corresponding resultant data.

32. A memory medium comprising program instructions for specifying a signal analysis function, comprising:
    receiving first user input indicating a plurality of parameters for a first operation, wherein the operation implements at least a portion of a signal analysis function;
    programmatically including the first operation in a sweep loop;
    receiving second user input specifying a sweep configuration for a sweep on the indicated plurality of parameters;
    performing the sweep on the indicated plurality of parameters in accordance with the sweep configuration, thereby generating resultant data for the sweep; and
    storing the resultant data.

33. The memory medium of claim 32, wherein the sweep configuration specifies one or more of:
    a parallel sweep of at least a first subset of the plurality of parameters; and
    a nested sweep of at least a second subset of the plurality of parameters.

34. A memory medium comprising program instructions for specifying a signal analysis function, comprising:
    receiving first user input indicating a parameter for a first operation, wherein the operation implements at least a portion of a signal analysis function, wherein the signal analysis function comprises a plurality of operations;
    programmatically including the first operation in a sweep loop;
    receiving second user input specifying a sweep configuration for a sweep on the indicated parameter;
    determining one or more other operations of the plurality of operations for inclusion in the sweep loop, wherein said determining the one or more other operations of the plurality of operations for inclusion in the sweep loop comprises:
        receiving third user input indicating the one or more other operations of the plurality of operations for inclusion in the sweep loop; and
        programmatically including the one or more other operations in the sweep loop;
    performing the sweep on the indicated parameter in accordance with the sweep configuration, thereby generating resultant data for the sweep, wherein said performing the sweep on the indicated parameter further comprises performing the one or more other operations; and
    storing the resultant data.

35. A memory medium comprising program instructions for specifying a signal analysis function, comprising:
    receiving first user input indicating a parameter for a first operation, wherein the operation implements at least a portion of a signal analysis function, wherein the signal analysis function comprises a plurality of operations;
    programmatically including the first operation in a sweep loop;
    determining one or more other operations of the plurality of operations for inclusion in the sweep loop, wherein said determining the one or more other operations of the plurality of operations for inclusion in the sweep loop comprises:
        programmatically analyzing dependencies among prior operations and the first operation to determine the one or more other operations, wherein the first operation has a dependency on at least one of the one or more other operations; and
        programmatically including the one or more other operations in the sweep loop;
    receiving second user input specifying a sweep configuration for a sweep on the indicated parameter;
    performing the sweep on the indicated parameter in accordance with the sweep configuration, thereby generating resultant data for the sweep; and
    storing the resultant data.

36. A memory medium comprising program instructions for specifying a signal analysis function, comprising:
    displaying a Graphical User Interface (GUI) on a display;
    receiving first user input to the GUI indicating a parameter for a first operation, wherein the operation implements at least a portion of a signal analysis function;
    programmatically including the first operation in a sweep loop;

receiving second user input to the GUI specifying a sweep configuration for a sweep on the indicated parameter;

performing the sweep on the indicated parameter in accordance with the sweep configuration, thereby generating resultant data for the sweep;

wherein the GUI further comprises a sweep configuration dialog corresponding to the sweep configuration, wherein the configuration dialog includes one or more GUI elements indicating the sweep configuration;

receiving third user input to the configuration dialog modifying the sweep configuration, thereby generating a modified sweep configuration;

wherein said performing the sweep on the indicated parameter in accordance with the sweep configuration comprises performing the sweep on the indicated parameter in accordance with the modified sweep configuration; and storing the resultant data.

37. A memory medium comprising program instructions for specifying a signal analysis function, comprising:

displaying a Graphical User Interface (GUI) on a display, wherein the GUI is comprised in a signal analysis function development environment;

receiving first user input to the GUI indicating a parameter for a first operation, wherein the operation implements at least a portion of a signal analysis function, wherein the signal analysis operation comprises a plurality of operations, including the first operation, wherein each of the plurality of operations corresponds to a respective function block;

displaying the corresponding function blocks for the plurality of operations in a diagram, wherein the diagram that visually represents I/O relationships between the function blocks;

programmatically including the first operation in a sweep loop;

receiving second user input to the GUI specifying a sweep configuration for a sweep on the indicated parameter;

performing the sweep on the indicated parameter in accordance with the sweep configuration, thereby generating resultant data for the sweep; and storing the resultant data.

38. The memory medium of claim 37, wherein the configured sweep corresponds to a sweep function block, wherein the program instructions are further executable to implement:

displaying the sweep function block in the diagram substantially indicating which of the corresponding function blocks are included in the sweep.

39. The memory medium of claim 37, wherein the program instructions are further executable to implement:

graphically indicating in the diagram which of the corresponding function blocks are included in the sweep.

40. The memory medium of claim 37, wherein the program instructions are further executable to implement:

storing information specifying the plurality of operations, wherein the information specifying the plurality of operations is executable in the signal analysis function development environment to perform the signal analysis function.

41. The memory medium of claim 40, wherein the program instructions are further executable to implement:

programmatically generating a graphical program implementing the signal analysis function based on the stored information, wherein the graphical program is executable to perform the signal analysis function.

* * * * *